US012783407B1

(12) United States Patent
Kuzmin et al.

(10) Patent No.: US 12,783,407 B1
(45) Date of Patent: *Nov. 3, 2026

(54) STORAGE DEVICE WITH ERASE UNIT LEVEL ADDRESS MAPPING

(71) Applicant: Radian Memory Systems, LLC, Plano, TX (US)

(72) Inventors: Andrey V. Kuzmin, Moscow (RU); James G. Wayda, Laguna Niguel, CA (US)

(73) Assignee: Radian Memory Systems, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/001,285

(22) Filed: Dec. 24, 2024

Related U.S. Application Data

(63) Continuation of application No. 18/928,526, filed on Oct. 28, 2024, now Pat. No. 12,579,062, which is a (Continued)

(51) Int. Cl.
*G06F 12/02* (2006.01)
*G06F 3/06* (2006.01)
(Continued)

(52) U.S. Cl.
CPC ........ *G06F 12/0246* (2013.01); *G06F 3/0611* (2013.01); *G06F 3/0638* (2013.01);
(Continued)

(58) Field of Classification Search
CPC .. G06F 12/0246; G06F 3/0611; G06F 3/0638; G06F 3/0679; G06F 3/0688;
(Continued)

(56) References Cited

U.S. PATENT DOCUMENTS 4,532,590 A 7/1985 Wallach
4,813,002 A 3/1989 Joyce
(Continued)

FOREIGN PATENT DOCUMENTS

EP 3023990 A1 * 5/2016 ............. G11C 16/16
EP 3226141 A1 * 10/2017 ......... G06F 12/0246
(Continued)

OTHER PUBLICATIONS

Petition for IPR, 2025-01266, U.S. Pat. No. 11,544,183, 81 Pages, Jul. 9, 2025.
(Continued)

*Primary Examiner* — Pierre Michel Bataille
(74) *Attorney, Agent, or Firm* — Marc P. Schuyler

(57) ABSTRACT

This disclosure provides for improvements in managing multi-drive, multi-die or multi-plane NAND flash memory. In one embodiment, the host directly assigns physical addresses and performs logical-to-physical address translation in a manner that reduces or eliminates the need for a memory controller to handle these functions, and initiates functions such as wear leveling in a manner that avoids competition with host data accesses. A memory controller optionally educates the host on array composition, capabilities and addressing restrictions. Host software can therefore interleave write and read requests across dies in a manner unencumbered by memory controller address translation. For multi-plane designs, the host writes related data in a manner consistent with multi-plane device addressing limitations. The host is therefore able to "plan ahead" in a manner supporting host issuance of true multi-plane read commands.

23 Claims, 18 Drawing Sheets

Related U.S. Application Data continuation of application No. 18/366,983, filed on Aug. 8, 2023, now Pat. No. 12,164,421, which is a continuation of application No. 17/952,230, filed on Sep. 24, 2022, now Pat. No. 11,762,766, which is a continuation of application No. 17/563,467, filed on Dec. 28, 2021, now Pat. No. 11,487,656, which is a continuation of application No. 16/751,925, filed on Jan. 24, 2020, now Pat. No. 11,314,636, which is a continuation of application No. 16/570,922, filed on Sep. 13, 2019, now Pat. No. 11,188,457, which is a continuation of application No. 15/621,888, filed on Jun. 13, 2017, now Pat. No. 10,445,229, which is a continuation of application No. 15/346,641, filed on Nov. 8, 2016, now Pat. No. 9,710,377, which is a continuation of application No. 14/951,708, filed on Nov. 25, 2015, now Pat. No. 9,519,578, which is a continuation of application No. 14/047,193, filed on Oct. 7, 2013, now Pat. No. 9,229,854, which is a continuation-in-part of application No. 13/767,723, filed on Feb. 14, 2013, now Pat. No. 9,652,376.

(60) Provisional application No. 61/757,464, filed on Jan. 28, 2013.

(51) Int. Cl.

| | |
|---|---|
| ***G06F 8/654*** | (2018.01) |
| ***G06F 11/10*** | (2006.01) |
| ***G06F 12/10*** | (2016.01) |
| ***G06F 16/18*** | (2019.01) |
| *G06F 15/76* | (2006.01) |

(52) U.S. Cl.
CPC .......... *G06F 3/0679* (2013.01); *G06F 3/0688* (2013.01); *G06F 8/654* (2018.02); *G06F 11/1068* (2013.01); *G06F 11/1072* (2013.01); *G06F 12/10* (2013.01); *G06F 16/1847* (2019.01); *G06F 2015/766* (2013.01); *G06F 2212/2022* (2013.01); *G06F 2212/7207* (2013.01); *G06F 2212/7208* (2013.01)

(58) Field of Classification Search
CPC .. G06F 8/654; G06F 11/1068; G06F 11/1072; G06F 12/10; G06F 16/1847; G06F 2015/766; G06F 2212/2022; G06F 2212/7207; G06F 2212/7208; G06F 3/06; G06F 11/10; G06F 2212/7211; G06F 12/02
See application file for complete search history.

(56) References Cited

U.S. PATENT DOCUMENTS 5,404,485 A 4/1995 Ban
5,568,423 A 10/1996 Jou et al.
5,652,857 A 7/1997 Shimoi et al.
5,860,082 A 1/1999 Smith et al.
5,963,977 A 10/1999 Gold
6,118,724 A 9/2000 Higgenbottom
6,134,631 A 10/2000 Jennings, III
6,145,069 A 11/2000 Dye
6,148,354 A 11/2000 Ban
6,381,668 B1 4/2002 Lunteren
6,430,650 B1 8/2002 Miyauchi
6,571,312 B1 5/2003 Sugai
6,763,424 B2 7/2004 Conley
6,892,287 B1 5/2005 Millard
6,895,464 B2 5/2005 Chow
7,096,378 B2 8/2006 Stence et al.
7,120,729 B2 10/2006 Gonzalez
7,339,823 B2 3/2008 Nakayama et al.
7,383,375 B2 6/2008 Sinclair
7,404,031 B2 7/2008 Oshima
7,406,563 B1 7/2008 Nagshain
7,409,489 B2 8/2008 Sinclair
7,519,869 B2 4/2009 Mizuno
7,552,272 B2 6/2009 Gonzalez
7,555,628 B2 6/2009 Bennett
7,581,078 B2 8/2009 Ware
7,631,138 B2 12/2009 Gonzalez
7,702,846 B2 4/2010 Nakanishi et al.
7,702,948 B1 4/2010 Kalman
7,710,777 B1 5/2010 Mintierth
7,739,444 B2 6/2010 Sinclair
7,747,813 B2 6/2010 Danilak
7,752,381 B2 7/2010 Wong
7,801,561 B2 9/2010 Parikh et al.
7,809,900 B2 10/2010 Danilak
7,814,262 B2 10/2010 Sinclair
7,818,489 B2 10/2010 Karamcheti et al.
7,836,244 B2 11/2010 Kim et al.
7,861,122 B2 12/2010 Cornwell et al.
7,877,540 B2 1/2011 Sinclair
7,898,855 B2 3/2011 Merry
7,904,619 B2 3/2011 Danilak
7,904,681 B1 3/2011 Bappe
7,934,074 B2 4/2011 Lee
7,941,692 B2 5/2011 Royer et al.
7,970,983 B2 6/2011 Nochimowski
7,984,233 B2 7/2011 Sinclair
7,991,944 B2 8/2011 Lee et al.
8,001,318 B1 8/2011 Iyer
8,024,545 B2 9/2011 Kim et al.
8,046,524 B2 10/2011 Tringali
8,055,833 B2 11/2011 Danilak et al.
8,065,471 B2 11/2011 Yano et al.
8,065,473 B2 11/2011 Ito et al.
8,068,365 B2 11/2011 Kim
8,069,284 B2 11/2011 Oh
8,072,463 B1 12/2011 Van Dyke
8,074,022 B2 12/2011 Okin et al.
8,082,389 B2 12/2011 Fujibayashi
8,086,790 B2 12/2011 Roohparvar
8,099,581 B2 1/2012 Bennett
8,099,632 B2 1/2012 Tringali
8,140,821 B1 3/2012 Raizen
8,195,912 B2 6/2012 Flynn
8,219,776 B2 7/2012 Forhan
8,285,918 B2 10/2012 Maheshwari
8,291,151 B2 10/2012 Sinclair
8,291,295 B2 10/2012 Harari
8,301,861 B2 10/2012 Reiter
8,341,339 B1 12/2012 Boyle
8,347,042 B2 1/2013 You
8,386,700 B2 2/2013 Olbrich
8,402,249 B1 3/2013 Zhu
8,423,710 B1 4/2013 Gole
8,495,280 B2 7/2013 Kang
8,539,197 B1 9/2013 Marshall
8,572,331 B2 10/2013 Shalvi
8,601,202 B1 12/2013 Melcher
8,621,137 B2 12/2013 Olbrich
8,626,989 B2 1/2014 Van Aken
8,645,634 B1 2/2014 Cox et al.
8,668,894 B2 3/2014 Liu et al.
8,700,961 B2 4/2014 Lassa
8,886,899 B1 11/2014 Bao
8,898,410 B1 11/2014 Ehrenberg
8,954,708 B2 2/2015 Kim
8,959,307 B1 2/2015 Bruce
8,996,796 B1 3/2015 Karamcheti
9,015,401 B2 * 4/2015 Hars .................. G06F 12/0246
711/103
9,063,844 B2 6/2015 Higgins
9,123,443 B2 9/2015 Chung
9,128,624 B2 9/2015 Ng
9,134,918 B2 9/2015 Yurzola
9,176,864 B2 11/2015 Gorobets
9,229,854 B1 1/2016 Kuzmin et al.

(56) References Cited

U.S. PATENT DOCUMENTS

| | | | |
|---|---|---|---|
| 9,239,781 | B2 | 1/2016 | Jones |
| 9,286,198 | B2 | 3/2016 | Bennett |
| 9,329,986 | B2 | 5/2016 | Li |
| 9,335,939 | B2 | 5/2016 | Bennett et al. |
| 9,348,749 | B2 | 5/2016 | Choi |
| 9,378,149 | B1 | 6/2016 | Bonwick |
| 9,383,926 | B2 | 7/2016 | Law |
| 9,400,749 | B1 | 7/2016 | Kuzmin et al. |
| 9,405,621 | B2 | 8/2016 | Yu |
| 9,519,578 | B1 | 12/2016 | Kuzmin et al. |
| 9,542,118 | B1 | 1/2017 | Lercari et al. |
| 9,565,269 | B2 | 2/2017 | Malwankar |
| 9,575,672 | B2 | 2/2017 | Yamamoto |
| 9,588,904 | B1 | 3/2017 | Lercari et al. |
| 9,652,376 | B2 | 5/2017 | Kuzmin et al. |
| 9,696,917 | B1 | 7/2017 | Sareena et al. |
| 9,710,377 | B1 | 7/2017 | Kuzmin et al. |
| 9,727,454 | B2 | 8/2017 | Kuzmin et al. |
| 9,734,086 | B2 | 8/2017 | Flynn |
| 9,785,572 | B1 | 10/2017 | Lercari et al. |
| 9,846,541 | B2 | 12/2017 | Miyamoto et al. |
| 9,858,008 | B2 | 1/2018 | Liu |
| 10,048,884 | B2 | 8/2018 | Mylly |
| 10,067,866 | B2 | 9/2018 | Sutardja |
| 10,445,229 | B1 | 10/2019 | Kuzmin et al. |
| 10,552,058 | B1 | 2/2020 | Jadon et al. |
| 10,552,085 | B1 | 2/2020 | Chen et al. |
| 10,642,505 | B1 | 5/2020 | Kuzmin |
| 10,642,748 | B1 | 5/2020 | Lercari |
| 10,838,853 | B1 | 11/2020 | Kuzmin |
| 10,884,915 | B1 | 1/2021 | Kuzmin |
| 10,915,458 | B1 | 2/2021 | Lercari |
| 10,956,082 | B1 | 3/2021 | Kuzmin |
| 10,977,188 | B1 | 4/2021 | Lercari |
| 10,983,907 | B1 | 4/2021 | Kuzmin |
| 10,996,863 | B1 | 5/2021 | Kuzmin |
| 11,003,586 | B1 | 5/2021 | Lercari |
| 11,023,315 | B1 | 6/2021 | Jadon |
| 11,023,386 | B1 | 6/2021 | Lercari |
| 11,023,387 | B1 | 6/2021 | Lercari |
| 11,048,643 | B1 | 6/2021 | Lercari |
| 11,068,408 | B2 | 7/2021 | Kim |
| 11,074,175 | B1 | 7/2021 | Kuzmin |
| 11,080,181 | B1 | 8/2021 | Kuzmin |
| 11,086,789 | B1 | 8/2021 | Lercari |
| 11,100,006 | B1 | 8/2021 | Lercari |
| 11,163,492 | B2 | 11/2021 | Kamran |
| 11,175,984 | B1 | 11/2021 | Lercari |
| 11,188,457 | B1 | 11/2021 | Kuzmin |
| 11,216,365 | B1 | 1/2022 | Kuzmin |
| 11,221,959 | B1 | 1/2022 | Lercari |
| 11,221,960 | B1 | 1/2022 | Lercari |
| 11,221,961 | B1 | 1/2022 | Lercari |
| 11,249,652 | B1 | 2/2022 | Kuzmin |
| 11,314,636 | B1 | 4/2022 | Kuzmin |
| 11,334,476 | B2 | 5/2022 | Kuzmin |
| 11,347,638 | B1 | 5/2022 | Kuzmin |
| 11,347,639 | B1 | 5/2022 | Kuzmin |
| 11,354,234 | B1 | 6/2022 | Kuzmin |
| 11,354,235 | B1 | 6/2022 | Kuzmin |
| 11,449,240 | B1 | 9/2022 | Jadon |
| 11,487,678 | B2 | 11/2022 | Park |
| 11,500,766 | B2 | 11/2022 | Bueb |
| 11,544,183 | B1 | 1/2023 | Kuzmin |
| 11,580,030 | B2 | 2/2023 | Das |
| 11,675,708 | B1 | 6/2023 | Lercari |
| 11,704,237 | B1 | 7/2023 | Kuzmin |
| 11,762,766 | B1 | 9/2023 | Kuzmin |
| 11,899,575 | B1 | 2/2024 | Kuzmin |
| 2003/0028733 | A1 | 2/2003 | Tsunoda et al. |
| 2003/0037071 | A1 | 2/2003 | Harris |
| 2003/0065866 | A1 | 4/2003 | Spencer |
| 2003/0188032 | A1 | 10/2003 | Solomon |
| 2004/0083335 | A1 | 4/2004 | Gonzalez |
| 2005/0073844 | A1 | 4/2005 | Gonzalez |

| | | | |
|---|---|---|---|
| 2005/0073884 | A1 | 4/2005 | Gonzalez |
| 2005/0144367 | A1 | 6/2005 | Sinclair |
| 2005/0144413 | A1 | 6/2005 | Kuo et al. |
| 2005/0160227 | A1 | 7/2005 | Todd |
| 2005/0193161 | A1 | 9/2005 | Lee |
| 2005/0248993 | A1 | 11/2005 | Lee |
| 2006/0004957 | A1 | 1/2006 | Hand, III |
| 2006/0022171 | A1 | 2/2006 | Leist |
| 2006/0155920 | A1 | 7/2006 | Smith |
| 2007/0019481 | A1 | 1/2007 | Park |
| 2007/0033378 | A1 | 2/2007 | Sinclair |
| 2007/0046681 | A1 | 3/2007 | Nagashima |
| 2007/0058431 | A1 | 3/2007 | Chung et al. |
| 2007/0091497 | A1 | 4/2007 | Mizuno |
| 2007/0136555 | A1 | 6/2007 | Sinclair |
| 2007/0143569 | A1 | 6/2007 | Sanders |
| 2007/0168321 | A1 | 7/2007 | Saito |
| 2007/0233939 | A1 | 10/2007 | Kim |
| 2007/0260811 | A1 | 11/2007 | Merry, Jr. et al. |
| 2007/0260841 | A1 | 11/2007 | Hampel |
| 2007/0283428 | A1 | 12/2007 | Ma et al. |
| 2007/0294496 | A1 | 12/2007 | Goss |
| 2008/0005502 | A1 | 1/2008 | Kanai |
| 2008/0034153 | A1 | 2/2008 | Lee |
| 2008/0082596 | A1 | 4/2008 | Gorobets |
| 2008/0126720 | A1 | 5/2008 | Danilak |
| 2008/0126724 | A1 | 5/2008 | Danilak |
| 2008/0147964 | A1 | 6/2008 | Chow et al. |
| 2008/0155204 | A1 | 6/2008 | Qawami et al. |
| 2008/0189485 | A1 | 8/2008 | Jung |
| 2008/0189490 | A1 | 8/2008 | Cheon |
| 2008/0195833 | A1 | 8/2008 | Park |
| 2008/0201517 | A1 | 8/2008 | Kuhne |
| 2008/0209114 | A1 | 8/2008 | Chow |
| 2008/0256287 | A1 | 10/2008 | Lee |
| 2008/0294813 | A1 | 11/2008 | Gorobets |
| 2008/0307192 | A1 | 12/2008 | Sinclair |
| 2008/0320476 | A1 | 12/2008 | Wingard |
| 2009/0036163 | A1 | 2/2009 | Kimbrell |
| 2009/0044190 | A1 | 2/2009 | Tringali |
| 2009/0046533 | A1 | 2/2009 | Jo |
| 2009/0083478 | A1 | 3/2009 | Kunimatsu |
| 2009/0089482 | A1 | 4/2009 | Traister |
| 2009/0089490 | A1 | 4/2009 | Ozawa et al. |
| 2009/0119529 | A1 | 5/2009 | Kono |
| 2009/0138671 | A1 | 5/2009 | Danilak |
| 2009/0144497 | A1 | 6/2009 | Withers |
| 2009/0172219 | A1 | 7/2009 | Mardiks |
| 2009/0172246 | A1 | 7/2009 | Afriat |
| 2009/0172250 | A1 | 7/2009 | Allen et al. |
| 2009/0172257 | A1 | 7/2009 | Prins et al. |
| 2009/0172499 | A1 | 7/2009 | Olbrich |
| 2009/0182964 | A1 | 7/2009 | Greiner |
| 2009/0198946 | A1 | 8/2009 | Ebata |
| 2009/0210616 | A1 | 8/2009 | Karamcheti |
| 2009/0210636 | A1 | 8/2009 | Karamcheti |
| 2009/0216992 | A1 | 8/2009 | Greiner |
| 2009/0240903 | A1 | 9/2009 | Sauber |
| 2009/0254689 | A1 | 10/2009 | Karamcheti |
| 2009/0254705 | A1 | 10/2009 | Abali et al. |
| 2009/0271562 | A1 | 10/2009 | Sinclair |
| 2009/0292839 | A1 | 11/2009 | Oh |
| 2009/0300015 | A1 | 12/2009 | Kazan et al. |
| 2009/0327602 | A1 | 12/2009 | Moore et al. |
| 2010/0011085 | A1 | 1/2010 | Taguchi |
| 2010/0011186 | A1 | 1/2010 | Bennett |
| 2010/0023566 | A1 | 1/2010 | Minamino |
| 2010/0030946 | A1 | 2/2010 | Kano |
| 2010/0042655 | A1 | 2/2010 | Tse et al. |
| 2010/0049908 | A1 | 2/2010 | Gonzalez |
| 2010/0083050 | A1 | 4/2010 | Ohyama |
| 2010/0106734 | A1 | 4/2010 | Calder |
| 2010/0115172 | A1 | 5/2010 | Gillingham et al. |
| 2010/0125702 | A1 | 5/2010 | Lee |
| 2010/0161882 | A1 | 6/2010 | Stern et al. |
| 2010/0162012 | A1 | 6/2010 | Cornwell et al. |
| 2010/0182838 | A1 | 7/2010 | Kim et al. |
| 2010/0191779 | A1 | 7/2010 | Hinrichs |
| 2010/0199065 | A1 | 8/2010 | Kaneda |

(56) References Cited

U.S. PATENT DOCUMENTS

2010/0211737 A1 8/2010 Flynn
2010/0241866 A1 9/2010 Rodorff
2010/0262761 A1 10/2010 Borchers et al.
2010/0262762 A1 10/2010 Borchers
2010/0262765 A1 10/2010 Cheon
2010/0262773 A1 10/2010 Borchers
2010/0281230 A1 11/2010 Rabii et al.
2010/0287217 A1 11/2010 Borchers et al.
2010/0287327 A1 11/2010 Li
2010/0287332 A1 11/2010 Koshiyama
2010/0299494 A1 11/2010 Van Acht
2010/0329011 A1 12/2010 Lee et al.
2011/0033548 A1 2/2011 Kimmel et al.
2011/0041039 A1 2/2011 Harari
2011/0055445 A1 3/2011 Gee et al.
2011/0066792 A1 3/2011 Shaeffer
2011/0125956 A1 5/2011 Danilak
2011/0126045 A1 5/2011 Bennett
2011/0138114 A1 6/2011 Yen
2011/0153911 A1 6/2011 Sprouse
2011/0153917 A1 6/2011 Maita
2011/0161784 A1 6/2011 Sellinger et al.
2011/0167199 A1 7/2011 Danilak
2011/0197014 A1 8/2011 Yeh
2011/0197023 A1 8/2011 Iwamitsu et al.
2011/0231623 A1 9/2011 Goss
2011/0238890 A1 9/2011 Sukegawa
2011/0238892 A1 9/2011 Tsai
2011/0238943 A1 9/2011 Devendran et al.
2011/0264843 A1 10/2011 Haines
2011/0271032 A1 11/2011 Yamada
2011/0276756 A1 11/2011 Bish et al.
2011/0283043 A1 11/2011 Schuette
2011/0289263 A1 11/2011 McWilliams
2011/0296089 A1 12/2011 Seol
2011/0296133 A1 12/2011 Flynn et al.
2011/0302477 A1 12/2011 Goss
2011/0314209 A1 12/2011 Eckstein
2012/0023144 A1* 1/2012 Rub .................... G06F 12/0246 711/E12.008
2012/0033519 A1 2/2012 Confalonieri et al.
2012/0054419 A1 3/2012 Chen
2012/0059972 A1 3/2012 Chen
2012/0066441 A1 3/2012 Weingarten
2012/0072654 A1 3/2012 Olbrich
2012/0072807 A1 3/2012 Cornwell
2012/0079174 A1 3/2012 Nellans
2012/0096217 A1 4/2012 Son
2012/0131270 A1 5/2012 Hemmi
2012/0131381 A1 5/2012 Eleftheriou
2012/0155492 A1 6/2012 Abel
2012/0159039 A1 6/2012 Kegel et al.
2012/0191921 A1 7/2012 Shaeffer
2012/0198123 A1 8/2012 Post
2012/0198128 A1 8/2012 Van Aken
2012/0198129 A1 8/2012 Van Aken
2012/0204079 A1 8/2012 Takefman et al.
2012/0221776 A1 8/2012 Yoshihashi
2012/0246394 A1 9/2012 Ou
2012/0284587 A1 11/2012 Yu
2012/0303875 A1 11/2012 Benhase
2013/0007343 A1 1/2013 Rub
2013/0013852 A1 1/2013 Hou et al.
2013/0019062 A1 1/2013 Bennett et al.
2013/0024460 A1 1/2013 Peterson
2013/0073793 A1 3/2013 Yamagishi
2013/0073816 A1 3/2013 Seo et al.
2013/0097236 A1 4/2013 Khorashadi
2013/0111295 A1 5/2013 Li et al.
2013/0111298 A1 5/2013 Seroff
2013/0124793 A1 5/2013 Gyl et al.
2013/0124807 A1 5/2013 Nielsen
2013/0138868 A1 5/2013 Seroff
2013/0145111 A1 6/2013 Murukani
2013/0166820 A1 6/2013 Batwara
2013/0166824 A1 6/2013 Shim
2013/0166825 A1 6/2013 Kim et al.
2013/0227201 A1 8/2013 Talagala
2013/0232297 A1 9/2013 Tanaka
2013/0242425 A1 9/2013 Zayas et al.
2013/0275682 A1 10/2013 Ramanujan
2013/0282055 A1 10/2013 Parker
2013/0290619 A1 10/2013 Knight
2013/0297852 A1 11/2013 Fai et al.
2013/0297880 A1 11/2013 Flynn
2013/0326117 A1 12/2013 Aune
2013/0332656 A1 12/2013 Kandiraju
2013/0339580 A1 12/2013 Brandt
2014/0040550 A1 2/2014 Nale
2014/0047210 A1 2/2014 Cohen
2014/0047300 A1 2/2014 Liang
2014/0048197 A1 2/2014 Leppala
2014/0101371 A1 4/2014 Nguyen et al.
2014/0122781 A1 5/2014 Smith et al.
2014/0189207 A1 7/2014 Sinclair
2014/0189209 A1 7/2014 Sinclair et al.
2014/0195725 A1 7/2014 Bennett
2014/0208004 A1 7/2014 Cohen
2014/0208062 A1 7/2014 Cohen
2014/0215129 A1 7/2014 Kuzmin et al.
2014/0237168 A1 8/2014 Prins
2014/0297949 A1 10/2014 Nagawaka
2014/0317346 A1 10/2014 Moon
2015/0046670 A1 2/2015 Kim
2015/0067297 A1 3/2015 Arroyo et al.
2015/0074342 A1 3/2015 Bao
2015/0089119 A1 3/2015 Conklin
2015/0113203 A1 4/2015 Dancho et al.
2015/0134930 A1 5/2015 Huang et al.
2015/0149789 A1 5/2015 Seo et al.
2015/0193148 A1 7/2015 Miwa et al.
2015/0212938 A1 7/2015 Chen et al.
2015/0234741 A1* 8/2015 Conklin .............. G06F 12/0246 711/103
2015/0261456 A1 9/2015 Alcantara et al.
2015/0263978 A1 9/2015 Olson
2015/0309734 A1 10/2015 Brondjik
2015/0324264 A1 11/2015 Vidypoornachy et al.
2015/0339187 A1 11/2015 Sharon
2015/0347041 A1 12/2015 Kotte et al.
2015/0347291 A1 12/2015 Choi
2015/0347296 A1 12/2015 Kotte et al.
2015/0355965 A1 12/2015 Peddle
2015/0363120 A1 12/2015 Chen
2015/0364218 A1* 12/2015 Frayer ................. G06F 11/2094 714/6.13
2015/0378613 A1 12/2015 Koseki
2015/0378886 A1 12/2015 Nemazie
2016/0011818 A1 1/2016 Hashimoto
2016/0018998 A1 1/2016 Mohan et al.
2016/0019148 A1 1/2016 Vekiarides
2016/0019159 A1 1/2016 Ueda
2016/0026564 A1 1/2016 Manning
2016/0070496 A1 3/2016 Cohen
2016/0092116 A1 3/2016 Liu
2016/0147669 A1 5/2016 Huang
2016/0179664 A1 6/2016 Camp
2016/0202910 A1 7/2016 Ravimohan
2016/0253091 A1 9/2016 Ayyavu
2016/0342509 A1 11/2016 Kotte et al.
2016/0357462 A1 12/2016 Nam et al.
2016/0364179 A1 12/2016 Tsai et al.
2017/0031699 A1 2/2017 Banerjee et al.
2017/0075620 A1 3/2017 Yamamoto
2017/0109078 A1 4/2017 Shaharabany
2017/0139838 A1 5/2017 Tomlin
2017/0192901 A1 7/2017 Coffin
2017/0199703 A1 7/2017 Ravimohan
2017/0220287 A1 8/2017 Wei
2017/0364445 A1 12/2017 Allison
2018/0046480 A1 2/2018 Dong
2019/0377633 A1* 12/2019 Perlmutter .......... G06F 11/1076
2020/0363996 A1 11/2020 Kanno
2021/0064293 A1 3/2021 Cho

(56) References Cited

U.S. PATENT DOCUMENTS

| | | | | |
|---|---|---|---|---|
| 2021/0132827 A1* | 5/2021 | Helmick | ............... | G06F 3/0614 |
| 2024/0070066 A1* | 2/2024 | Choi | .................. | G06F 11/1068 |
| 2024/0078027 A1* | 3/2024 | Mun | .................. | G06F 11/1068 |

FOREIGN PATENT DOCUMENTS

| | | | | | |
|---|---|---|---|---|---|
| JP | 2001051889 | A | 2/2001 | | |
| JP | 2008176606 | | 7/2008 | | |
| JP | 2011123863 | A | 6/2011 | | |
| JP | 2011203916 | A | 10/2011 | | |
| WO | WO-2006065668 | A2 | 6/2006 | | |
| WO | WO2007019220 | A2 | 2/2007 | | |
| WO | WO2008082996 | | 7/2008 | | |
| WO | 2009084724 | A1 | 7/2009 | | |
| WO | 2009100149 | A1 | 8/2009 | | |
| WO | WO2010027983 | A1 | 3/2010 | | |
| WO | WO-2014105705 | A2 * | 7/2014 | ......... | G06F 12/0246 |

OTHER PUBLICATIONS

Petition for IPR, 2025-01289, U.S. Pat. No. 11,681,614, 103 Pages, Jul. 14, 2025.
Petition for IPR, 2025-01321, U.S. Pat. No. 11,709,772, 87 Pages, Jul. 17, 2025.
Petition for IPR, 2025-01350, U.S. Pat. No. 11,740,801, 100 Pages, Jul. 28, 2025.
Litz Declaration in support of petition for IPR, 2025-01266, U.S. Pat. No. 11,544,183, 85 Pages, Jul. 9, 2025.
Litz Declaration in support of petition for IPR, 2025-01289, U.S. Pat. No. 11,681,614 150 Pages, Jul. 11, 2025.
Litz Declaration in support of petition for IPR2025-01321, U.S. Pat. No. 11,709,772, 122 Pages, Jul. 16, 2025.
Litz Declaration in support of petition for IPR, 2025-01350, U.S. Pat. No. 11,740,801, 120 Pages, Jul. 28, 2025.
Patent Infringement Defendant Samsung's Invalidity Contentions, *Radian Memory Systems, LLC* v. *Samsung Electronincs Co. Ltd*, Case Nos. 2:24-cv-01073-JRG, ED Tex, 115 Pages, Jun. 18, 2025.
Petition for IPR, 2025-01376, U.S. Pat. No. 11,307,995, 110 Pages, Aug. 5, 2025.
Litz Declaration in support of petition For IPR, 2025-01376, U.S. Pat. No. 11,307,995, 111 Pages, Aug. 5, 2025.
Petition for IPR, 2025-01377, U.S. Pat. No. 11,347,656, 135 Pages, Aug. 5, 2025.
Litz Declaration in support of petition for IPR, 2025-01377, U.S. Pat. No. 11,347,656, 142 Pages, Aug. 5, 2025.
Petition for IPR, 2025-01378, U.S. Pat. No. 11,347,657, 116 Pages, Aug. 5, 2025.
Litz Declaration in support of petition for IPR, 2025-01378, U.S. Pat. No. 11,347,657, 111 Pages, Aug. 5, 2025.
T10/BSR INCITS 536 Revision 1a, working draft revision, Information technology—Zoned Block Commands (ZBC), May 15, 2014, 47 Pages.
T10/BSR INCITS 506 Revision 2, working draft revision, Information technology—SCSI Block Commands—4 (SBC-4), May 20, 2014, 358 Pages.
T10/BSR INCITS 513, Revision 37, May 17, 2014, Information technology—SCSI Primary Commands—4 (SPC-4), 1010 Pages.
Infringement Defendant Samsung's Invalidity Assertion m Charts For U.S. Pat. No. 11,544,183, Jun. 18, 2025, 165 Pages.
Infringement Defendant Samsung's Invalidity Assertion Claim Charts For U.S. Pat. No. 11,709,772, Jun. 18, 2025, 362 Pages.
Infringement Defendant Samsung's Invalidity Assertion Claim Charis For U.S. Pat. No. 11,681,614, Jun. 18, 2025, 377 Pages.
Infringement Defendant Samsung's Invalidity Assertion Claim Charts For U.S. Pat. No. 11,740,801, Jun. 18, 2025, 304 Pages.
Infringement Defendant Samsung's Invalidity Assertion Claim Charts For U.S. Pat. No. 11,347,656, Jun. 18, 2025, 290 Pages.
Infringement Defendant Samsung's Invalidity Assertion Claim Charts For U.S. Pat. No. 11,347,657, Jun. 18, 2025, 310 Pages.
Infringement Defendant Samsung's Invalidity Assertion Claim Charts For U.S. Pat. No. 11,307,995, Jun. 18, 2025, 344 Pages.
NVM Express, Version 1.0b, Jul. 12, 2011, pp. 1-126, published at http://www.nvmexpress.org/resources/ by the NVM Express Work Group.
John D. Strunk, "Hybrid Aggregates: Combining SSDs and HDDs in a single storage pool," Dec. 15, 2012, ACM SIGOPS Operating Systems Review archive, vol. 46 Issue 3, Dec. 2012, pp. 50-56.
Yiying Zhang, Leo Prasath Arulraj, Andrea C. Arpaci-Dusseau, Remzi H. Arpaci-Dusseau, Computer Sciences Department, University of Wisconsin-Madison, "De-indirection for Flash-based SSDs with NamelessWrites," published at https://www.usenix.org/conference/fast12/de-indirection-flash-based-ssds-nameless-writes, Feb. 7, 2012, pp. 1-16.
Andrea C. Arpaci-Dusseau, Remzi H. Arpaci-Dusseau, and Vijayan Prabhakaran, "ResearchRemoving The Costs Of Indirection in Flash-based SSDs with NamelessWrites," Jun. 22, 2010, pp. 1-5, published at www.cs.wisc.edu/wind/Publications/hotstorage10-nameless.pdf by Computer Sciences Department, University of Wisconsin-Madison and Microsoft Research.
Stan Park and Kai Shen, Department of Computer Science, University of Rochester, "FIOS: A Fair, Efficient Flash I/O Scheduler," Feb. 23, 2012, pp. 1-15, published at www.usenix.org/event/fast12/tech/full_papers/Park.pdf by the Advanced Computing Systems Association, Fast'12, 10th Usenix Conference On File And Storage Technologies, San Jose.
Eric Seppanen, Matthew T. O'Keefe, David J. Lilja, Department of Electrical and Computer Engineering, University of Minnesota, "High Performance Solid State Storage Under Linux," Apr. 10, 2010, MSST '10 Proceedings of the 2010 IEEE 26th Symposium on Mass Storage Systems and Technologies (MSST), pp. 1-12.
Xiangyong Ouyangyz, David Nellansy, Robert Wipfely, David Flynny, Dhabaleswar K. Pandaz, "Beyond Block I/O: Rethinking Traditional Storage Primitives," Aug. 20, 2011, published at http://www.sciweavers.org/read/beyond-block-i-o-rethinking-traditional-storage-primitives-327868, by Fusion IO and the Ohio State University.
Intel Corp, PCI-SIG SR-IOV Primer—An Introduction to SR-IOV Technology,: 321211-002, Revision 2.5, Jan. 2011, 28 pages.
Open NAND Flash Interface (ONFI), specification, version 2.0, 174 pages, Feb. 27, 2008.
Open NAND Flash Interface (ONFI), specification, version 3.1, 296 pages, Sep. 19, 2012.
NVM Express, V. 1.2.1, 217 pages, Jun. 3, 2016.
Garth Gibson, Greg Ganger, "Principles of Operation for Shingled Disk Devices," Canregie Mellon Parallel Data Laboratory, CMU-PDL-11-107, Apr. 2011, 9 pages.
Li-Pin Chang, "Hybrid Solid State Disks: Combining Heterogeneous NAND Flash in Large SSDs," National Chiao-Tung University, Taiwan, ASPDAC 2008, 26 pages.
Hua Wangx, Ping Huangxz, Shuang Hex, Ke Zhoux, Chunhua Lix, and Xubin He, "A Novel I/O Scheduler for SSD with Improved Performance and Lifetime," Mass Storage Systems and Technologies (MSST), 2013 IEEE 29th Symposium on, May 6-10, 2013, 5 pages.
Altera Corp. et al., "Hybrid Memory Cube" specification, 2012, 122 pages.
JEDEC Standard, JESD229, Wide IO, Dec. 2011, 74 pages.
Li-Pin Chang, "Hybrid Solid State Disks: Combining Heterogeneous NAND Flash in Large SSDs," National Chiao-Tung University, Taiwan, 978-1-4244-1922-7/08, 2008 IEEE, 6 pages.
Optimizing NAND Flash Performance, Flash Memory Summit, Santa Clara, CA USA Aug. 2008, Ryan Fisher, pp. 1-23.
High-Speed NAND Flash: Design Considerations to Maximize Performance, Flash Memory Summit, Santa Clara, CA USA Aug. 11, 2009, , Robert Pierce, pp. 1-19.
NAND 201: An Update on the Continued Evolution of NAND Flash, Jim Cooke, Micron White Paper, Sep. 6, 2011, pp. 1-10.
Spansion SLC NAND Flash Memory for Embedded, data sheet, S34ML01G1, S34ML02G1, S34ML04G1, Sep. 6, 2012, pp. 1-73.
Wang et al., "An Efficient Design and Implementation of LSM-Tree based Key-Value Store on Open Channel SSD,"EuroSys '14 Pro-

(56) References Cited

OTHER PUBLICATIONS ceedings of the Ninth European Conference on Computer Systems, Article No. 16, Apr. 14, 2014, 14 pages.
Ouyang et al., "SDF: Software-defined flash for web-scale internet storage systems," Computer Architecture News—ASPLOS '14, vol. 42 Issue 1, Mar. 2014, 14 pages.
Macko et al., "Tracking Back References in a Write-Anywhere File System," FAST'10 Proceedings of the 8th USENIX conference on File and storage technologies, 14 pages, Feb. 23, 2010.
Ohad, Rodeh, "IBM Research Report Defragmentation Mechanisms for Copy-on-Write File-systems," IBM white paper, Apr. 26, 2010, 10 pages, available at domino.watson.ibm.com/library/CyberDig.nsf/papers/298A0EF3C2CDB17B852577070056B41F/$File/rj10465.pdf.
Michael Cornwell, "Anatomy of a solid-state drive," Oct. 17, 2012, pp. 1-13, https://queue.acm.org/detail.cfm?id=2385276.
Chang et al., "An efficient FTL design for multi-chipped solid-state drives," 2010 IEEE 16th Int'l. Conference on Embedded and Real-Time Computing Systems and Applications, 2010, pp. 237-246.
Bang et al., "A memory hierarchy-aware metadata management technique for solid state disks," 2011 IEEE 54th International Midwest Symposium On Circuits And Systems, 2011, pp. 1-4.
RD527033 A, Mar. 10, 2008.
C. Kuo et al., "Detecting Solid-State Disk Geometry for Write Pattern Optimization," 2011 IEEE 17th International Conference on Embedded and Real-Time Computing Systems and Applications, 2011, pp. 89-94.
S. Im and D. Shin, "Flash-aware RAID techniques for dependable and high-performance flash memory SSD," IEEE Transactions On Computers, V. 60, No. 1, pp. 80-92, Jan. 2011.
J. Kim et al., "A methodology for extracting performance parameters in solid state disks (SSDs)," 2009 IEEE International Symposium on Modeling, Analysis & Simulation of Computer and Telecommunication Systems, 2009, pp. 1-10.
W. Lafi et al., "High level modeling and performance evaluation of address mapping in NAND flash memory," 2009 16th IEEE International Conference on Electronics, Circuits and Systems (ICECS 2009), Yasmine Hammamet, 2009, pp. 659-662.
Tennison, RD, "Memory space mapping using virtual addressing to multiple sized memory units," IP.com, prior art database technical disclosure, Aug. 1, 1975.
Y. Hu et al., "Achieving page-mapping FTL performance at block-mapping FTL cost by hiding address translation," 2010 IEEE 26th Symposium on Mass Storage Systems and Technologies (MSST), Incline Village, NV, USA, May 3, 2010, pp. 1-12, doi: 10.1109/MSST.2010.5496970.
Kang et al., "A Superblock-based Flash Translation Layer for NAND Flash Memory," EMSOFT'06, Seoul, Korea, Oct. 22, 2006, ACM 1-59593-542-8/06/0010, pp. 161-170.
TN-29-28: Memory Management in NAND Flash Arrays, Micron publication, 2005, 10 pages, available from https://www.micron.com/-/media/client/global/documents/products/technical-note/nand-flash/tn2928.pdf.
Park et al., "A Reconfigurable FTL (Flash Translation Layer) Architecture for NAND Flash-Based Applications," 23 pages, ACM Transactions on Embedded Computing Systems, vol. 7, No. 4, Article 38, Publication date: Jul. 2008.
Gupta et al., "DFTL: A Flash Translation Layer Employing Demand-based Selective Caching of Page-level Address Mappings," ASPLOS'09, Mar. 7-11, 2009, Washington, DC, USA, 12 pages.
Ruia, Virtualization of Non-Volatile Ram, Texas A&M Masters Thesis, 77 pages, May 2015, available from: https://oaktrust.library.tamu.edu/bitstream/handle/1969.1/154981/RUIA-THESIS-2015.pdf?sequence=1&isAllowed=y.
Hsieh et al., "Efficient Identification of Hot Data for Flash Memory Storage Systems," ACM Transactions on Storage, vol. 2, No. 1, Feb. 2006, 19 Pages (pp. 22-40).
Wu et al., "An Adaptive Two-Level Management for the Flash Translation Layer in Embedded Systems ," https://dl.acm.org/doi/pdf/10.1145/1233501.1233624, Date of Publication: Nov. 9, 2006.
Grupp et al., "Characterizing Flash Memory: Anomalies, Observations, and Applications," https://dl.acm.org/doi/pdf/10.1145/1669112.1669118, Dec. 16, 2006.
Huang et al., "Unified Address Translation for Memory-Mapped SSDs with FlashMap," https://dl.acm.org/doi/10.1145/2749469.2750420, Jun. 15, 2015.
Bang et al., "A Memory Hierarchy-Aware Metadata Management Technique for Solid State Disks," https://ieeexplore.ieee.org/document/6026485, Aug. 10, 2011.

* cited by examiner

STORAGE DEVICE WITH ERASE UNIT LEVEL ADDRESS MAPPING

This document is a continuation of U.S. application Ser. No. 18/928,526, filed on Oct. 28, 2024, which in turn is a continuation of U.S. application Ser. No. 18/366,983, filed on Aug. 8, 2023 (issued on Dec. 10, 2024, as U.S. Pat. No. 12,164,421), which in turn is a continuation of U.S. application Ser. No. 17/952,230, filed on Sep. 24, 2022 (issued on Sep. 19, 2023, as U.S. Pat. No. 11,762,766), which in turn is a continuation of U.S. application Ser. No. 17/563,467, filed on Dec. 28, 2021 (issued on Nov. 1, 2022, as U.S. Pat. No. 11,487,656), which in turn is a continuation of U.S. application Ser. No. 16/751,925, filed on Jan. 24, 2020 (issued on Apr. 26, 2022, as U.S. Pat. No. 11,314,636), which in turn is a continuation of U.S. application Ser. No. 16/570,922, filed on Sep. 13, 2019 (issued on Nov. 30, 2021, as U.S. Pat. No. 11,188,457), which in turn is a continuation of U.S. application Ser. No. 15/621,888, filed on Jun. 13, 2017 (issued on Oct. 15, 2019, as U.S. Pat. No. 10,445,229), which in turn is a continuation of U.S. application Ser. No. 15/346,341, filed on Nov. 8, 2016 (issued on Jul. 18, 2017, as US No. U.S. Pat. No. 9,710,377), which in turn is a continuation of U.S. application Ser. No. 14/951,708, filed on Nov. 25, 2015 (issued on Dec. 13, 2016, as U.S. Pat. No. 9,519,578), which in turn is a continuation of U.S. application Ser. No. 14/047,193, filed on Oct. 7, 2013 (issued on Jan. 5, 2016, as U.S. Pat. No. 9,229,854), which in turn is a continuation in-part of U.S. Utility patent application Ser. No. 13/767,723, filed on Feb. 14, 2013 (issued on May 16, 2017, as U.S. Pat. No. 9,652,376), which in turn claims priority to U.S. Provisional Patent Application No. 61/757,464, filed on Jan. 28, 2013. Each of the aforementioned patent applications is hereby incorporated by reference.

This disclosure relates to storage systems and, more specifically, to the architecture and operation of storage systems that utilize multi-die and/or multi-plane memory.

BACKGROUND

NAND flash memory is one memory technology with granularity issues and latency issues that can constrain system performance. A conventional NAND flash memory device is typically characterized by programming and erasing latencies in the hundreds of microseconds, and little flexibility in the quantum of write read data and write data exchanged with memory. Thus, use of this type of memory is often characterized by substantial bus idle time and retrieval of excess data. Further, a program/erase ("P/E") asymmetry in NAND flash memory can further complicate latency, because data cannot be written to a previously-used memory location until an impacted erase unit ("EU") has been erased; in turn, an EU cannot be erased until all previously-written physical pages within that EU have been released, with still-active data being moved or scrapped as necessary. These and other maintenance operations, typically transparently managed by a memory controller, can result in delays occasioned by memory controller competition with host commands for memory bandwidth. Each of these issues is not necessarily unique to NAND flash memory and, to a lesser or greater extent, can affect different types of volatile and non-volatile memory.

To make more efficient use of memory, designers have increasingly turned to bus management techniques such as interleaving requests to multiple devices to improve bus utilization and to hide (or conceal) latency. Thus, for example, latency associated with a second memory access can be masked against the latency associated with a first, overlapping (parallel) memory access. With NAND flash memory in particular, multi-plane designs have emerged which permit accesses to data stored in parallel planes or arrays (typically two), but subject to certain addressing and/or timing restrictions. That is, because these devices typically use common input/output (IO) circuitry and address circuitry to handle requests, overlapping multi-plane access has traditionally been limited to situations where a common or base address is used for all planes.

Unfortunately, it is difficult to realize the benefits of multi-plane or multi-die architecture at an application or operating system level. That is to say, logical addresses typically arrive at the memory controller from the host as a stream of random accesses, and are sequentially assigned to first available physical space by the memory controller; as memory, particularly flash memory, is erased and recycled via read, write, wear leveling, garbage collection and other processes, sequential logical addresses become scattered throughout physical memory space. For multi-plane memory therefore, there is no practical mechanism for the host or memory controller to group related data in a manner geared for multi-plane access (i.e., there is no guarantee available physical addresses used for related data will be consistent with device multi-plane addressing restrictions). Thus, in practice, the benefits of multi-plane and multi-die capabilities tend to be restricted to multi-plane writes by a memory controller of coincidentally-related data uniquely for the purpose of bandwidth management, with read access by either the host and memory controller being inefficiently performed and largely restricted to independent, single page accesses. For both multi-die and multi-plane designs, as channel bandwidth continues to improve, the issues associated with a logical-to-physical translation later at the memory controller can be expected to create additional latency.

A need therefore exists for improvements that provide additional flexibility to systems and application designers. Ideally, such improvements would provide flexibility in storing and accessing multiple pages of data, for example, across multiple dies or planes. Applied to multi-plane memory, a need exists for techniques that permit effective use of multi-plane capabilities notwithstanding device IO and addressing restrictions. The present invention satisfies these needs and provides further, related advantages.

Figure 1A:
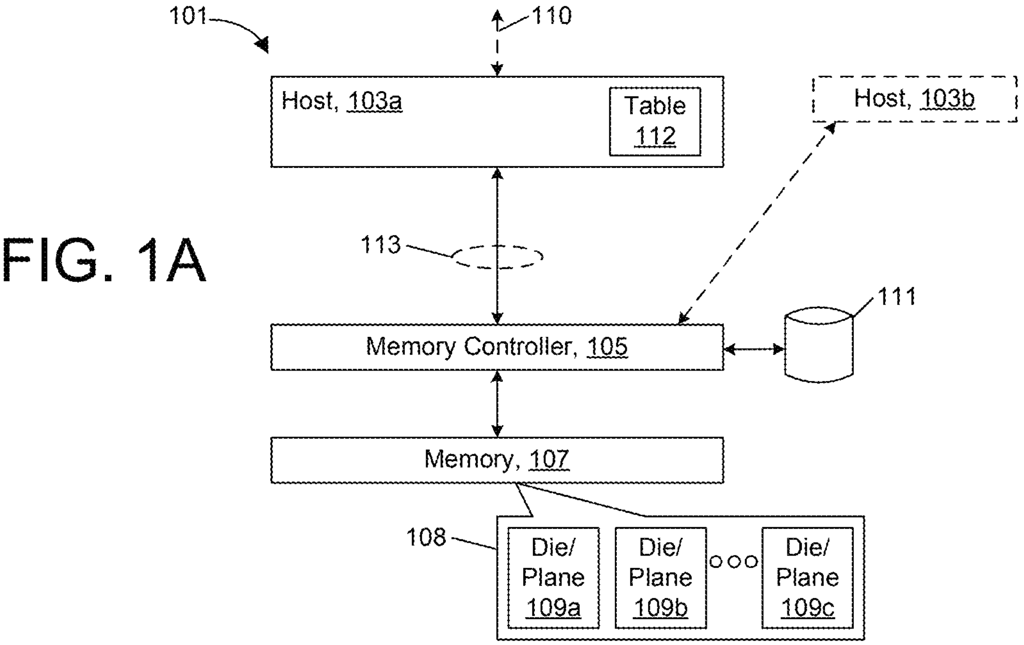
FIG. 1A is an illustrative diagram showing one or more hosts 103*a*/103*b*, a memory controller 105 and memory 107. These elements can be implemented together as a memory system having multiple dies and/or multiple planes.

The subject matter defined by the enumerated claims may be better understood by referring to the following detailed description, which should be read in conjunction with the accompanying drawings. This description of one or more particular embodiments, set out below to enable one to build and use various implementations of the technology set forth by the claims, is not intended to limit the enumerated claims, but to exemplify their application to certain methods and devices. The description set out below exemplifies methods supporting cooperative memory management between a host and a memory controller, and improved designs for a memory controller, host, and memory system. While the specific examples are presented, particularly in the context of flash memory, the principles described herein may also be applied to other methods, devices and systems as well.

DETAILED DESCRIPTION

This disclosure provides improvements in memory controller design, memory system design, host design, and related management methods. A memory controller maintains information pertaining to memory geometry, including dies present and/or whether memory supports multi-plane access and/or other extended capabilities. As a non-limiting example, a memory controller can provide data to the host which identifies multi-plane capabilities of a memory die. Optionally, the memory controller and/or host maintain information that that tracks each physical unit of memory managed by the memory controller. This information permits a host to track physical space allocation across multiple dies or planes. Optionally, a logical-to-physical (L2P) translation layer can reside primarily or entirely on a host. A host can thus be provided with the capability to control physical address assignment to organize memory layout (e.g., to direct new writes of data based on application or system level needs); for example, certain data types (e.g., consecutive media data) can be organized and stored directly by the host in a manner consistent with multi-plane device addressing restrictions. Note that the improvements discussed herein are not necessarily limited to NAND flash memory dies or devices; as one none limiting example, these techniques can also be applied to other memory forms such as shingled magnetic drives. Also, while these teachings are described in the context of multi-array memory with cross-array addressing restrictions, these teachings can be applied more generally in the case of multiple plane memory storage, e.g., to memory devices lacking addressing restrictions, multiple planes, multiple dies or other specific memory characteristics discussed herein.

More specifically, in one implementation, a memory controller exports memory array/die/device geometry, and therefore has an option to educate one or more hosts on multi-array, multi-die or multi-plane capabilities of each managed memory array. This export can be effectuated, for example, in response to an inquiry command from a host operating system during a device discovery phase. Then, with insight into geometry, a host can organize address space in a manner geared for improved memory access, e.g., according to a policy aimed at IO optimization for managing multiple or linked pages. Again, the actual presence in a system of particular memory geometries (e.g., multiple planes) is not a prerequisite for the host to apply the disclosed techniques.

In applying these techniques, where allocation requests allow, the host assigns physical space for writes so as to facilitate both immediate write accesses and later multiple page read access, all with the benefit of the improved throughput. For example, later accesses can be performed in a manner unencumbered by memory controller address translation requirements; for multi-plane memory and shingled drives, data placement can be pre-planned in a manner consistent with any inter-plane addressing restrictions for multi-array accesses. As should therefore be apparent, these techniques therefore provide operating systems and applications with significantly greater ability to utilize the full capabilities of certain (e.g., complex) memory architectures.

Note the symmetry benefit that differentiates this approach from a conventional approach where a flash translation layer (FTL) is relied on at the memory controller to remap logical writes to first-available physical space-when the host plans data access to be at known physical locations (i.e., across multiple devices, tracks, dies, planes, etc., where access can be overlapped), it manages data placement in a manner that it can later readily retrieve related information. This can be performed in a manner where the need for (and delay occasioned by) memory controller address translation or cross-array addressing restrictions (if present) become moot. The same planning and management benefits apply to many commands, for instance in the case of NAND flash, for writes, deallocate (page release), erase and potentially other commands. Importantly, while techniques presented below facilitate an architecture with a minimized FTL or no FTL at all in the memory controller, it is emphasized that reduced FTL practices are not required for all embodiments; that is, many of the techniques presented herein can also be used in implementations where the memory controller includes an FTL, such as in the context of a traditional NAND flash architecture.

In one embodiment, the memory controller/host interaction is augmented with specific commands directed to multi-array (e.g., multi-plane, die or track) IO capabilities. This command structure then permits the host to issue multi-array access commands via as a single operation rather than as a series of disassociated, single array commands. For example, such a command structure can be supported using an application program interface ("API") on the host side, and one or more extensions to a conventional command structure (e.g., NVMe for NAND flash memory) to support multi-plane operations. Utilizing physical addressing consistent with pertinent device addressing restrictions, this permits effective multi-array storage, retrieval, release and erasure notwithstanding any device IO or addressing restrictions.

This disclosure is organized as follows. A memory controller which maintains an information repository for running queries or otherwise to provide visibility to a host as to physical space management, and related system considerations will first be introduced. These capabilities help support direct use of physical addressing, referenced above. Second, some system options that leverage the capabilities of such a memory controller will then be discussed; for example, such a design optionally permits a host to direct certain memory management processes (e.g., garbage collection and wear leveling for NAND flash) in a manner that reduces competition of memory controller management functions with host-originated access requests. Note that the described devices, systems and techniques are exemplary, e.g., the presented techniques can be applied to host design, memory device or die design, to a memory controller or memory system, and to other memory technologies as described. Note also that the various embodiments and FIGS. are not mutually-exclusive, i.e., teachings described in connection with one FIG. for one embodiment of a component (e.g., a memory controller) are generally applicable to other embodiments of that component (for example, described in connection with a different FIG.), or with reciprocal components (such as a host). Finally, implementation and use of one or more memory devices, efficient interleaving across devices, dies or planes, a command infrastructure and some optional system operations will then be discussed.

I. INTRODUCTION

FIG. 1A provides a diagram 101 depicting interaction between one or more hosts 103*a*/103*b*, a memory controller 105 and memory 107. Note that two hosts are shown in the depicted system, one (103*b*) in dashed lines to indicate its optional presence. While the techniques herein can be implemented with any number of hosts, a typical implementation features a single host 103*a*, a memory controller 105 and memory 107 managed by the memory controller. These elements can be implemented together as a memory system in which the managed memory has multiple tracks, dies or planes (109*a* . . . 109*c*) suitable for parallel (or pipelined) access. Note that the host can include any form of processor, for example, a personal computer or smartphone CPU, or the CPU of a storage manager (e.g., of a network ready storage appliance). A dashed line 110 indicates that in some environments, the host's interaction with memory is governed by external communications (e.g., with one or more clients, not separately shown in FIG. 1A); for example, a network-ready device can support external communications (e.g., over the Internet or a wide area network or "WAN") where memory accesses are responsive to requests or other interactions with the clients.

As mentioned previously, the memory controller 105 optionally stores data 111 representing geometry of managed memory, such as particulars regarding the depicted multiple tracks/dies/planes 109*a* . . . 109*c*, such as number of tracks/dies/planes, volume of each such unit, addressing limitations and so forth. This information can also be made known a priori to the host, e.g., in an application-specific design such as where a host is preconfigured for operation with a specific memory device or devices. Whether already known by the host or stored by the memory controller 105 and sent to the host, the host 103*a* makes use of this information in building a table 112 which it uses to plan space assignment and the writing of data to the managed memory 108. As one relatively simple example, a host interacting with two-plane NAND flash memory can allocate blocks of storage for individual pages of data or for multiple pages of related data. The host would first ascertain the number or amount of 2-page data storage blocks needed (that should be reserved), and then would configure priority/usage information (e.g., rules) for use during run-time to perform space assignment and to perform maintenance operations. Note that strictly speaking, a configuration step as just referenced is not strictly required, i.e., a host could simply reserve physical addresses for linked or related data, and could then assign addresses as needed until the reserved space is exhausted. Whether initially dead-reckoned or variably determined, run-time management can be used to help adjust space allocation. For example, for a multi-plane embodiment, if single-plane space were to run low, the host could change the criteria used to determine which data will be stored across dies or planes as related data. Alternatively, the host could perform garbage collection, page release and/or erase operations so as to recycle currently unused space that could then be used for single-plane writes. If addresses reserved for multi-plane writes were to run low, the host could perform garbage collection on physical addresses assigned to multi-plane space or could change the threshold at which n-plane space is assigned. Once again, these functions are merely options, e.g., a host could simply assign related data locations if any such locations are available. Reserved space can also be dynamically varied during run-time if desired. For example, the host could free physical addresses reserved for multi-plane space for single plane writes, or vice-versa, depending on dynamic conditions. Clearly many examples exist. Again, while this example is rooted in the use of multi-plane operations, the host can use similar management techniques in managing operations across tracks or dies or in otherwise managing memory space allocated to multiple pages; for example, a host could assign the same physical address (or address offset) in each of multiple pages for related data that may be read at the same time, though this is not required in all embodiments. FIG. 1A also highlights signaling link 113 to indicate that host-to-memory communications can be in a variety of forms including serial-differential, network-based, packet based, parallel, single-ended, point-to-point or other communications formats. Without limitation, in one embodiment, the host 103*a* and the memory controller 105 are in the form of respective integrated circuits (ICs), coupled by conductive-path serial, differential links, with communications optionally compliant with a version of NVMe.

Based on information stored in the table 112, the host plans data storage in a manner conducive to true, host-initiated multi-track, multi-page, multi-plane or multi-die reads, that is, such that successive read requests are issued by the host with the direct physical addresses for related data. This permits the host to plan for pipelined use of a memory bus in a manner that optimizes the retrieval of related data needed by the host for a particular task. For example, a host needing to read linked data from multiple dies can issue a series of read requests to the memory controller that can immediately be passed on to the pertinent memory die. Even for embodiments where the memory controller cooperates in defect management (and performs very limited L2P translation for this purpose), the bypass of binary search trees and other complex translation functions permits streamlined interleaving across dies or devices. For multi-plane access (irrespective of whether also performed in the context of multi-die access), a single command or fused series of commands can be used by host and memory controller to access data that has been stored in consideration of device multi-array address restrictions; thus, one command, or a series of chained commands, can be issued to retrieved linked data from effectively "paired" physical addresses without offending native device IO restrictions or addressing restrictions. In at least one embodiment, the issuance of a multi-plane or multi-track request involves specifying a common, base (logical or physical) address used to access the related data in each respective die or plane. For architectures providing some flexibility in address restrictions (e.g., where certain NAND flash multi-plane architectures permit a limited "plane" address to differ from a specified EU/page base address), the request can specify an plane address offset to the base address. In one embodiment, a single command or fused series of commands from the host can be used to manage multi-die access.

For NAND flash memory, this structure facilitates expanded use of interleaving and/or multi-plane access for many different types of commands. For example, as physical pages of memory are released (or "deallocated") for data stored across dies or planes as a unit, the host can issue a request (e.g., one or multiple commands) that specifies release of a physical address (or offset) in each one of respective dies or planes. Memory devices supporting this capability can update page allocation tables and/or stored metadata to reflect this release, or can send messages (acks) to the host to track and update this information. In an embodiment where the memory controller tracks this information, the memory controller can then notify the host of the need to erase an erase unit (EU) in question (e.g., once page utilization has satisfied a predetermined garbage collection or erasure threshold or in response to a reclaimable space query from the host). Similarly, the host can issue multi-plane (or multi-die) erase operations, or can defragment data, essentially identifying separated (but commonly accessed) data and relocating that data to a striped (multi-plane or multi-die) configuration. The host can initiate these operations and then track the resulting impact on physical address assignment. Thus, this structure permits the host to issue multi-page writes without substantial latency at the memory controller for address translation, and it also permits the host to plan multi-page access in a manner where related data storage is planned. Note that page release, erasure and other functions will be further discussed below in connection with FIGS. 23-25. Note once again that while many embodiments will be discussed below in the context of NAND flash memory, the techniques provided herein are equally applicable to other forms of memory, for example, in dealing with cross-track addressing restrictions for shingled solid state magnetic drives (e.g., HDDs). In a shingled magnetic drive system, a hard disk controller is constrained by having to write individual overlapping magnetic tracks together as a group (e.g., with a track grouping separated by a guard band), but by being able to read tracks individually. The techniques described further below, for example, relating to host-owned or cooperative physical space assignment, garbage collection, defect management, data relocation, cold data management and multi-page writes and reads, are equally applicable to such systems, and indeed, any technology characterized by a program/erase (P/E) asymmetry.

Returning to FIG. 1A, a variety of techniques can be utilized to extend operation to multiple hosts such as depicted optional host 103*b*. For example, without limitation, the system could assign dedicated logical and/or physical space allocated to each host, and rely on memory controller arbitration over competing host commands. Other techniques also exist. Extension of techniques disclosed herein to a multiple host environment is within the level of ordinary skill in the art, and will be discussed below sparingly.

Figure 1B:
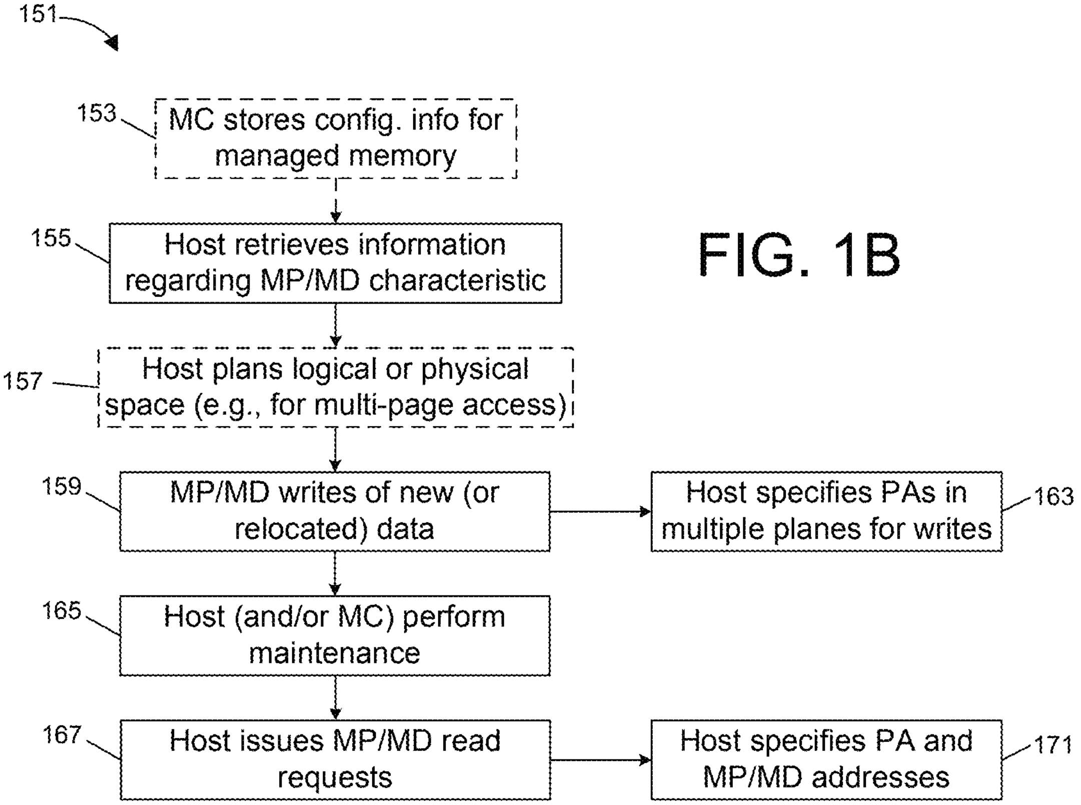
FIG. 1B is a block diagram showing techniques associated with multi-plane or multi-die memory requests that originate from the host.

FIG. 1B is a block diagram showing one method of management of multi-page memory requests that originate from the host. This method is generally identified by numeral 151 in FIG. 1B. As indicated by dashed-line block 153, a memory controller optionally stores configuration data for managed memory for provision to the host (i.e., to one or more hosts as appropriate). As noted, this information can include information on array size, number of devices, dies and planes supported, and other information such as manufacturer, use of multi-level cells, and so forth. Note that there is no requirement that managed memory devices or arrays have to be uniform, e.g., it is possible for a memory controller to manage two dies, one supporting only single plane operations and the other supporting two-plane operations. Per numerals 155 and 157, the host retrieves this information and optionally uses it in planning logical and/or physical space requirements.

During run-time, as the need to write data to memory arises, the host uses this information (and, optionally, stored priority information) to allocate space for each new write (159). However, rather than necessarily allocating this space sequentially, the host can allocate space in a manner where respective address locations are geared for later multi-plane access. Nearly any form of linked data can be stored in these respective linked locations, for example contiguous media data, data and its corresponding error information, or indeed, any other form of related information that may need to be accessed in succession or together. In an embodiment where the host directly assigns physical addresses, the memory controller optionally has no FTL function (which exists on the host only), and thus the host in this embodiment assigns physical memory space and issues write (and read/deallocate/erase and/or other) requests in a manner that directly specifies physical address as a host-command field (i.e., a command-specified operand). This is represented by function block 163. In a variant of this embodiment, discussed further below, the memory controller can perform limited L2P mapping (e.g., it can detect memory defects, mark blocks as "bad" and assign a write in progress to a substitute free space without immediately alerting the host); the memory controller in such an implementation intercepts reads or other operations to "bad" address blocks only. Over time, as wear leveling is performed and bad block information is reported to the host and bad blocks avoided in future physical space assignments, the host understanding of valid physical space once again eliminates the need for temporary translation at the memory controller. In a second example, a host can issue commands to the memory controller for delegated copy of data to reclaim space. As will be discussed below, the memory controller relocates pages from a first data block (which is then reclaimable) to a second block (while preserving page order within relocated blocks); a limited translation mechanism can then be employed so as to eliminate any need for the host to update its address references. Note that even in such embodiments, the memory controller can use very simple translation mechanisms (e.g., detection of at most a small number of addresses, and an ensuing address modification step), and does not need an extensive search tree or complex processing to find the pertinent physical address.

For flash memory in particular, periodic maintenance such as wear leveling and garbage collection must typically be performed, per numeral 165. Performance of these operations on a host-owned, memory controller-owned, shared basis will be variously discussed below. The host issues multi-plane requests consistent with its role in maintenance. Finally, as mentioned, with judicious address assignment at the outset (either with original writes and/or as a result of periodic maintenance), the host is in a position to issue true multi-plane read requests, where related data is requested from respective planes in a manner that a priori is consistent with any native multi-plane address restrictions. These functions are variously represented by numerals 167 and 171 in FIG. 1B.

Note also that while the discussion of FIG. 1B was rooted in the context of multi-plane access, similar techniques can be applied more generally to multi-page (e.g., multi-die or multi-device access). In a multi-page configuration, direct physical addressing is applied by the host to substantially simplify the address translation task at the memory controller, permitting much greater flexibility in interleaving requests and providing for improved bus utilization.

Figure 2A:
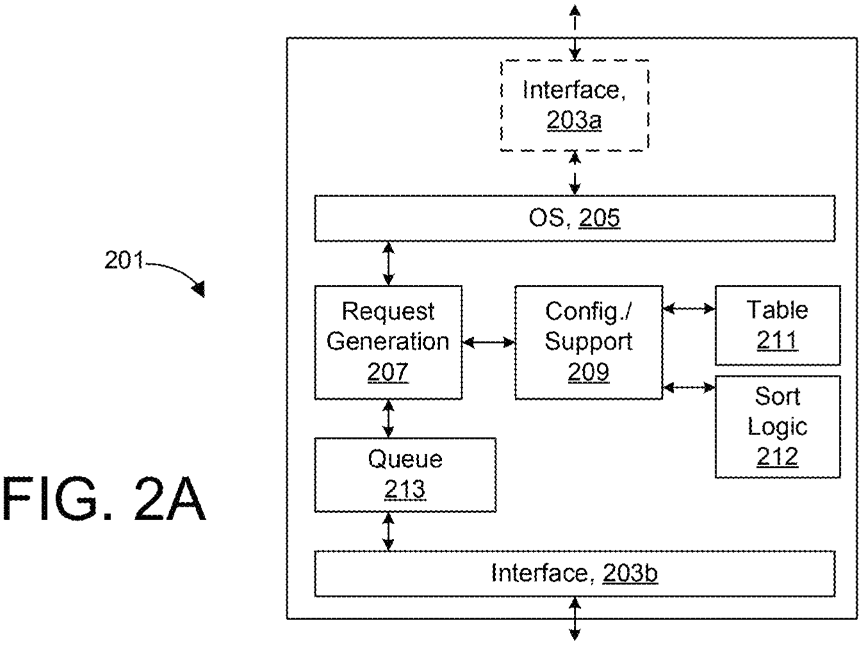
FIG. 2A is an illustrative diagram of a host 201.
Figure 2B:
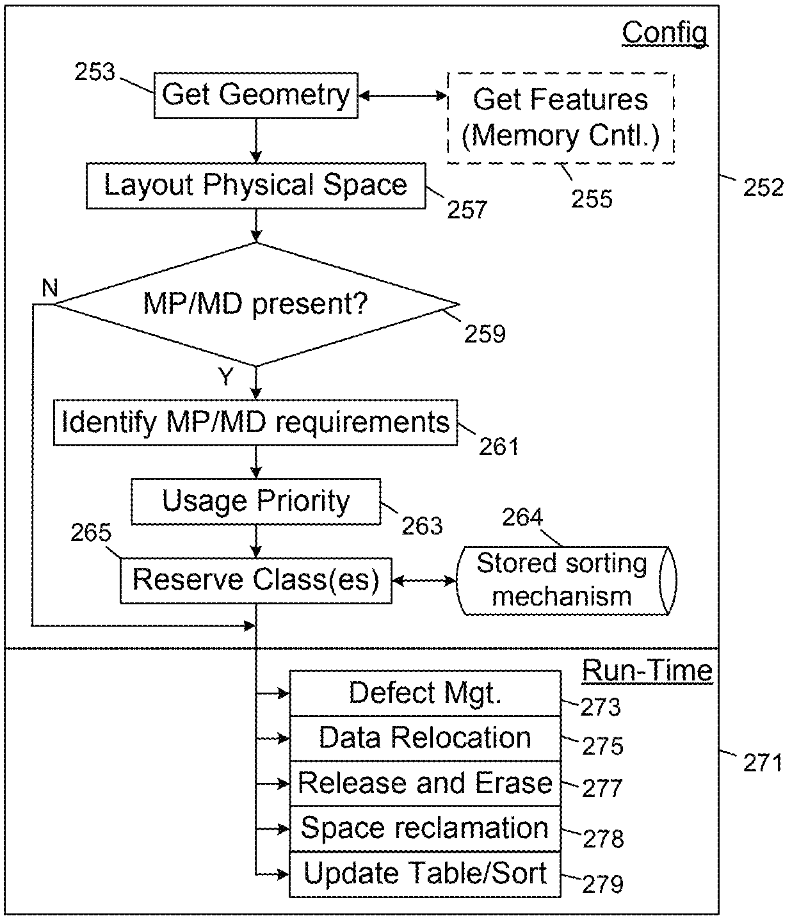
FIG. 2B is a block diagram showing host configuration and management of tables used to perform multi-plane or multi-die space assignment, reads, writes and associated management functions.

With some basic implementation options thus introduced, this disclosure will now discuss host operation in greater detail, with reference to FIGS. 2A and 2B. Note that a host can be implemented using hardware logic and/or software logic (e.g., as circuitry running instructions that control the operation of general purpose hardware). It is also possible to implement such logic as instructions stored on non-transitory machine-readable media that, when accessed and executed by a general purpose machine (e.g., such as a CPU) control that general purpose machine to implement the functions of such logic. Each of these operations is represented by the depicted FIGS.

FIG. 2A generally shows a host 201. The host optionally has a first interface 203*a* to interact with one or more clients, for example, over a WAN or local area network, and a second interface 203*b* to interact with one or more memory controllers (e.g., one for each drive if multiple drives are present). Whether or not interacting with a client, the host typically includes an operating system 205, which periodically needs to send data to storage and/or to retrieve that data. Request generation logic 207 is therefore called upon to generate a command to be sent to memory to request the storage or retrieval of data as appropriate. Typically, a request is formatted to specify one or more commands (e.g., a write command), an associated address, and optionally a data operand (e.g., in the case of a write request). The addressing format varies depending on implementation, but typically in a multi-plane context will include multiple fields which specify (for example), a drive identifier (if multiple memory controllers are present in the system), a device identifier, a die identifier, a plane identifier, and an address offset corresponding to a specific page number in a specific array. Typically, each field includes one or more bits, with a single bit being needed for example to specify one of two planes, and with many bits (e.g., 16 or more bits) being potentially needed to specify other fields (such as page or row address). Other address fields can also or instead be used depending on implementation, for example, bank number, level of a multilevel system, and so forth, and more than two planes can be used, depending on implementation.

To support multi-page and multi-plane capabilities, a host is typically configured in a manner that plans ahead for such multi-array allocation and support. To this effect, the host 201 includes logic 209 for initially configuring such access and for dynamically supporting such access (for example, by reallocating space, changing assignment rules/policies, and relocating data as necessary). As mentioned previously, examples of different maintenance schemes will be thoroughly discussed in the sections below. In turn, logic 209 uses this information to both allocate space as appropriate (using table 211) and also to determine any sorting information that will be used during run-time to assign new writes to cross-die/cross-plane linked memory space as a matter of priority. Sort logic (212) can store in a register this sorting or priority information in the form of a series of related fields, for example, that index data type or a data usage characteristic and provide a field that assists with determining where new writes should be placed. For example, if the host detects the need to store multiple pages of media information, the sort logic could examine its priority information and determine that such media information is preferentially associated with multi-plane writes (across dies or planes as appropriate). Thus, the sort logic 212 assigns (logical or physical) address space in a manner that accords priority for this information as necessary for the host to assign physical space for cross-die or cross-plane storage. In one embodiment, multiple pages of data are sent as part of a request that can include commands simultaneously directed to multiple arrays, or a series of commands intended for single arrays, specifying related addresses, a common base address, an address offset, or a combination of these things. The formulated requests are then sent to a request queue 213; the request queue verifies that transmitted requests have been received and/or completed by the memory controller, and performs related error detection and correction. As an example, in some implementations, the request queue 213 can utilize an acknowledgement process to track the receipt and processing of commands. In another embodiment, tracked commands can be deleted from the queue when it is determined, for example, that error-free read data has been procured by the host from managed memory. Clearly, many examples are possible.

FIG. 2B provides some additional detail on one possible method for configuring host operations in a NAND flash system. FIG. 2B is generally divided into upper and lower halves (252/271) representing configuration and run-time functions, respectively. First, the host periodically (such as at system startup, at first operation or at another checkpoint or interval) retrieves information regarding memory system configuration, such as the number of devices, dies per device, LUN organization, whether multiple planes are supported, and so forth, as required for the particular implementation. This is represented by numeral 253 in FIG. 2B. As noted by optional function block 255, in one embodiment, this call for data is implemented by an NVMe-compatible Get Features command, directed to a memory controller. Note that it is possible to otherwise retrieve configuration data from the memory controller, or alternatively, memory geometry can be determined a priori and stored local to the host. The host then proceeds to plan space assignment, e.g., physical space assignment as represented by function block 257. If multiple dies are present (in a manner supporting parallel access) or if multiple planes are present, as indicated by decision block 259, the host proceeds to identify system requirements (e.g., to plan memory organization as previously introduced) and arrives at a usage priority, per numerals 261 and 263. For any desired sorting order, the host can establish specific classes of access (e.g., single plane versus two plane, three plane, four plane, and so forth) as pertinent to the application, all per numerals 264 and 265. With memory space planned out, the host can store information for use during run-time as appropriate. Multimodal operation can also be used, e.g., in which the memory controller and/or host uses a form or class of multi-plane addressing in first mode, and elects to not use this form or class of addressing in a second mode. If there is to be no orchestrated multi-plane or multi-die access, the host still performs certain configuration functions as appropriate; for example, per the discussion below, the host can still track and assign physical space and share in memory management to a selected degree. That is, whether accesses are uniquely single plane, multi-die or multi-plane, the host can still participate in one or more of defect management, data reclamation, data relocation, release of stale space, L2P table management and other physical space management functions. This helps reduce memory controller competition with host-initiated requests for memory bandwidth and provides for reduced latency and increased efficiency in memory access.

II. ARCHITECTURE OF AN EXEMPLARY, COOPERATIVE FLASH CONTROLLER

Optional features mentioned above are supported by structure where the memory controller also stores information specific to each of plural subdivisions of memory (e.g., for each physical memory unit managed by the host, in on-board registers reserved for this purpose). The memory controller makes data based on this stored information accessible to the host. For example, the memory controller can store a table with information organized by logical unit or physical unit spanning the entire memory managed by the controller. The data provided to the host can be the stored information itself, or the result of processing or filtering performed by the memory controller based on that information (e.g., either as requested by the host or on an unsolicited basis). In one embodiment, this is achieved by storing per-physical-storage unit metadata for each unit managed by the memory controller. The memory controller advantageously includes logic that processes host queries and that provides data back to the host responsive to those queries. The data can either be provided synchronously (in response to host trigger) or asynchronously (i.e., only upon satisfaction of a processing condition). Once in receipt of the data, the host can then electively take action in dependence on that data.

These structures and techniques help reduce control bandwidth competition with host-initiated reads and writes and can help minimize write amplification. By redefining host and/or controller responsibilities, host-controller management features duplication and associated disadvantages can also be avoided, leading to a simpler and less expensive memory controller design. In an implementation where there is no FTL table that must be loaded into a flash memory controller, and no associated search tree, flash memory is capable of servicing host read requests more quickly. The reduction of write amplification and controller-initiated erase, wear leveling and garbage collection operations reduces unintended competition with host-initiated commands, i.e., the host is far less likely to find flash memory "busy" when it seeks to have a command filled, because the host is vested with scheduling the potentially competing functions. In turn, the better pipelining permits a host to more easily interact with a storage aggregate having one or more discrete flash drives, optionally including other types of storage drives (i.e., mixed or non-homogenous memory). Further, as noted earlier, eliminating the latency associated with memory controller address translation (and/or defect management processes) permits the host to more effectively structure multi-die and multi-plane accesses to memory.

Figure 3A:
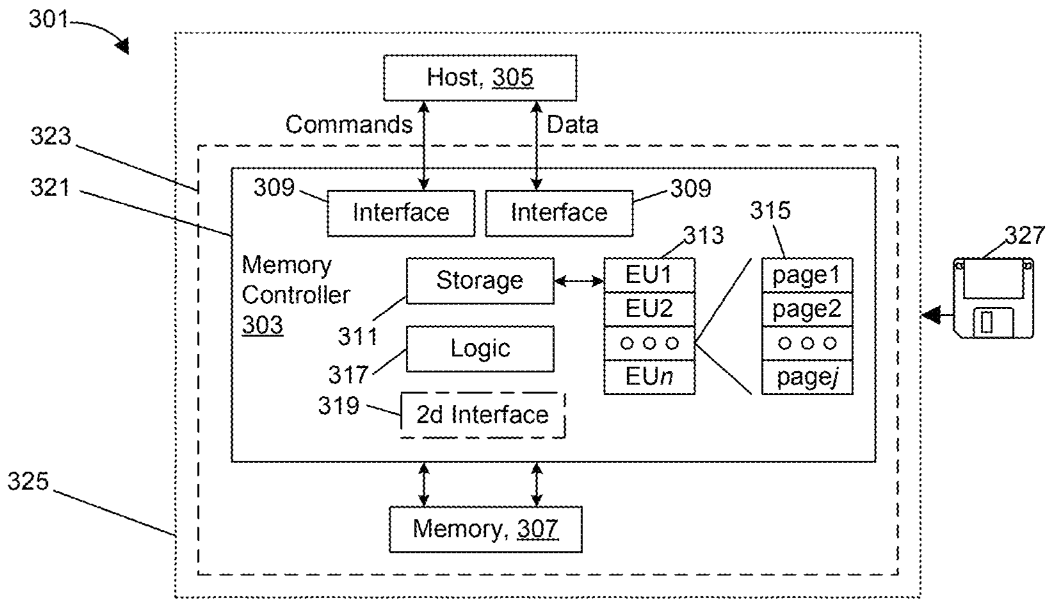
FIG. 3A is an illustrative diagram of a system having a memory controller 303, a host 305 and a memory 307.
Figure 3B:
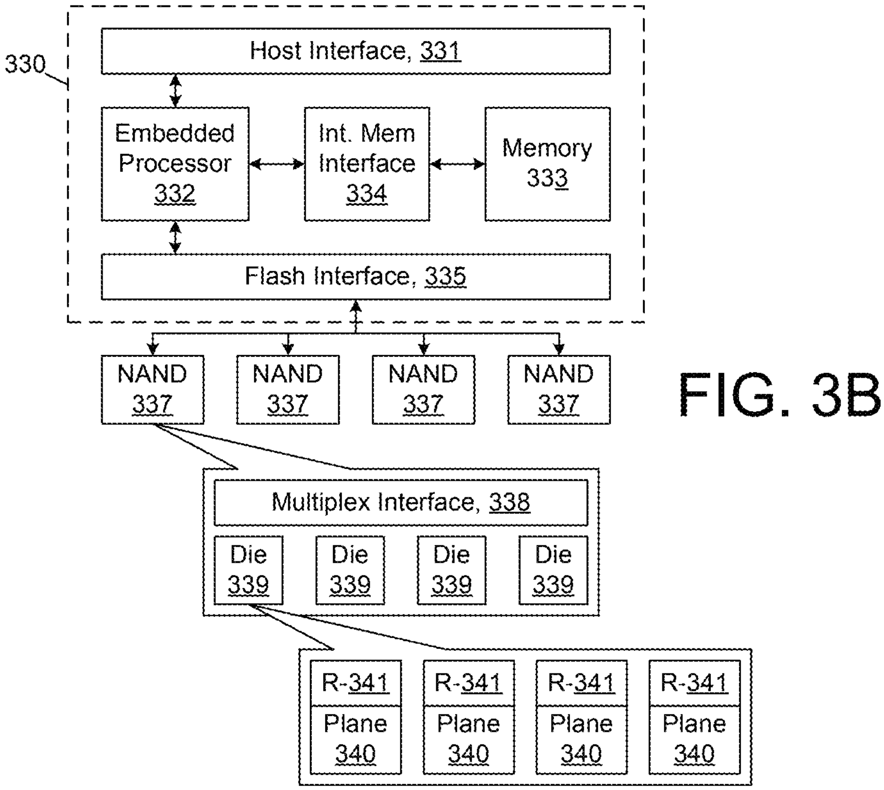
FIG. 3B is a block diagram of a solid-state drive (SSD) having a memory controller and NAND flash memory 337.

FIGS. 3A and 3B are used to introduce one full-featured design of a memory controller, that is, that supports host tracking of physical address space and multimodal configuration that supports different modes of host/controller allocation of responsibility for maintenance operations. The capabilities permit one circuit design to support many different implementations. For example, while the memory controller of FIGS. 3A and 3B can be adapted to either host-owned or memory controller-owned defect management (as described below), a memory controller supporting multi-plane, track, die or device writes and reads need not implement any or all of such responsibilities or functions. This is to say, the memory controller embodiments described below are examples only.

FIG. 3A illustrates one embodiment of a storage system 301 and associated memory controller 303, host 305 and memory 307. In the illustrated embodiment, the memory controller is structured to cooperate with the host 305 in the control of the memory 307. The memory controller 303 has at least one first interface 309 to exchange commands and data with the host. Although two such interfaces and corresponding transmission paths are seen in FIG. 3A, these interfaces may be combined (e.g., with communications occurring via a packet-based transmission scheme). The commands generally relate to operations in memory such as read and write operations, although commands can also be directed to the memory controller 303 to assist in memory management functions. As before, the commands and signaling protocol can be compatible with one or more standards, for example, with Non-Volatile Memory Express (NVMe) or the Small Computer System Interface (SCSI) (in the case of commands) and Peripheral Component Interconnect Express (PCIe) or Serial-Attached SCSI/Serial ATA (SAS/SATA) (in the case of signaling formats). The memory 307 generally has an array of memory cells and array control circuitry that may support one or more planes or banks depending on design. The memory core in turn has one or more subdivisions of memory cells for which subdivision-specific usage data will be tracked by the memory controller 303. In embodiments where the memory is flash memory and the memory controller a flash memory controller, each subdivision can include one or more erase blocks or units (EUs), with each EU having a minimum number of memory cells that must be erased at once. Similarly, in embodiments where the memory is a magnetic disk media (e.g., shingled drives), each subdivision can include a "band" of tracks (e.g., having a group of tracks that must be erased at-once).

The memory controller tracks physical subdivisions using metadata retained in internal storage 311. In one embodiment, this storage can be volatile memory such as synchronous random access memory (SRAM); in another embodiment, this storage can be non-volatile memory, for example an internal flash array. As denoted by reference numeral 313, the storage retains this information for each subdivision of the memory governed by the memory controller, in this case, for a physical subdivision of the memory 307. In embodiments where the memory 307 is a NAND flash memory, the storage retains information for each EU or physical page of the flash memory (e.g., EUs 1-*n* as indicated by reference numeral 313). Note that for flash memory, each EU can also correspond to multiple pages, as indicated by numeral 315 (e.g., pages 1-j). For example, depending on manufacturer and design, there can be 128-256 pages per EU, with each EU corresponding to a substrate well, and each page corresponding to an independently controlled wordline for memory cells tied to that substrate well. The memory controller also has logic 317 that is operable to send to a host either some or all of the "raw" metadata retained in the storage 311, or derived or processed information based that storage 311. This logic for example can include circuitry within the memory controller that is adapted to respond to host commands seeking specific data; alternatively, this logic can also include circuitry that applies pertinent filters or comparisons and that notifies the host when a tracked metric meets an assigned threshold. This information or an alert representing a particular condition can be transmitted to the host via the at least one first interface 309, via a dedicated connection, or via a backplane connection.

Several configurations are also represented by the embodiment of FIG. 3A. First, as represented by numeral 321, the memory controller 303 can be designed as a standalone integrated circuit with the host 305 and the memory implemented as one or more discrete integrated circuits (e.g., the host in the form of a host processor). For example, dashed-line box 323 can represent a discrete solid-state drive (SSD) where the memory controller is implemented as an IC and where the memory is embodied as one or multiple NAND flash devices. Second, as represented by dashed-line box 323, the memory controller 303 can instead be co-packaged or otherwise combined with the memory 307 as a storage subsystem. That is, it is also possible (as represented by dotted-line box 325) to aggregate the memory controller 303, the host 305 and the memory 307 as a single system, for example, a network-attached storage system or a storage system adapted for connection with another digital system (e.g., via a USB, PCIe, SATA, Ethernet or other standard signaling protocol). In either implementation, per reference numeral 327, cooperative management functions can be embodied as instructions stored on non-transitory machine readable media, for example, for use in controlling a host processor, memory controller or other circuit. That is, software or firmware can be used to control actions of a host, memory controller or other circuits.

FIG. 3B shows a solid-state drive (SSD) having a memory controller 330 and NAND flash memory comprising one or more NAND flash memory devices 337. The flash memory controller 330 includes storage to store information for each subdivision of memory as referenced above, as well as logic that services host commands relating to that information. The logic is partially in the form of an embedded processor 332, which receives commands from the host and fulfills those commands under the auspices of firmware. This logic and firmware will be further exemplified below, but for purposes of FIG. 3B, it is noted that this logic relies on internal memory 333 including volatile storage (e.g., DRAM, or another very low-latency storage technology, for example, using a double-data rate or "DDR" signaling scheme) and nonvolatile storage (e.g., internal flash memory for the firmware). The memory, and associated firmware and data, are accessed via a dedicated interface 334. Once again, in one embodiment, the flash memory controller interacts with a host using exchanges of commands and data that are compatible with one or more well-known communication standards, such as NVMe or SCSI, or other networking formats. Each of these standards provide for commands to be sent from an initiator (such as the host) to a specific target (such as a memory device or memory controller). Signaling formats used by these commands structures can follow any desired signaling standard, for example, a version Peripheral Computer Interconnect Express (PCIE), serial ATA (SATA) or another signaling standard. The interaction can take the form of commands for memory transactions (e.g., read and write transactions), configuration commands to the memory controller (e.g., asynchronous commands), query commands (e.g., commands for synchronous or asynchronous returns of information based on memory controller processing requested by the host), and alerts and returns of various operating codes and other information from the memory controller. Generally speaking, a "synchronous command" as used herein will refer to a command to the memory controller which initiates a function in the memory controller that returns a result as soon as processing is completed. A synchronous command is analogous to a query. An "asynchronous command" as used herein will refer to a command that requests a return only once another condition is satisfied. Such a return of information can be triggered immediately (e.g., if the condition is already satisfied) or in the future (e.g., the memory controller alerts the host immediately and without solicitation when a condition specified by the host is later satisfied). An asynchronous command can be thought of as the host setting an operating mode or condition in the memory controller, e.g., setting a mode calling to trigger an immediate alert if previously released space exceeds a host-specified level.

To perform input/output (IO) operations, controller firmware interacts with a low-level flash memory interface 335 to translate high-level IO commands into flash memory operations. In this embodiment, the flash memory consists of one or more NAND storage devices (e.g., integrated circuits) 337, each coupled to the flash memory interface 335 via a multidrop channel. Each device 337 includes a multiplex interface 338 that connects to one or more co-packaged dies 339. Each die can have one or more planes 340, each with independent control and data registers 341, so that each die is capable of performing multiple IO commands simultaneously. These registers can be delegated complex commands (e.g., multi-operation programming commands) by the memory controller, or alternatively, the memory controller can use a fractional programming scheme. Following SCSI protocol tradition, a logical unit (LUN) is used to refer to the smallest device unit addressable by IO operations. Note that a LUN can be striped across multiple planes (or dies) if desired for the particular implementation. For example, using the techniques of this disclosure, it is possible to write a LUN across planes by ensuring physical addressing of pages written to respective planes in a manner consistent with device multi-plane addressing limitations.

As mentioned, in this embodiment, the controller can serve detailed information to the host for each subdivision of memory, and the host can also issue query requests to the memory controller (which are designed to assist the host with management of the bandwidth-consuming functions). Advantageously, to avoid delays associated with memory-controller-resident address translation, the host sends IO requests to the memory controller that directly specify physical address. Note that for a NVMe compatible embodiment, the predicate of direct physical addressing can be supported simply by configuring the memory controller to manage the host-specified address as a physical address, or otherwise with limited memory-controller-side address translation. The performance of commands (e.g., management of multiple program-verify cycles, or "P/V" cycles, of one write command) is then managed by the memory controller which alerts the host upon command completion. The meaning of the physical address in this context depends on flash memory geometry but, in this embodiment, includes multiple fields. These fields can identify for example the number of a communication channel within the flash memory interface 335, the number of a device 337 connected to that channel, the number of a die 339 within that device 337, the number of a plane 340 located on the die 339, the location of a block within the die 339, and the location of a page within the block. Thus, physical address depending on embodiment can include a quadruple of channel, device, die and logic unit number (LUN).

Figure 3C:
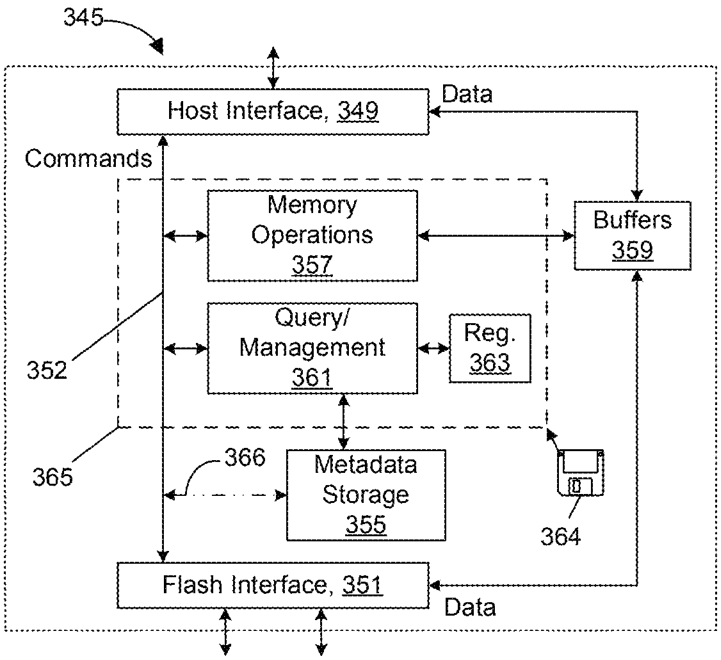
FIG. 3C is a block diagram of a memory controller.

FIG. 3C helps illustrate layout of one possible flash memory controller, with an emphasis on command processing. In particular, the flash memory controller can be implemented as a single integrated circuit 345. As before, a host interface 349 is used to exchange commands and data with a host, and a flash interface 351 is used to issue commands to and exchange data with one or more flash memory devices (not shown in FIG. 3C). Note that in this embodiment, a single path is illustrated as coupling the memory controller with the host, for packetized exchange of both commands and data; that is, the host interface can include logic that extracts commands and data from request packets, and can also packetize read data, alerts, metadata and other communications to the host. Other implementations are also possible, for example, using separated command and data busses. In the scheme depicted in FIG. 3C, it should be assumed that the host interface has a high speed serdes interface, such that communications with the host occur over one or more differential signaling paths, for example, compliant with a PCIe, SATA or other signaling scheme. Note that one or more flash devices can be copackaged with the memory controller, and thus the flash interface 307 does not necessarily have to use the same signaling scheme as the host interface, e.g., communications can be via wide-bus single-ended communications, using command and data busses.

The host interface 349 separates controller commands from any received packets (as necessary), and routes these commands over a command bus 352 internal to the flash memory controller. Generally speaking, commands will relate to memory operations (e.g., reading or writing of data) or to queries for data and memory management functions. To this effect, separate logic blocks within the memory controller are dedicated to each of these functions.

A memory operations logic block 357 manages operations involving the memory device. For example, as is well-known, NAND flash memory typically utilizes incremental programming—that is, array control circuitry for the flash memory device uses a minimum programming voltage, and results of programming are checked against contents of a write data register to determine whether those results are correct. This is performed using a "program-verify" (P/V) cycle having separate "program" and "verify" phases. During validation, a programmed page is typically sensed and an exclusive- or function is performed with contents of the write data register; for any bits that remain set, programming has not been effective, so the programming voltage is raised and the process repeated in a second P/V cycle. This process typically continues until proper programming has been achieved or some limit has been reached, the latter case resulting in a write error. In one embodiment, the memory operations logic block 357 performs control over these various phases of programming using buffers 359. Since a memory device can include multiple planes (as discussed above), the memory command processing logic block 359 optionally uses multiple buffers, for example, with one dedicated to each plane or with buffers assigned on a rotating basis for individual commands received from the host. The memory command processing logic block also manages any functions of reporting write error and consequent remapping of data, as well as updating L2P mapping information in metadata storage 355 (for embodiments that perform such mapping). Note that this information can be part of a much larger class of metadata indexed by EU as discussed above (see, e.g., FIG. 6 and the accompanying discussion below for examples on types of information that can be tracked using this storage).

Commands relating to the return of query information or the setting of an operating mode are sent to query/management logic block 361. Generally speaking, the host can request (a) return of raw metadata for the entire memory space managed by the memory controller, or for specific address ranges or EU ranges, or (b) other information derived from processing or filtering of that metadata by the memory controller. For example, the memory controller can be provided with logic operable to receive and interpret host commands for lists of blocks, e.g., the "top ten" candidates for garbage collection, ranked in order of page (under) utilization. If pertinent to an embodiment supporting multi-plane writes and reads, logic on the host can automatically add "linked EU's" (i.e., EUs in counterpart planes to EU candidates) as part of such a list, or alternatively, can otherwise filter EUs having multi-plane data so as to not include them in such a list. Since the purpose of such a garbage collection operation is to identify EUs for erasure, a memory controller receiving such a command interrogates the metadata storage to (a) identify EUs that are at least partially in use, (b) identify the extent of page utilization for each such EU, and (c) order a set of EUs that are candidates for erasure in the order of greatest number of released pages. The query/management logic block 361 uses internal registers 363 to manage functions like this and, when the requested processing is complete, the query/management logic block sends a reply message to the host with the requested information. Note that the host interface 305 includes buffers that receive this data, and queue the data for transmission to the host (e.g., as a reply packet that may be distinguished from read data). The mentioned example is only one type of query that can be processed by the host, i.e., there are many types of requests and queries that can be processed by a memory controller having the described structure. A skilled designer can implement any type of management processing desired. This request is an example of a synchronous query, because data is on-hand for the memory controller, and because the memory controller returns requested data as soon as its query processing is complete. In a simplified case, the host can request return of raw metadata. For asynchronous queries or functions, the host typically provides a parameter (such as a mode setting and/or a host-selected threshold of some type) and the memory controller then operates a continuous or intermittent process to check for the specified condition; when the condition occurs, the memory controller immediately alerts the host, typically providing information that triggered the alert (such as EU identity and metadata for the EU pertinent to the function being tracked). That is, if the condition does not occur, there is no responsive alert sent to the host, and the condition is monitored for occurrence at any time in the indeterminate future. As should also be apparent, sophisticated queries can be run that involve multiple metadata parameters. For example, a host might request an alert any time a partially written EU simultaneously reaches a specific page utilization threshold (e.g., less than 50% utilization) and has a time since last data access greater than a second threshold. Many examples of asynchronous processes are possible and will no doubt occur to the skilled memory architect. Once again, any suitable thresholds or modes are stored in registers 363.

A media icon 364 is depicted to indicate the optional use of software or firmware by the memory controller. The memory operations and query/management logic blocks 357 and 361 and registers 363 are all depicted within a dashed-line box 365 denoting that, in one implementation, these elements can reside on a single die (e.g., a single processor or coprocessor); in such an embodiment, the media icon 364 typically denotes the use of firmware, for example, stored in memory within the single die in question. In this regard, such firmware can be designed to respond to vendor-specific NVMe extensions to implement specific query/management functions. For example, any desired asynchronous query can be implemented as a function call supported by firmware; when the asynchronous command in question is triggered, it is run as an open process in the die (365) or a coprocessor dedicated to the query/management functions. Alternatively, many processors can be provided, each assigned queries/asynchronous processes as they are invoked. As implied earlier, a specific asynchronous process can be associated with a mode set by the host; for example, in one mode defined by the host, the memory controller can automatically alert the host any time it identifies a space reclamation (garbage collection) candidate, based on default or host-identified parameters—in a second mode, this function is turned "off." Note that in the future, newer versions of standards such as NVMe can be structured so as to inherently support generic commands calls consistent with the operations discussed above.

The metadata storage 355 is indicated as separate from dashed-line box 365, reflecting that the metadata storage optionally can exist independent of the processing logic, e.g., on a separate die. That is, in one embodiment, the metadata storage consists of nonvolatile memory, such that it is persistent through power cycling. In another embodiment, the metadata storage can exist in SRAM (e.g., internal to optional die 365), with data switched to nonvolatile memory and loaded back again in response to power cycling. In still another embodiment, as denoted by optional connection block 366, the metadata storage can be read directly by the host, i.e., via a form of commands for direct memory access (DMA). In such an embodiment, the host simply reads a special memory location which it knows will contain metadata for a specific EU or EU range, or for the flash memory as a whole.

Figure 3D:
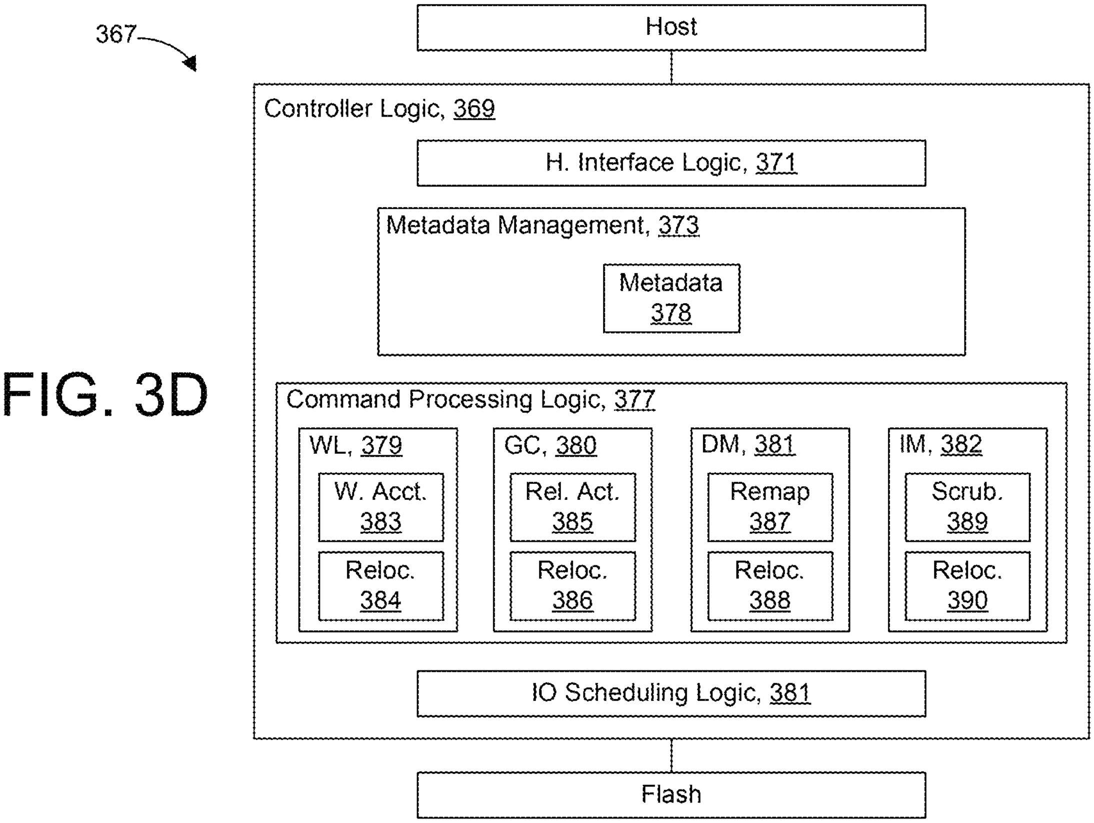
FIG. 3D is a block diagram of memory controller logic used in supporting cooperative functions.

FIG. 3D shows a block diagram 367 of a cooperative memory controller in expanded detail; more particularly, FIG. 3D is used to show how logic functions can be implemented using hardware and firmware logic 369. This logic 369 supports a number of optional processing features. In one embodiment, this memory controller uses this logic to perform many traditional flash controller functions (e.g., management of an FTL and associated search trees). This is to say, while one advantage of the memory controller is the substantial reduction or omission of an FTL layer or its equivalent, as mentioned, this is not required for all embodiments. In another embodiment, the memory controller implements comprehensive cooperative functions that help reduce the need for complex L2P translation processes, as referenced above. In a cooperative or shared management scheme, the host can retrieve per-memory unit physical address status and, with this information, directly address specified physical locations—as mentioned, this substantially reduces or obviates the need for complex translation processes resident at the memory controller.

For the embodiment of FIG. 3D, logic 369 is seen to have a number of basic function blocks, including interface logic 371 to interact with the host using packetized commands and responses, logic 373 used for local metadata management, command processing logic 377 used for query processing and other management functions, and IO scheduling logic 381 used to manage memory transactions (e.g., read, program, and erase operations). As noted, even in an embodiment where it is desired to substantially reduce the translation layer, a memory controller can still optionally implement some address translation, for example, for defect remapping, transparent data relocation and other functions. This will be described below. The metadata management logic 373 maintains locally-stored information in the form of metadata 378, as mentioned, for each physical unit of memory (e.g., each EU) of the memory device. Non-limiting examples of information that can be tracked are once again discussed below in connection with FIG. 6. This information can include L2P or P2L mappings for each memory unit; that is, as discussed below, even for an embodiment where the host uses direct physical addressing, a scheme of shared address assignment responsibility can be implemented, with the memory controller assigning physical addresses based on an initial logical address specified by the host, with the memory controller reporting back assigned physical address (es) to the host, for the host to build a L2P table for future reads to the data. This shared addressing scheme can also optionally be employed for certain other delegated functions, e.g., valid data relocation, unit erase, garbage collection, defect management and other functions. Note that this is not required for all embodiments, i.e., as alluded to earlier, a host can also support these functions and dictate physical addresses for new writes. In many embodiments described below, an adaptable memory controller architecture will be described, providing implementation flexibility in assigning specific tasks to either host or memory controller. To these ends, the metadata management logic can include structure to assign physical address and generate updates to stored metadata 378 and to report back to the host an index of physical locations assigned the newly-written file for situations where address assignment is to be performed by the memory controller.

To provide another example of use of a limited address translation scheme notwithstanding address directed by the host, the memory controller can be configured to transparently remap specific data over to other memory space. This operation could be invoked in implementations, for example, where direct physical addressing is used, but where the memory controller performs defect management or is tasked with delegated data copy (transfer) to free up memory space. Because such reassignment might affect only a very small portion of data written to memory, the memory controller can advantageously keep track of this reassignment using the metadata 378. The limited address translation scheme is then used such that future reads specifying the remapped EU are intercepted by the memory controller logic using locally-stored metadata 378 and redirected to the proper physical location. Note that such a limited FTL can be made quite manageable in overhead if an optional practice is used to preserve page address from the old EU when writing data into a destination EU. In this manner, the memory controller is freed from having to implement extensive search trees to find physical locations based on supplied logical addresses, i.e., the memory controller need only track defective memory reassignments, which ultimately become stale as the memory controller progresses through erase operations, garbage collection and updates of data (the latter being directly written to new pages or EUs). As will be discussed elsewhere, a limited FTL even in this situation is optionally used, e.g., the memory controller could be tasked with performing some space assignment tasks, but immediately reports back to the host P2L information for the assigned space, thereby enabling the host to update its addressing scheme to thereafter use direct physical addressing by the host (i.e., future requests are directly addressed to the remapped space). Other alternatives are also possible.

The command processing logic 377 receives commands from the host directed to general configuration of memory operations and for queries. Generally speaking, this logic manages and updates the metadata 378 and runs queries on the metadata, returning information to the host as appropriate via the host interface logic 371. The returns to the host can be immediate returns to synchronous commands and immediate or later responses (or alerts) to asynchronous commands. Exemplifying some command options, the command logic can (a) serve information up to the host drawn from metadata 378 for use in wear-aware writes, and (b) assist with wear leveling (WL), garbage collection (GC), defect management (DM) and integrity management (IM) functions in memory. Note that in network storage applications with multiple drives, this further enables certain novel host capabilities, as will be described in the section dealing with an exemplary storage system further below. Note also that in some embodiments the host can also directly access raw metadata, e.g., as a form of direct memory access.

An exemplary memory controller can assume varying levels of host support in a manner that can be customized to any specific memory system design. That is, memory controller possesses dedicated logic infrastructure to perform WL, GC, DM and IM specific functions (379, 380, 381 and 382, respectively), each of which can be tailored to a specific level of interaction with the host pertinent to the specific implementation. Depending on the desired level of interaction, the memory controller helps avoid the need for remote storage and retrieval of large address translation tables and the use of complex search trees, e.g., address translation can be performed using a greatly simplified address translation table or omitted in the memory controller entirely. In addition, the configured level of cooperation can advantageously permit a host to directly assume scheduling of many flash management functions that might interfere with (i.e., compete with) host-directed writes, such as garbage collection, data relocation and/or reclamation, wear leveling and so forth. That is to say, an architecture will be described below that permits a memory controller to serve sophisticated information to the host to assist with this scheduling. This, combined with less translation overhead, provides for faster, more consistent response, and facilitates multiple drive storage aggregates based on solid state drives (SSDs) as well as mixed or heterogeneous systems that combine SSDs with other memory types.

To assist with host scheduling of management tasks, the memory controller can have firmware or hardware logic (or both) dedicated to specific types of host commands and host queries. In the NAND flash embodiment of FIG. 3D, this structure is illustrated as optionally including structure to assist with wear leveling (WL), garbage collection (GC), defect management (DM) and integrity management (IM) functions, but other functions or logic can also or instead be used. To support these functions, the memory controller uses command processing logic 377 to manage space allocation and space reclamation, and otherwise to service host calls for the return of management data. For example, this command processing logic can facilitate direct physical addressing by identifying for the host available address space (i.e., "free" or "virgin" space that is already erased and ready to receive write data), candidates for erase (i.e., space that did have at least some data no longer in use, that is, consisting of at least some released space and possibly some free/virgin space but that can be erased to thereby provide a contiguous block of free space), candidates for data relocation and garbage collection (e.g., space that is mostly released with only a small portion still used to service data read requests that could be reclaimed once the data is moved or consolidated elsewhere), candidates for cold data relocation (e.g., moving low turnover data to facilitate wear leveling), or more general functions.

For both embodiments that use wear-aware writes as well as those that do not, the memory controller can include wear leveling logic 379. That is, to account for a limited number of flash memory P/E cycles (typically on the order of tens to hundreds of thousands of cycles for NAND flash), the logic on board the memory controller can be designed to track wear as part of metadata 363 and to provide this information to the host. If, over time, certain units of memory are determined to represent disproportionately high or low wear relative to overall memory, wear leveling can then be performed. Note that for embodiments where wear-aware writes are used, wear leveling can be highly localized, i.e., performed as a data relocation option simply to redistribute cold data. The memory controller 367 can generate alerts when predetermined wear or data age thresholds are reached, and can otherwise perform low level queries relating to wear leveling. In support of the techniques presented by this disclosure, the wear accounting logic 383 can keep a changing-list of EUs, ranked in order of coldest data, least wear, greatest wear or in another manner. In one embodiment, this logic can be prompted via an explicit host command to synchronously compile such a list or to asynchronously notify the host of EU identity any time a wear metric (e.g., EU erase count) exceeds a programmably-defined value. Then, when and as wear leveling is scheduled by the host, the host issues a command to the memory controller to relocate cold data and erase the old space (e.g., using relocation logic 384), thereby redistributing that space into a pool of available space used for active writes (and potentially more frequently-cycled data). Note that in an embodiment where the host directly addresses physical space and performs wear-aware address assignment, distribution of wear can be inherently minimized as part of the write process. However, disproportionate wear can still occur for data that is held for a long time and which is therefore deemed "cold;" that is, cold data can keep EUs out of circulation while other EUs are more frequently recycled. The memory controller architecture presented by this disclosure supports memory controller cooperation with wear management through the use of "limited" data relocation and wear leveling processes (e.g., directed only to specific address ranges within flash) as well as (if pertinent to the implementation), the scheduling and management of more extensive wear leveling, e.g., for entire flash devices or across multiple flash dies, planes or drives.

Copy-on-write processes can result in retaining old pages in flash memory that are stale. This is because a given EU can have other pages that are still in use, and the old page location typically cannot be reused until the entire associated EU is recycled. Over time, substantial portions of flash memory can be locked up simply because a small fraction of space in many respective EUs is still in use. This situation can occur whether the host or the memory controller performs address translation. To address this, the memory controller of FIG. 3D therefore uses garbage collection logic 380 to assist with functions of periodically consolidating data. That is, the garbage collection logic can track information pertinent to whether an EU is mostly stale or is still efficiently being used and can process host queries relating to this information. One form of this tracked information is page utilization information, e.g., where the memory controller stores information indicating whether each page in a given EU is available (erased but not yet written), has valid (in use) data, or is released (has pages not in active use but that remains unerased). Garbage collection involves accounting for released pages, for example, using release accounting logic 385 to track the mentioned page utilization information for each page (or other logical unit) for each EU; EUs with relatively few used pages can have those pages consolidated with pages from other EUs having similarly low page utilization, with the then-concentrated valid data being rewritten to a new destination. In an embodiment where the memory controller tracks this information, the memory controller can compute an extent of page utilization (e.g., 10% valid or "in use" data) and can provide this information to a host with EU identity to permit the host to decide which EUs should have data consolidated and moved. The host can then schedule any resultant operation in a manner that does not compete for needed read data elsewhere in the subject memory. Note that "page utilization" as used herein generally refers to the extent to which pages of a given EU are valid (in use) or are stale, erased or otherwise not in use. For example, if most pages in a given EU were unused and only a few pages of the EU had valid data, the extent of page utilization in the given EU would be low. Conversely, if most pages in an EU were in active use, the extent of page utilization for the given EU would be high.

In an embodiment where the host cooperates with the garbage collection task, the host can query the memory controller using a command, with processing of the command performed in cooperation with the release accounting logic 385. In more detailed embodiments, the release accounting logic can be designed to perform low level inquiries, for example, to return a list of EUs where page utilization falls below a specific threshold (e.g., 50%). This type of function can also be managed as an asynchronous task, e.g., the host can request that the memory controller alert the host if at any time an EU that has been written-to (or that has just had a page released) experiences less than a threshold level of page utilization; in this regard, the release accounting logic 385 tracks explicit page release with each command information update, and can perform any processing necessary to alert the host in response to any asynchronous queries. The release accounting logic 385 also has circuitry and/or firmware that performs other forms of processing, for example, optionally providing a list of "the 10 best" candidates for garbage collection in order of page (under) utilization. In another embodiment, some or all of the data relocation functions can be managed by the memory controller, for example, with relocation logic 386 being delegated specific tasks by the host (such as the identification of EUs to the host for relocation of data, or delegated relocation of data in response to a host-specified target memory address). Once relocation has been performed, with respective L2P mappings updated and associated physical pages released, the full EU is reclaimable. In one embodiment, this is performed by the host, which issues an explicit EraseBlock command for an address-specified EU-logic 369 processes this command and, once the command is completed, returns the freed EU to a pool of available EUs for future data allocation.

Write and erase errors discovered by the flash memory controller are handled by defect management flash management logic 381. Pages found defective due to write error are remapped by defect remapping logic 387, with the subject write operation retried transparent to the host. The original page in error is marked as defective or "bad" and added to a bad block list or map to avoid further use of associated physical pages. Unit relocation logic 388 performs background relocation of data that experienced write error to minimize possibility of further write errors. Unit erase errors are handled by the defect management logic as well, with defective EUs also reflected on a bad block list kept by the flash memory controller. As indicated, in such a scheme, the entire EU can optionally be moved, preserving relative page layout and simplifying translation issues.

While flash memory typically provides strong error detection and correction (EDC), the memory controller may also provide onboard data integrity management logic 382. Data scrubbing logic 389 is responsible for background data integrity checks based on EDC or additional data integrity metadata. Suspect blocks with transient errors identified are relocated by suspect relocation logic 390 using mechanisms similar to wear leveling and garbage-collection relocation processes described above.

As operations are performed in memory, whether as part of a management operation (such as data relocation) or in servicing a write or read command, IO scheduling logic 381 detects completion of the command. Pertinent information is added by metadata management logic 373 to the stored metadata 378 for the pertinent EU, and the host is then signaled with any completion codes as necessary. For example, if a data relocation operation has been performed, the metadata 378 can be updated with new information for both source and target blocks of memory (e.g., new page release information, L2P and P2L mapping, wear information and so forth), and the host can be signaled with new physical addresses for relocated valid data.

Note that, depending on embodiment, the memory controller can support one or more of the functions or units of logic described above, i.e., a memory controller can include subsets of the described logic to assist in the performance of specific tasks. For example, one hypothetical memory controller could omit the data relocation logic 386 if the host was to perform this function. Also, other logic functions can also be supported or provided for beyond those discussed. As mentioned, the embodiment of FIG. 3D presents a single memory controller architecture adaptable to multiple, different implementations, but this is not required for all embodiments.

Clearly, many examples exist for the layout of a cooperative memory controller. In various embodiments, these layouts can support different cooperative functions. FIGS. 4-13B are used to provide non-limiting examples of different types of functions that can be supported.

A. General Flow.

As discussed above, a cooperative memory controller can participate in and support periodic management tasks, such as relates to defect management, wear leveling, and garbage collection. A given task (e.g., an asynchronous task) will typically have an associated management condition that is triggered when a specific, tracked parameter exceeds a predefined threshold. Once the management condition occurs, data which triggered the condition is evaluated by the memory controller, the host, or both, based on pertinent metadata. Depending on implementation, individual management tasks and the need for action can be addressed solely by the memory controller, solely by the host (e.g., based on reported information), or cooperatively by both the memory controller and the host. That is to say, in any given embodiment, provision can be made for the handling of any one or more of the management tasks described above on a cooperative basis. In addition, these functions can also be made dynamically multimodal, i.e., supported in a single memory controller design and configured in situ depending on policy or other system parameters for memory controller-owned processing, host-owned processing or cooperative processing. Depending on features supported by the specific system (e.g., the specific customer), the memory controller can support adaptation or configuration at design time (or programmatically at initial system configuration) to support the desired architecture. As an example, a particular cooperative memory controller might support cooperative garbage collection, but a system with this memory controller might not implement this type of cooperation between host and memory system—in such a system, the memory controller can be programmed (e.g., using a command register or mode register) to turn this management feature off. Typically, once initially configured for a specific implementation, a memory controller will maintain its configuration throughout system life or until the system is reformatted, although it is also possible to support dynamic modes for some purposes.

When configured to provide cooperative management for any one or more of the areas mentioned above, a cooperative memory controller provides methods and mechanisms for a host (e.g., host software) to define and detect the management condition, to query metadata in connection with that condition, and to electively take responsive action.

Figure 4:
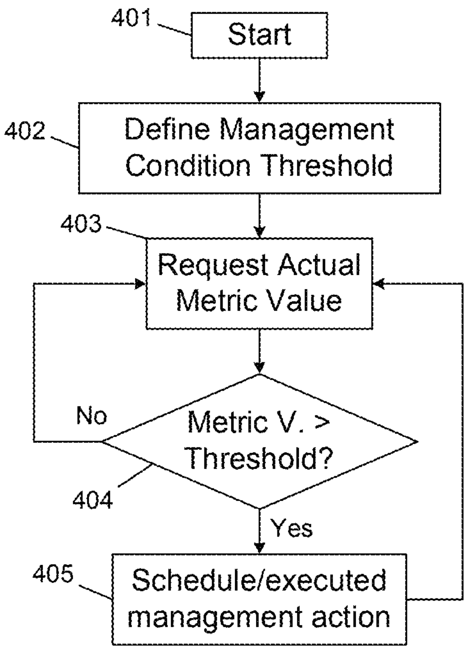
FIG. 4 is a flow diagram that illustrates host tasks in a cooperative memory management scheme.

FIG. 4 illustrates a process of the host-controller interaction in management condition detection. The process starts at step 401. At step 402, either of the host or the memory controller determines a need to assess the management condition, for example, as a function of running a routine or based on some type of trigger. For example, in one embodiment, the host can initiate a process such as periodic wear leveling (either via explicit command or as a result of setting an asynchronous process in the memory controller). The memory controller can also be set for a default operation, e.g., automatically alerting the host or providing data unsolicitedly to the host any time all pages have been released for a given EU; such a process can be triggered by the memory controller, which notifies the host of a need for intervention or simply (unsolicitedly) provides pertinent information to the host. Such a notification can also be the result of an asynchronous process or mode selectively set by the host, as mentioned above. Many other examples also exist. In one such example, a particular implementation may call for specifically alerting the host "automatically" any time a page release is determined to be the last page release for an EU (e.g., the EU is completely released); in different implementation, this information might always be tracked by the host (or not tracked at all). Irrespective of how the process is initiated, at step 403, the memory controller of FIG. 4 provides data to the host based on tracked, subdivision-specific (e.g., EU-specific) information associated with a particular parameter or metric. In one embodiment, each exchange between memory controller and host can be performed in a manner compliant with NVMe of SCSI, for example, using a vendor-specific extension or a vendor specific NVMe administrative command (or similar command for other protocols). At step 404, host software checks the value returned at step 403 against a specified threshold to determine existence of a condition requiring intervention. On a negative determination, the process ends or otherwise loops to step 403 after a suitable delay. On a positive determination, host software proceeds to take management action (step 405). Once management action completes, the process either concludes or is looped back to step 402.

As an example of management action, a host can initiate an explicit erase operation that specifies an EU or equivalent physical address. Because such an operation is host-initiated, it does not collide with a host-issued read or write request, thereby improving system performance. In a multiple drive or a multi-die system, the host can hide an explicit erase (and garbage collection and other functions) behind a read or write request to another system drive. For example, in such a configuration, commands from the host can be interleaved such that as read and write operations are performed in one die or drive, garbage collection and unit erase tasks are performed in another. In a system which has multiple SSDs, this parallel processing ability can lead to further performance benefits. Note that this type of parallel processing can also be performed where devices or drives are connected point-to-point with a host.

Figure 5:
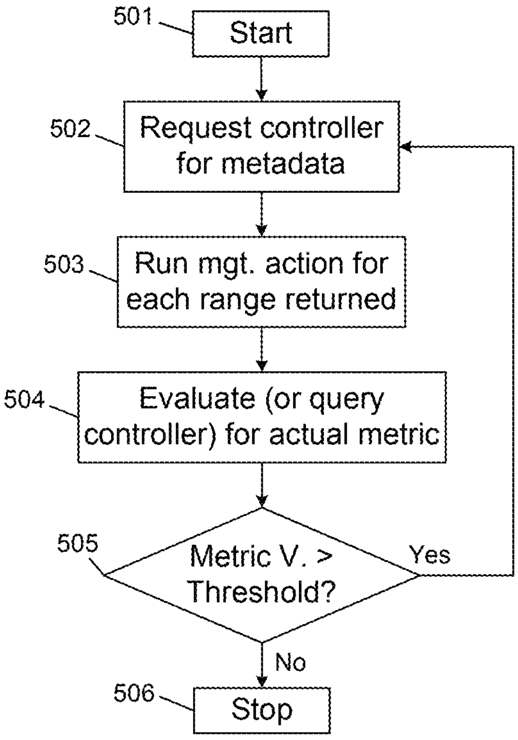
FIG. 5 is a flow diagram that illustrates host tasks in a cooperative memory management scheme.

FIG. 5 shows a method for host software to query metadata pertaining to pending management tasks; the host software can then determine the existence of a condition and optionally execute the response it deems appropriate. The process starts at step 501. At step 502, host software-either in response to the management condition being detected with one of the methods described above or at will-requests the controller for metadata. For example, the requested information can be in the form of a map that verbatim passes tracked subdivision-specific usage data to the host, for example, by providing a bad block, EU or page utilization map to the host (e.g., for an address range or for all management memory). At step 503, for each metadata range returned, host software performs any processing appropriate on returned metadata. At step 504, if management action is to be performed in response to the management condition being detected, host software either evaluates a current metric based on actions performed or queries the controller for a value. Based on the value obtained, at step 505 the host software checks if the condition still holds and if more metadata needs to be requested. On a positive determination, the process loops to step 502 where additional metadata is requested. If the determination is negative, the process concludes (step 506).

As mentioned, the cooperative memory controller of this disclosure can track many different types of information representing subdivision-specific-usage. This tracking information can be in the form of metadata 600 that represents one or more parameters, illustrated in FIG. 6. A first tracked parameter represents unit state 605; in the case of an EU, this field can be used to store data indicated whether the EU is bad. Alternatively, this field can also be used to denote whether the EU contains valid host data, or is otherwise available for allocation to the host or to the controller. Status 610 can be used to track any active controller operation. Erase count 615 keeps track of the number of program/erase cycles to date for the particular unit (e.g. the particular EU). An age field 620 keeps track of how long it has been since data was written to the erase unit. Time in this context can be represented in many different equivalent manners, for example, based on a time stamp or any other desired numerical value or other metric. Read count 625 identifies how many reads have been performed for data stored in the unit (e.g. EU) since the last erasure. In one embodiment, time since last read can be tracked, e.g., with those memory controller or host calculating time for the EU. Address 630 keeps track of a logical address associated with the erase unit. Release Count 635 identifies number of pages within the particular unit (e.g., EU) that have been released. The bitmap field 640 lists or otherwise identifies pages within the erase unit that are free (i.e., available for writes), that are valid (with actively-used data), or that are released. Depending on embodiment, this type of data can be maintained in a variety of ways; for example, more than one field can be used to track each of these parameters, or release status can be inferred from valid data status, or vice versa. Other alternatives are also possible. The bitmap field can also be used to indicate whether the pages in the particular EU were written out-of-order. The remapped flag field 645 indicates whether the EU has been allocated to defect management. In another embodiment, the above metadata could instead be tracked on the basis of logical erase unit, with a mapping to the physical EU also tracked as part of the metadata.

Figure 6:
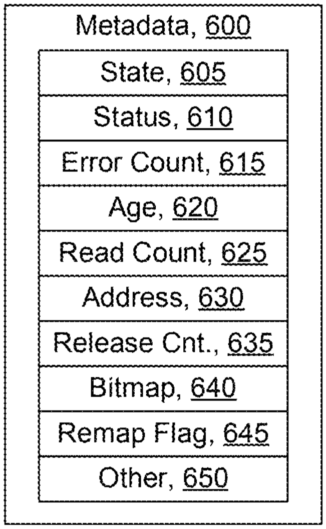
FIG. 6 a diagram showing examples of information that can be kept by a memory controller for each of plural physical subdivisions of memory.

FIG. 6 should be understood as providing non-limiting examples only, that is, not all of the listed data must be maintained by a memory controller, and each identified field should be viewed as optional. Similarly, there are also many other types of data, beyond those specifically illustrated in FIG. 6, which can be used.

B. Specific Management Tasks.

Flash management tasks discussed below can be grouped according to three primary categories: Defect Management, Wear Leveling Management, and Garbage Collection Management. Note again that these management tasks are not necessarily unique to flash memory and that techniques disclosed herein can be applied to other memory forms as appropriate. A memory controller with hardware to support all forms of memory controller-host interaction described in this disclosure has logic that is multimodal or can be customized support management schemes specific to the desired implementation. That is, optionally, a single memory controller design can support a number of configurable options (or modes) for allocating responsibility for these tasks as described below. Prior to discussing these options, however, it would first be helpful to revisit some of the capabilities provided by the structures described above. Once again, in one embodiment, information can be tracked by the memory controller and made accessible to the host in a manner that helps reduce reliance on a memory controller to maintain detailed address translation tables. That is, for purposes of the discussion below, it should be assumed as a default that (1) the host maintains a reasonably-accurate understanding of physical location of data in memory and is thus capable of directly addressing data to the specific physical locations in memory at which the data will be stored, and (2) many of the operations which might traditionally compete with host read/write requests will instead be initiated by the host, i.e., such that tasks are schedule so that there is no competition.

1. Capabilities.

a. Wear-Aware Writes.

As discussed above, the host can issue commands to the memory controller requesting a listing of space that is available for writes, that is, either EUs that are erased, or pages in EUs that are not yet written to following an erase operation; this information can be returned with wear data (used by the host to selectively direct new writes as a priority to space that is relatively more virgin). That is, generally speaking, the host need not track available (free) space and in one embodiment can simply at any time request an update of available space by explicit command to the memory controller. The host can rely on this information for a period of time (e.g., until its list of available space grows low) and the host can then schedule garbage collection, space reclamation and/or erase operations at a time convenient to the host.

Figure 7:
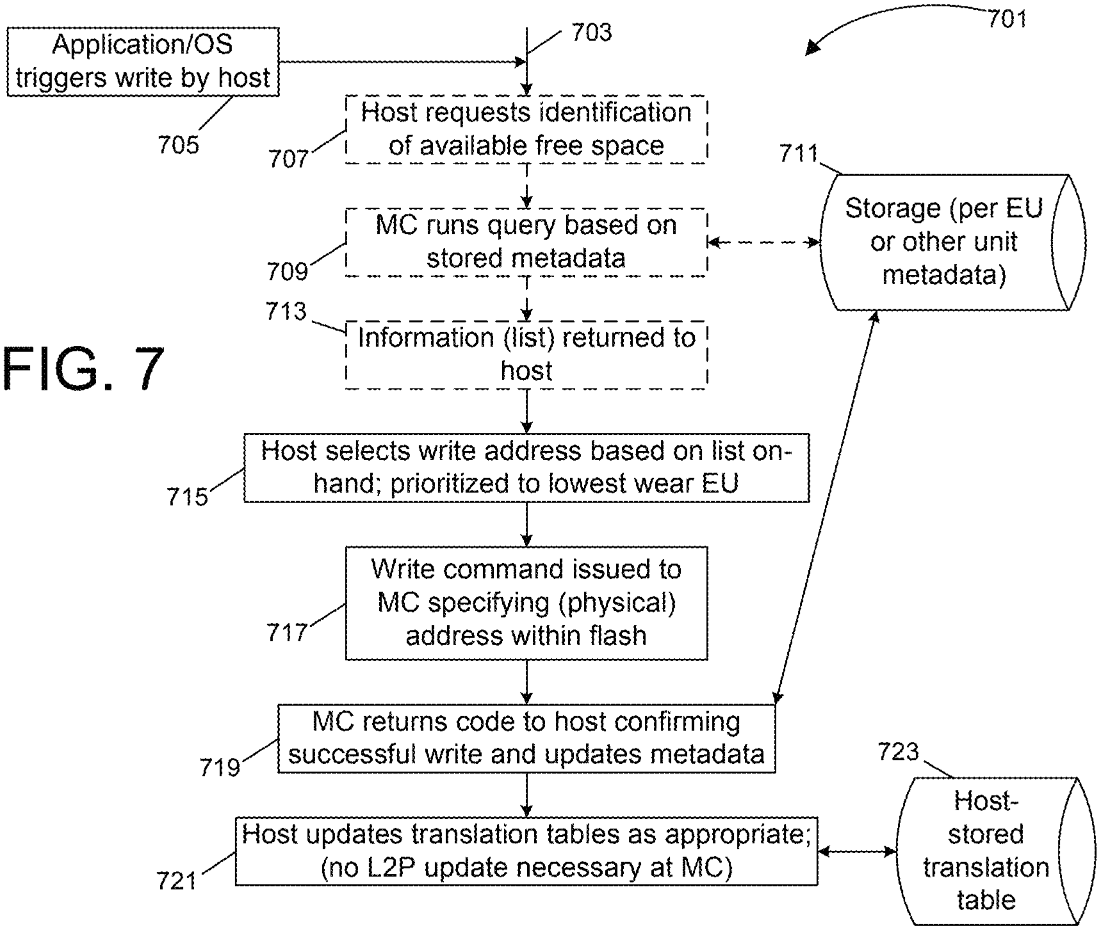
FIG. 7 shows a process associated with wear-aware writes.

FIG. 7 shows flow for a method 701 by which a host targets writes of new data to specific physical addresses in flash memory. The method begins at 703 in FIG. 7. Note that invocation of the method can be triggered by the need for an application or an operating system to write data to memory, per numeral 705. The host is responsible for having a list on-hand with available free space; this list can be periodically updated by the host via query to the memory controller, e.g., after an erase operation is performed. Note that a steps associated with such a query are illustrated in phantom-line boxes in FIG. 7, i.e., are designated by function blocks 707, 709 and 713. That is, optionally in connection with an erase operation, the host requests the memory controller to identify all free space, sorted or prioritized in order of least wear; this listing is determined by reference to the memory controller's metadata repository 711. In a system having multiple SSDs, the host can maintain a dedicated table for each SSD or, alternatively, it can instead build a table spanning memory space for multiple SSDs using sorted information from each SSD. "Available space" or "free space" as mentioned earlier refers to space that has previously been erased in flash memory but has not yet been written to, meaning it is available for immediate programming (i.e., writes). Per numeral 715, the host then chooses a write address for data based on the list. Note that other priority schemes besides those listed above can also be used; as a non-limiting example, space can also be assigned for writes based on data type (e.g., specific file types) and other criteria, tracked or otherwise. After selecting a suitable destination address, the host then issues a write command to the memory controller specifying a desired physical address within flash memory, per numeral 717. As indicated by function block 719, the memory controller then manages the write process and, once successful, returns a code to the host confirming a successful write. The memory controller also updates the metadata repository (711) stored for each pertinent EU (e.g., to indicate that the assigned space is now taken, and to update any other tracked parameters regarding the data or use of the particular memory space). As reinforced by function block 721, the host then updates its own translation tables (723) as appropriate, i.e., with little to no L2P translation performed by the memory controller. In embodiments where a memory controller is to perform its own defect management (i.e., marking the intended physical address as "bad" with data relocation) or is to otherwise perform delegated relocation or copy without immediately reporting remapped (L2P or P2L) information back to the host, L2P translation is advantageously restricted to a few, notable situations. For a NVMe compatible implementation, these processes can once again be implemented with a vendor specific command or API. For example, the host can issue a command requesting LUN ranges and the amount of space that the host software is considering to allocate. Upon successful completion, the command returns a list of erase unit size logical block address ranges, prioritized by wear, and described by (LUN, offset) pair or single offset value (if the LUN was specified in the host request). A returned command status code can further specify whether the requested amount of space was available, whether the request was satisfied or whether further calls are required. The host then directs its writes as appropriate, directly specifying addresses for pertinent memory operations.

Note that writes targeted in the manner indicated above will inherently tend to level wear in flash memory, thereby reducing the need for wear leveling relative to some conventional schemes. As further noted below, even with such a scheme, asymmetric wear is possible (e.g., reserving physical address space for multi-page writes and reads can inhibit symmetric wear). Therefore, cold data detection and consequent data relocation is advantageously performed even where wear-aware programming is performed, i.e., to perform "limited" wear leveling as described above.

b. Page Underutilization and Stale Space Reclamation.

To address page utilization issues, including the presence of stale (unused) data, the host in one embodiment can advantageously enquire at any time as to the extent of page utilization and/or aged data present in a flash device or SSD. A similar analogy exists for enquiries related to tracks in a band of shingled magnetic media. First, note that updates of memory content in such memory are typically processed as a copy-on-write operation, which writes updated data to a new memory location, leaving the old memory location in an unusable state (at least until the subject EU is the target of an erase operation). Note that this operation can be performed directly by the host, i.e., with the host reading data from a first physical location, modifying that data, writing the modified data directly to a second physical location based on a listing of available space, releasing the first physical location and updating metadata for the second physical location. Over time, EUs can acquire greater and greater numbers of released pages, and so, experience low page utilization in terms of a decreased population of still-referenced pages. Also, as certain times, it can be beneficial to inquire as to infrequently written data, so as to proactively assess whether any data should remain at its current location. That is, while wear-aware writes do effectively distribute wear, data that is only infrequently changed (e.g., a media library) can still be effectively tied up as infrequently written memory space while other memory space is more frequently cycled. "Cold data" detection processes (as well as "hot data" detection processes) can therefore be run to identify this data and determine whether this data should be moved, and optionally consolidated with other data, or potentially moved to other dies or storage drives. This is to say, "cold data" can be moved to better distribute wear in a given memory space, and if that "cold data" has read/write characteristics similar to other "cold data," the respective data can be consolidated in one or more specific EUs or moved to a different plane, die or drive, or to another tier of a multi-tier storage system. This also enables the host to better match data access patterns to media characteristics, such as access latency or available capacity. Note that shuffling various data based on type can help improve the efficiency with which memory is used and also help better distribute wear.

As with the various schemes presented above, depending on implementation, either the host or both the host and the memory controller can participate in this type of evaluation. For example, the host can issue a command (e.g., a vendor-specific NVMe or SCSI command) specifying an EU or a LUN or a range of memory space. Upon successful completion of the command, the memory controller returns information representing the amount of capacity used by, e.g., cold data, either on a global basis (e.g., by returning a map) or can identify "cold" or "hot" status for a specific LUN identified by the host. The host can also (or instead) instruct the memory controller to asynchronously generate a notification any time data meeting a specific "hot" or "cold" threshold satisfies a predetermined threshold. For example, in one implementation, a cooperative memory controller receiving an erase command automatically queries EUs present in the pertinent memory space to determine whether a deviation exists from a target wear level (e.g., based on erase count deviation). The memory controller can also provide other types of asynchronous updates to the host, for example, in response to a periodic cold data check, with either raw metadata being returned to the host, or with the memory controller performing a query and returning pertinent data (e.g., an indication that data at a specified location does not meet thresholds such that it would be considered "cold"). Other operations are also possible. As with the schemes identified above, logic on board the memory controller receives the pertinent command, sets registers and initiates routines as necessary to synchronously or asynchronously provide the requested data.

In some embodiments, as mentioned, the host is provided with the ability to request stale space identification either for a flash memory as a whole, or for a specific LUN range. A function call to this effect can be implemented with a vendor-specific command that returns a list of EUs described by one or more offset values (e.g., based on an offset to a LUN if a LUN was specified in host request). Host software can proactively use this method to assess units with stale data or in the context of a request for relocation candidates. Such a synchronous process could be advantageously applied in response to capacity pressure or other situations requiring immediate action. Asynchronous processes can also be used, for example, pursuant to a host command that the memory controller is to notify the host any time global page utilization, EU-specific utilization, or available memory space match host-specified thresholds. Note that in a storage system having multiple dies, planes or drives, a host can choose the most suitable destination for data relocation, potentially including another die, plane or drive. For example, a host can elect to relocate data from one SSD onto another SSD, or even onto another memory type (e.g., a HDD). If host chooses to relocate valid or "cold data" within the boundaries of the flash memory drive where this data resides, these techniques provide a method to relocate data without first reading it into host memory, thereby saving IO bandwidth and other system resources. That is, the host can delegate a data relocation operation to the memory controller; with such an operation, the host first queries the memory controller for a list of free address space (optionally meeting some criteria), schedules a relocation and then (at the appropriate time) provides a relocation command to the memory controller, with both source address and target address specified.

i. Delegated Copy/Data Relocation.

Figure 8:
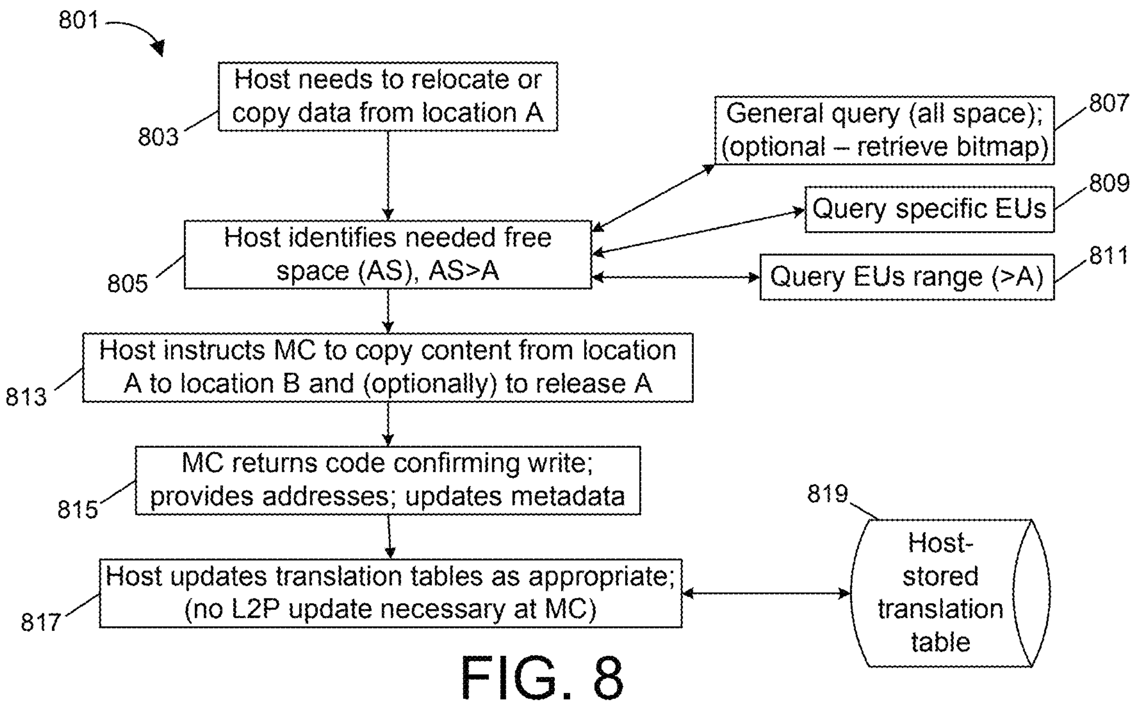
FIG. 8 shows a process associated with a delegated copy operation.

A delegated copy operation can be scheduled by the host in a manner (a) so as to not collide with ongoing data operations, and (b) without requiring movement of the affected data either to or from the host. Such a process is illustrated in FIG. 8 by reference numeral 801. More specifically, the host first determines that it needs to relocate or copy data, per reference numeral 803. As a non-limiting example, such an operation could be performed for an EU or band determined to have one or more defective memory cells. Alternatively, such an operation could be performed if page utilization for (e.g.) two or more EUs is low and the host wants to consolidate "valid" data so that one or more EUs can be erased, thereby freeing all pages or other logical blocks associated with that EU. Still further, such an operation can be performed for cold data, to move it to a new physical memory address. Also, in a multi-die (or multi-plane) context, such an operation can be initiated by the host for the purpose of balancing released/free space across dies or planes, i.e., to maintain a reserve of space in each array so as to support ensuing multi-die or multi-plane writes. Depending on the amount of data that must be copied, the host then identifies free space needed to hold the data to be copied, per function block 805. This query can be satisfied, for example, by retrieving information (e.g. a bitmap) representing all space managed by the memory controller; alternatively, the host can also query specific EUs or can indicate to the memory controller the amount of space needed, with the memory controller returning a list of available space. These options are generally indicated by reference numerals 807, 809 and 811. With addresses for both existing and recipient data locations identified, the host then issues a command (813) containing these addresses for the memory controller to perform a delegated copy operation. As an optional, implicit part of this command, the memory controller can be configured to release pages of the original source addresses following such a copy operation; note that with pertinent pages "released," the prior memory locations are in a condition where they cannot be written to until the entire EU associated with those pages is first erased.

As another optional command feature, the memory controller can be configured to automatically check whether such a release completely frees the pertinent EU (i.e., as a release of the "last page") and to initiate an erase operation for the EU if this is the case. The memory controller then (815) returns a code to the host confirming successful write and updates metadata for the pertinent EUs. Finally, per numerals 817 and 819, the host updates its translation tables such that the host can directly address physical locations of memory, thereby freeing the memory controller from the bulk of translation duties.

In one embodiment, a vendor-specific NVMe copy command can be used to specify a source logical or physical block address and destination logical block or physical block address. Multiple pairs of source and destination addresses can be specified by a single command; if such pairs are specified, any such copy operations are executed transparently by the memory controller until the argument list is exhausted or until the operation fails.

Note that a delegated copy operation as just described can provide substantial performance benefits, i.e., the memory controller is relieved from the bulk of address translation duties, with the host being primarily responsible for issuing commands that directly specify physical address. Furthermore, the use of the delegate copy operation charges the host with scheduling of copy operations, with the memory controller being responsible for completing a delegated copy operation once issued; since the host is in charge of scheduling such a command, it can once again pipeline command issuance so as to not unduly interfere with read and write operations, and it can hide a delegated copy operation behind operations in other memory (e.g., other planes or SSDs). Delegating the copy operation to the memory controller frees up host-controller interface bandwidth that might otherwise be consumed by the need to send data to be copied first from the controller to the host and then back from the host from the controller.

ii. Explicit Erase.

Memory bandwidth competition between host and memory controller can be further reduced through the use of an explicit erase command. That is, one optional design takes scheduling of erasing of flash memory out of the hands of the memory controller and vests it directly with the host. The host therefore pipelines issuance of explicit erased commands at times when flash memory (e.g., a particular SSD) has bandwidth to process such a command; as before, in an implementation featuring multiple dies, planes or drives, a host can hide (stack) an explicit erase to one of these structures behind data operations to another. Note that in a multidrop or other shared command path system, such an embodiment can interleave commands across multiple dies or SSDs, such that explicit erase operations are performed in one or more dies or SSDs while data is exchanged in the performance of a write or read command in a different die or SSD (e.g., with data being exchanged over a shared data path).

Figure 9:
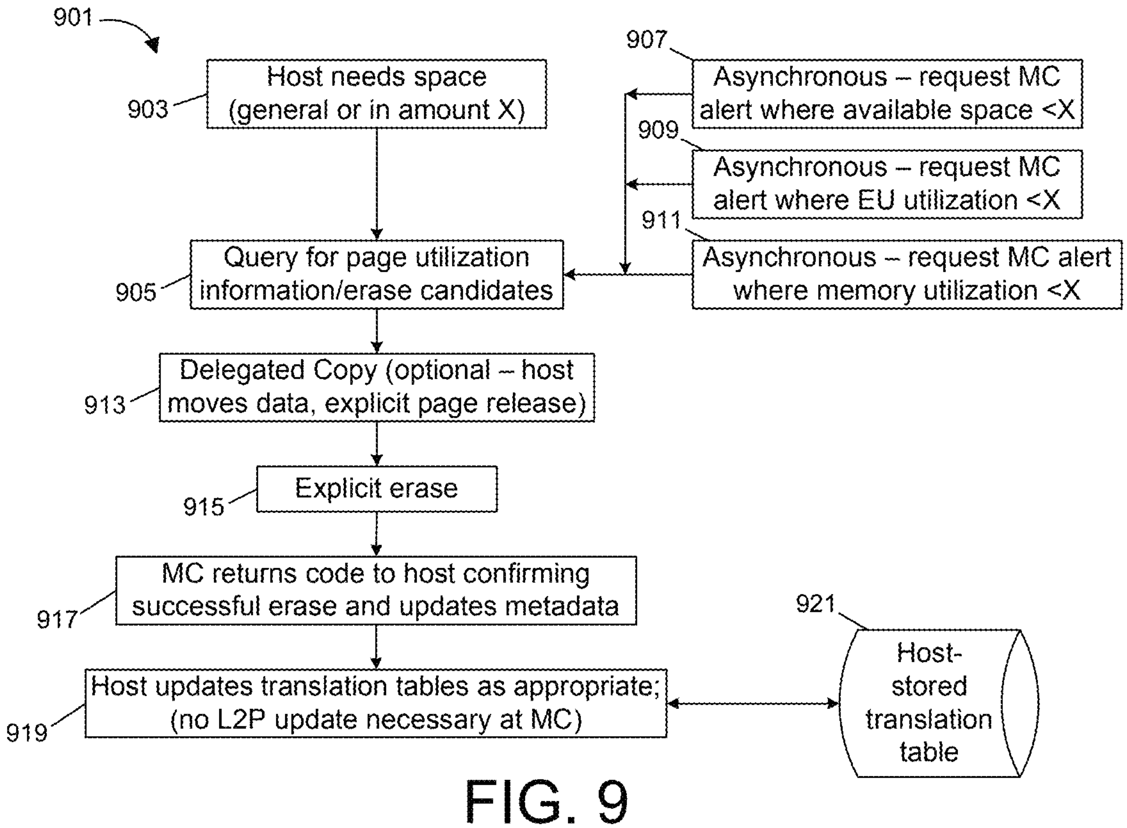
FIG. 9 shows a process associated with an explicit erase operation (or relocation of data and recycling of previously used memory space).

FIG. 9 illustrates a method 901 for explicit data relocation and/or erase operations. The host schedules an explicit erase operation to occur either immediately, or when it has sufficient spare bandwidth. As indicated by numeral 903, typically this will be triggered by a condition when the host needs space (e.g., of amount X). The host then issues a command (905) to the memory controller querying erase candidates based on low degree of page utilization. Note that with such a command, available space is not counted, i.e., such space is already free and available-rather, in responding to such a query, the host seeks to identify space that is released (not in active use) and for which an erase operation must be performed for entire EUs before constituent space can once again be made available for programming. An explicit erase command, data relocation command (e.g., delegated copy, referenced above) or a space reclamation command can be performed as part of a garbage collection operation.

As with commands discussed previously, synchronous or asynchronous commands can be issued by the host, depending on desired implementation. Where the host immediately needs free space, it can issue a synchronous command to the memory controller, for example, requiring a listing of units (0-*n*) for which page utilization falls below a specific threshold (e.g., any EU where released page space is greater than a threshold, e.g., 50% of an EU's capacity). Many choices of metric are possible, and in some embodiments, complex conditions can be evaluated (e.g., EUs where more than 50% of pages are released, but where less than 10% of space is currently available). In response to such a command, the memory controller returns a listing of EUs (or logical units), sorted by any desired priority scheme (e.g., by lowest amount of wear). Asynchronous commands can also be issued, as represented by numerals 907, 909 and 911, seen at the right of FIG. 9. For example, some designers may choose to set a condition where the memory controller unsolicitedly sends an alert to the host any time "available space" tracked by the memory controller falls below a specific threshold, e.g., less than 10% of total capacity managed by that memory controller. Alternatively, the memory controller can be configured in some implementations to alert the host in connection with any page release if that page release causes the subject-EU to have page utilization below a specific threshold (e.g., 0-20% of that EU is in active use, or #pages released >60%, representing a possible space reclamation candidate). As yet another example, a memory controller can be configured to notify the host any time overall memory (under) utilization (e.g., released page count to valid page count) exceeds a specific threshold. Commands that invoke these functions are examples of asynchronous commands, because the memory controller might respond immediately (e.g., if the specified condition were already satisfied) or at a later point in time (e.g., at a time of later occurrence of the condition specified by the command). As noted by numeral 913, a delegated copy command can then be executed by the host to relocate any valid data from an EU selected for an erase to a specified target, with all constituent pages of that EU then being released or otherwise unused. Then, per numeral 915, the host issues an explicit erase command. Note that for embodiments that use reserved physical space that are preallocated for multi-page writes, the host can include logic that ensures consistency for erased units; that is, if one EU associated with multi-page writes is erased, it may be desired to erase counterpart EUs (e.g., in adjacent planes for multi-plane writes), and host software can be configured to automatically check related or linked space. The memory controller can manage the erase operation (e.g., as a sequence of P/V cycles applied to a substrate well of affected memory) and return a code to the host confirming successful erase for each affected EU (917). In a NVMe-compatible embodiment, an explicit erase command can be implemented using a vendor-specific extension of the "Deallocate" administrative command. The memory controller at this time also updates its local metadata repository for the memory in question, for example, identifying all logical units of the pertinent EU as "available," adding the EU to a list of available space, and so forth. Finally, upon receipt of the confirmation code from the memory controller, the host then updates its translation tables as appropriate (919/921).

Note that once again, explicit erase provides a benefit in that this operation is scheduled by the host (i.e., to avoid conflicts), with the host maintaining primarily responsibility for L2P address translation.

C. Determination Of Geometry and Physical Addressing.

To facilitate cooperative memory management and otherwise permit the use of discrete storage drives, a cooperative host and/or cooperative memory controller can provide a mechanism to permit the host to have insight into flash array geometry. To this effect, the host can request (or the memory controller can transmit to the host) information indicating the type of memory present, capabilities of the memory controller and other parameters. Such a task can be implemented with a vendor-specific extension to the NVMe Identify Controller command, where the memory controller responds by returning information such as the number of channels, targets per channel, LUNs per target, and number of EUs per LUN, and whether the memory controller supports specific management schemes for defect management, wear leveling or garbage collection, discussed below. Geometry information can also additionally include physical EU and page size, as well as many other types of information. This information can be used by a host to configure operation with the particular memory device or drive, and to configure wear leveling, garbage collection and other schemes as appropriate. For example, the host and/or the memory controller can upon power-up request device configuration, and can then set the pertinent scheme(s) by responsively configuring a mode register. The pertinent scheme can be selected according to policy (e.g., based on the configuration of memory available or other system requirements).

2. Management Tasks: Configurable Allocation Of Responsibilities.

A cooperative memory controller and cooperative host can generally support one or more of a host-owned, memory controller-owned, or shared schemes for managing various tasks associated with flash memory. The particular choice of configuration is an implementation choice, and can depend in any given system of the type of data being managed, desired performance parameters, file management or network policies, or other factors. For example, a music server or video server application (e.g., where data has read-mostly characteristics and where data is read intermittently) might be more amenable to a host-owned scheme than to a memory controller-owned or shared scheme.

a. Defect Management.

Flash memory, as with any storage media, is potentially subject to data errors. While read errors are proactively handled using EDC techniques, write and erase errors may occur at random over the device lifetime, with some units initially marked unusable (i.e., bad) and others being initially good, but later being found to be bad and marked as bad over time. These units, whether initially bad or later marked as bad, are tracked by either the flash memory controller or the host so that writes of data are not directed to these units. Thus, a cooperative memory controller and host will typically support a scheme for managing defects which are detected in flash media. As with other management functions, whether a given implementation uses host-owned, memory controller-owned or shared defect management can be configured according to preference, for example, adapted at initial power-up (for example, in dependence on detected device or system geometry, policy and other considerations), via the programming of a mode register. For example, the registers illustrated in FIG. 3C can be used for this purpose. Note that in each mode or scheme discussed, the memory controller can still provide some form of cooperative input to the host, for example, by serving stored metadata, providing functional returns to host-initiated queries, using on-board storage for metadata and associated processing logic. That is, a cooperative or shared management task should not be confused with a cooperative memory controller that provides certain functional services (e.g., including the serving of subdivision-specific data) that can be electively used by the host.

i. Host-Owned Defect Management.

For host-owned defect management, units marked unusable by the chip or device manufacturer are identified during first time device initialization. Host software is then expected to query the memory controller or the memory for this defect list using the method provided by the controller.

In an embodiment where host-controller communications are NVMe compatible, the host software and flash memory controller can interact using a vendor-specific GetLogPage command. When issued by host software, such a custom command is structured so as to return a log page describing logical address ranges marked as unusable, with each range identified by starting logical block address and the length in logical blocks (e.g., in pages where a page is the logical block size identified by the host). Recording defect areas so as to proactively manage further read and write access to the correct address is then the responsibility of the host. Note that the effect of such host-owned defect management is that once again, there is no need for L2P translation at the memory controller—the host registers and tracks defects and consequent changes in physical locations of data, and then it directly accesses that data as appropriate.

Subsequent write errors that occur can be incrementally reported back to the host software without further memory controller involvement in directly managing those defects. Such general interaction is generally designated by reference numeral 1001 in FIG. 10A. Generally speaking, the host first initiates a write command, per numeral 1003, and the memory controller detects the occurrence of a write error, for example, a timeout after reaching a programming limit (e.g., maximum write time out or number of program-verify cycles); this write error is then reported back to the host (1005). The error condition is then recorded by the host (1007) so as to avoid further writes to the area in error, with writes directed by the host to another location. The host marks the unit (EU or other unit as bad). In addition, any memory operation retry in this mode is advantageously controlled and performed solely by the host software, with the memory controller confirming a successful write to the host and also updating local metadata for correctly written data (and optionally, for the bad blocks as well). Note that, once again, the fact that the host updates translation tables so as to avoid future writes to the location avoids the need to maintain L2P translation infrastructure at the memory controller (1011, 1013). When configured to execute in this host-owned defect management mode, the controller does not need to reserve any spare for defect area remapping and thus can advertise full device capacity to the host, such that the memory controller is not required to implement even a minimal L2P capability for this mode. That is to say, the memory controller need not reserve spare capacity since all address assignment and defect tracking is owned by the host, i.e., such that there is no form or remapping performed by the memory controller and all physical address assignment to new writes is exclusively owned by the host.

When the host owns defect management, the memory controller is typically inhibited from attempting a unit erase operation due to the inability to handle erase errors that could occur. To overcome this issue, for host-owned defect management, the host explicitly initiates all erase operations, with a status code returned to the host software that specifies whether the erase operation completed successfully or failed. Recording the unit that experienced an erase error so as to avoid further writes to a "bad" EU is then once again the responsibility of the host.

Note that it was referenced above that the memory controller, the host, or both can track lists of free erase units. In connection with defect management, a reserve of available space is kept on hand in order to provide a pool for immediate reassignment of writes when a defect is detected. Such a list can be implemented in a manner that supports midstream insertion of an EU after erasure. In one embodiment for example, when spare capacity is low, the host can initiate an operation that identifies candidate blocks for erasure in a given memory die, device or drive. A memory controller sharing responsibility for defect management might already be charged with managing a list of erased units that it holds for spare capacity. A cooperative host can identify pages with low page utilization, move any active data, instruct the erasure of associated EUs, and instruct the memory controller to add newly erased units to its list of free pages. If desired, this list can be organized according to a desired priority criteria, e.g., as a FIFO list, according to wear, or using another priority scheme. In one embodiment, the list can be organized as a B-tree, or alternatively, as a hierarchical doubly linked list.

In addition to prioritization, as indicated earlier, it can be desired to factor whether affected memory is used for multi-page writes and reads. For example, if one EU (storing at least some multi-page data) is determined to be a candidate for data relocation, then perhaps any "paired" EUs in adjacent planes should be subject to the same scrutiny; the host optionally includes software to manage this task. Alternatively, if a separate pool or class of multi-page space is to be kept on-hand, a separate "spare capacity" process can be used for each such pool or class. Specifically, for multi-plane or multi-die operations, a process can be invoked to ensure that each plane/die has at least a minimum pool of free space, so as to avoid inhibiting writes to multi-page space.

ii. Shared Defect Management.

While providing host software with complete control over media defects, host-owned defect management can exert an extra burden of defect list management on the host software; this may be undesirable for some applications. Shared responsibility for defect management using principles of this disclosure can instead be used. That is, the memory controller can detect defects in accessed memory and can maintain a defect list across power failures, reporting this information to the host as needed. Upon detection of a defect, the memory controller reports this information to the host and optionally marks physical blocks associated with the error as bad. If the memory controller is operated in a cooperative wear leveling mode, then depending on embodiment, the memory controller will not suggest a defective area for allocation.

In one embodiment, write errors as they occur are reported back to the host software. Host software can then instruct the memory controller to mark the particular physical block of memory cells associated with the error as bad (and to update local information that tracks defects). In a NVMe context, such a method can be performed using a WriteUncorrectable command that, when issued, instructs the controller to add a specified logical block address range to the bad block list, maintained in storage of the memory controller.

Units marked unusable by a chip manufacturer can be identified during first time device initialization and saved in the defect list in the controller's internal memory. The memory controller preferably further guarantees persistence of the defect list across power-cycles, so that defect information is always up-to-date. Host software is permitted to inquire at any time whether a given address range or block has been previously marked as bad, or to query the memory controller for the complete defect list. In a NVMe embodiment, such a query can once again be implemented with a vendor-specific NVMe administrative command.

Figure 10A:
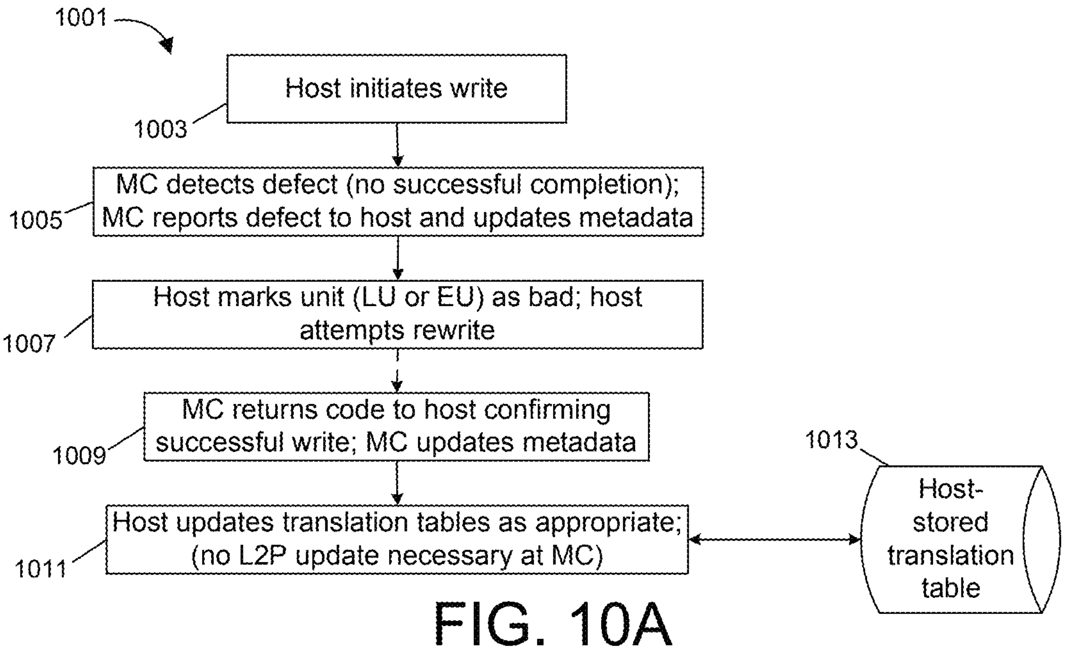
FIG. 10A shows a process associated with host-owned defect management.
Figure 10B:
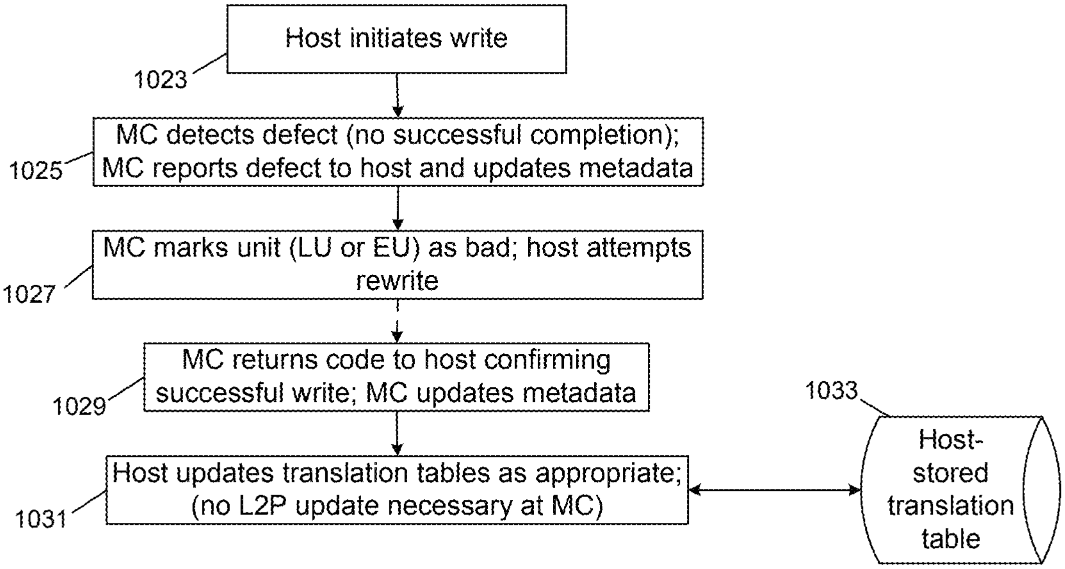
FIG. 10B shows a process associated with shared defect management.

As seen in FIG. 10B, as with host-owned defect management, a cooperative memory controller can once again provide for an write operation to be initiated by host software (1023), with an alert code being returned in the event that the write operation failed (1025). Host software may then request the memory controller to identify the bad unit in the memory controller's defect list and the host then attempts a rewrite (1027). Once again, once the retried write is successful, the host and the memory controller update translation tables and metadata respectively (1029, 1031, 1033). As before, because the host is informed of a failed write and locally maintains precise physical address identifiers for each page, the memory controller is substantially freed from having to provide for an L2P mechanism. When configured for cooperative defect management, a memory controller once again does not need to reserve any spare capacity for defect area remapping, and can instead advertise full device capacity to the host software.

In some embodiments, host software can be permitted to classify an EU or a smaller address range as unreliable due to read error detected using the additional data integrity features mentioned earlier or other host-specific features. Host software can therefore be provided with an option to request that this range to be added to the defect list using the method described above. This option provides for greater flexibility in error detection and correction at a system level.

iii. Memory Controller-Owned (Transparent) Defect Management.

Figure 10C:
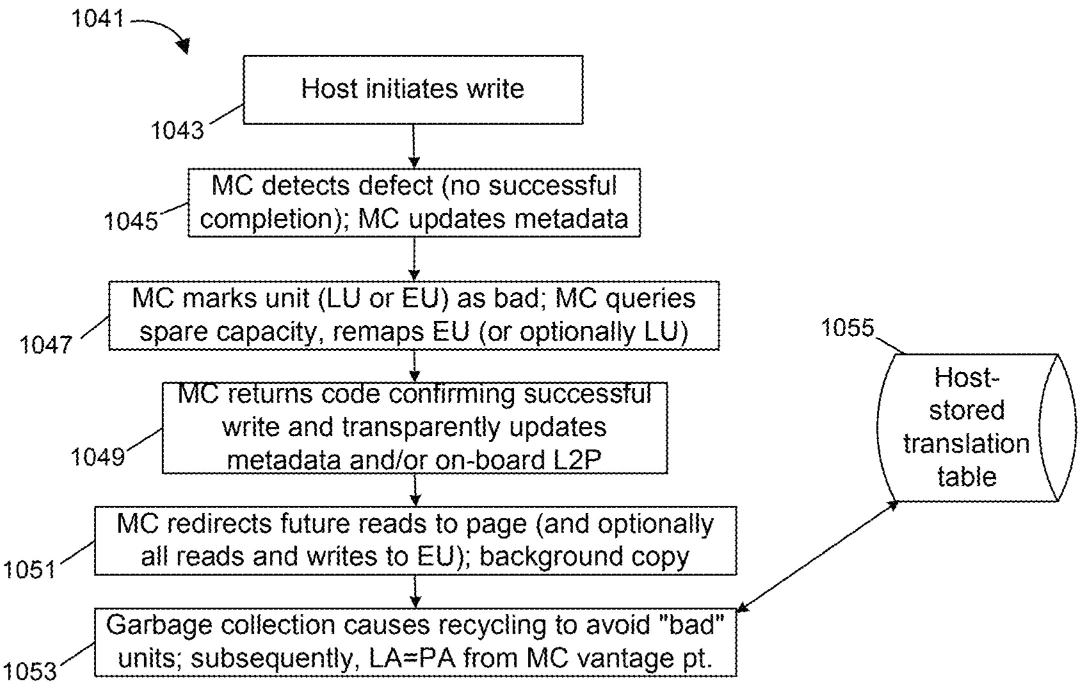
FIG. 10C shows a process associated with memory controller-owned defect management.

Optionally, in situations where the memory controller manages defects, when write or erase errors occur, they are not reported to the host software unless the controller is out of spare capacity (e.g., to remap data). That is, if sufficient spare capacity exists, defective areas can be automatically remapped by the memory controller, transparent to host, and added to the defect list maintained by the memory controller. This configuration is represented by FIG. 10C, and is generally denoted using reference numeral 1041.

As before, a defect is detected in the event of a failed write (1041, 1043). The memory controller detects this error and updates local metadata (1045). However, in this mode, the memory controller does not immediately notify the host. Rather, the locally maintained metadata is updated in a manner that flags a remapping situation, and the memory controller reserves some spare capacity for redirected writes. The memory controller also updates a locally-maintained bad block list (1047); note that as indicated in FIG. 10C, each of these pieces of information can be once again maintained on a per-EU or per-logical unit (LU) basis. When the data is correctly written to substitute EU(s), the memory controller returns a code indicating completion of a successful write (1049). Per function blocks 1049 and 1051, ensuing reads to the remapped data are detected by the memory controller based on correspondence of a read address with physical address of the defective "bad" block; the memory controller transparently obtains the remapped physical address from the metadata associated with the bad block and services read requests directly from the remapped space. Note that when configured in this mode, the memory controller continues to store information tracking usage for each subdivision of memory, and continues to serve this information to the host. The memory controller can also provide query capability as referenced above. As use of the memory progresses over time, and as wear leveling and garbage collection occur, the host will be informed of new available memory that does not include marked "bad" blocks; as a consequence, physical address assignment for new writes ultimately moves remapped data to a different memory location, thereby avoiding the "bad" blocks. In turn, this results in the host once again having a direct physical address for the data in question (1053, 1055). In other words, irrespective of the fact that the memory controller owns defect tracking in this scheme, the extent of L2P remapping is advantageously both minimal and self-limiting. The host manages address translation for data reads, but because defect space in practice will be limited, the memory controller should not require large search trees or other complex mechanisms to perform address translation.

When spare area reserved for defect remapping is exhausted (or falls below a predetermined threshold), the controller issues an alert to the host or otherwise flags an error condition to draw the attention of the host. In a NVMe-compatible embodiment, such an alert can be raised with an asynchronous event notification. The host software can then take the appropriate actions such as switching to another supported defect management mode, initiating garbage collection or data relocation, or using some other process.

Note that if spare capacity is completely exhausted, this even can threaten and potentially halt normal device operations. As alluded-to above, the host can also take management action to increase the amount of defect spare when a defect-spare management condition is detected. That is, host software may pro-actively address potential spare capacity run-out by improving spare capacity by, for example, initiating space reclamation, garbage collection or data relocation operations or using another process that can improve usable device capacity.

b. Garbage-Collection Management.

As discussed earlier, a page in NAND flash memory cannot be rewritten until an entire EU including that page has been erased; this is the P/E asymmetry referred to earlier, and is not unique to flash memory. Some memory controllers operate by detecting an attempt to write to a previously-written page (i.e., a page that has already been programmed but not yet erased) and responsively implementing a copy-on-write operation. With such an operation, the memory controller remaps the page or other logical quantum of data by remapping it to erased location. Over time, the number of unused pages grows without any free space being reclaimed due to the P/E asymmetry. To reclaim released space, memory controllers are periodically forced to run a garbage collection task, where they locate and consolidate partially used erase blocks to reclaim space. Conventional garbage collection practices can require substantial reserved buffer space, up to 20% of available storage capacity, to compensate for non-reclaimable released space, and can compete with write coincidentally initiated by the host. Performance penalties associated with these conventional practices management can be especially pronounced when page utilization exceeds 50-60%.

Host-owned and shared garbage collection techniques permit significant reduction of these performance penalties and associated overhead. As before, in one embodiment, a cooperative memory controller and/or cooperative host can be made configurable so as to support host-owned, memory controller-owned, or shared garbage collection management responsibilities. Host-owned and shared garbage collection techniques are discussed with reference to FIG. 11A, while memory controller-owned techniques are discussed in reference to FIG. 11B.

i. Host-Owned and Shared Garbage Collection.

Figure 11B:
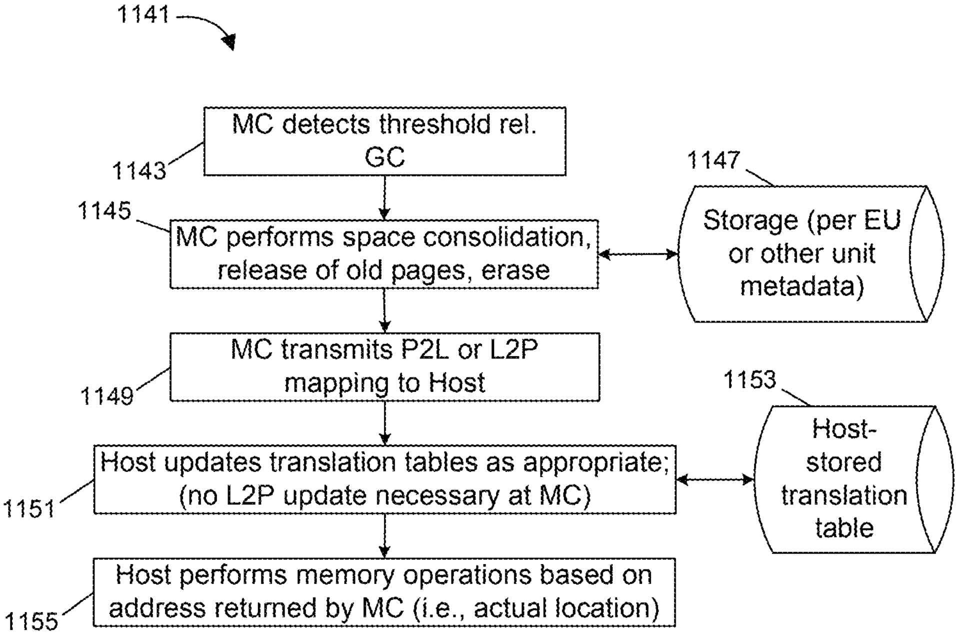
FIG. 11B shows a process associated with memory controller-managed garbage collection.
Figure 11A:
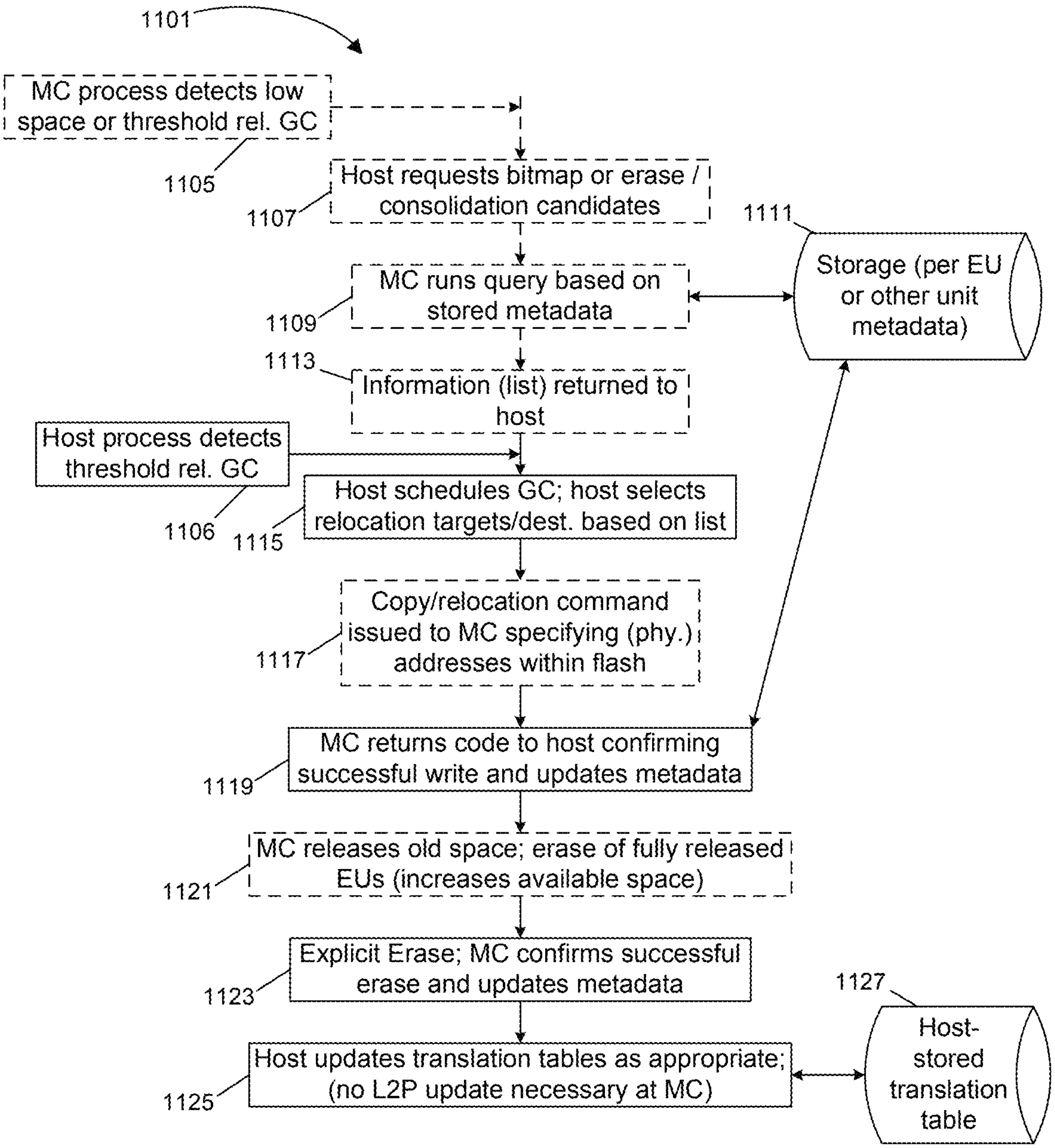
FIG. 11A shows a process associated with host-owned and shared garbage collection.

In a host-owned garbage collection process, generally designated 1101 in FIG. 11A, the host can assume full control and responsibility for garbage collection, including candidate unit selection, and relocation of valid (active) data, and also typically therefore assumes responsibility for released space accounting. The operation is initiated when a host process detects a threshold condition related to garbage collection, as referenced by numeral 1106. Unit erase operations and actions to reclaim free space are thereafter initiated by host software with an explicit erase command, for example, as described in connection with defect management above. The host is further expected to appreciate P/E asymmetry and to apply any garbage collection candidate identification logic to ensure the desired amount of free units or available capacity; the host (or optionally the memory controller) performs released space accounting, to track page utilization for each erase unit. Such functions can be facilitated via the information stored and made available by the memory controller presented by this disclosure, and the queries that can be run to such a memory controller. That is, the memory controller can provide page utilization information to the host, which can determine scheduling, pull data, issue erase commands and rewrite data as necessary. Based on this information, the host schedules garbage collection and selects both source locations and destination locations for any data that is to be relocated (1115). As indicated by dashed-line block 1117, if supported by the particular implementation, the host can delegate a copy operation, for example, as was discussed earlier. Such an implementation has the advantage that a data relocation operation does not require moving data back and forth to and from the host, and thus, does not encumber a data communication path between the host and the controller. Alternatively, if it is desired to copy the data to the host (e.g., to move data to another SSD), the copy/relocation operation can be directly performed by the host. When data is properly written as part of such an operation, the memory controller returns with a confirmation to the host and successfully updates its metadata as appropriate (1119). As denoted by numeral 1121 and as previously discussed, the memory controller can be configured as an option to automatically release old pages that were the source of relocated data, and to automatically erase any EU once the last remaining unreleased page has been released. Alternatively, if this function is not automatically performed, the host then issues an explicit erase command 1123, and the memory controller then returns a code indicating successful erase. Per numerals 1125 and 1127, as the host schedules the operations and is informed of associated physical addresses, the host can once again directly update its own translation tables, without need for a complex translation mechanism at the memory controller.

Dashed-lines in FIG. 11A are also used to discuss shared responsibility for garbage collection management. In addition to host detection of a threshold condition relating to garbage collection, this can also be performed at the memory controller (1105), as a default function or programmatically configured as a result of an asynchronous command from the host. The first task associated with garbage collection scheme is the identification of released, but not erased, memory space present. Accordingly, the host is advantageously provided with the ability to query each flash memory controller present in a memory system as to whether such space is present. Again, this information can be returned in the form of a map or in a manner specific to ranges of addressable memory (1111). In addition, a cooperative memory controller can also be configured to return general metrics such as the extent of page utilization or the number of released pages for a memory plane, die or device in general. This latter information could be used by a host, for example, in selecting a specific one of multiple dies, devices or SSDs as a garbage collection operand. Further, these techniques can also be performed unsolicitedly, for example, they can be triggered automatically by a different type of command or in connection with an asynchronous process; otherwise stated, a different type of command can trigger an alert of the sending of data to the host as a result of a metadata update that causes specific metadata to satisfy a threshold.

In one embodiment, the ability to query a flash memory controller is implemented with vendor-specific NVMe command specifying a particular LUN, or requesting a return of information for an entire flash memory device or drive. Upon successful completion of the command, the memory controller returns information to the host representing the amount of released space that may be reclaimed and the amount of valid data that needs to be relocated for reclamation to happen. In yet another embodiment, the memory controller can asynchronously notify the host when released/free non-reclaimed space reaches a predetermined threshold. For example, a host can issue vendor-specific NVMe asynchronous event request to a particular memory controller that specifies a threshold reclaimable space needed to trigger alert of the host. The flash memory controller then responds asynchronously each time it detects the specified condition, notifying host software of the condition and delivering condition specific information (including any address range in question).

As mentioned, as an option, the host can query (1109) the memory controller for a suggestion of suitable garbage collection candidates. Logic on board the memory controller receives this requires, processes stored metadata (1111), and responds as appropriate (1113). For example, depending on implementation, a response can identify a predetermined number of EUs in order of page (under) utilization. Alternatively, the response could rank all EUs in the flash memory being managed in order of suitability for garbage collection. As a further option, if the host command specified an amount of space to free up, the memory controller could return an identification of EUs which, when consolidated, would provide the specified amount of free space. Other options are also possible. As with other functions described above, the memory controller services this query by processing locally stored information (e.g., metadata, 1111).

Once again, if multi-page (e.g., multi-plane, multi-die or multi-track) reads and writes are to be supported, the garbage collection tasks can be performed for each "linked" or "paired" array, e.g., to ensure consistency across dies or planes in a manner that ensures sufficient available capacity.

iii. Memory Controller-Owned Garbage Collection.

Memory controller-owned garbage collection typically requests some type of L2P tracking local to the memory controller and it therefore entails different considerations than embodiments discussed above. Nevertheless, a skilled designer could implement such a scheme in a manner consistent with a memory controller that tracks and serves information (e.g., metadata) for host access. FIG. 11B depicts one possible method (1141) of managing this process. More specifically, a memory controller detecting a need for garbage collection (1143) performs local space consolidation, data relocation and erase operations (1145). In association with these actions, the memory controller updates its local metadata (1147) and transmits a consequent logical to physical mapping back to the host, together with metadata that enables the host to perform a reverse lookup and consequently build its own address translation table for files (1149, 1151, 1153). Thereafter, the host performs memory operations (such as read commands) based on the physical address of data.

Other schemes consistent with memory controller-managed garbage collection are also possible; a designer, however, wishing to minimize control overhead associated with managing flash memory (including avoiding L2P overhead), will typically elect the clear advantages presented by the host-owned and shared configurations discussed above.

c. Wear Leveling Management.

As noted earlier, flash memory typically can sustain a limited number of P/E cycles, e.g., tens to hundreds of thousands. As the number of times the unit was erased approaches the manufacturer defined limit, the unit wears out and finally becomes unusable such that data cannot be retained.

The cooperative management techniques of this disclosure permit host software to take full or partial responsibility of wear leveling. As before, a cooperative memory controller and/or cooperative host can support configuration of a host-owned, memory controller-owned, or shared wear leveling scheme. Also as discussed before, the pertinent scheme can be selected in dependence on a mode register or system configuration process or at system design time.

i. Host-Owned and Shared Wear Leveling.

Figure 12A:
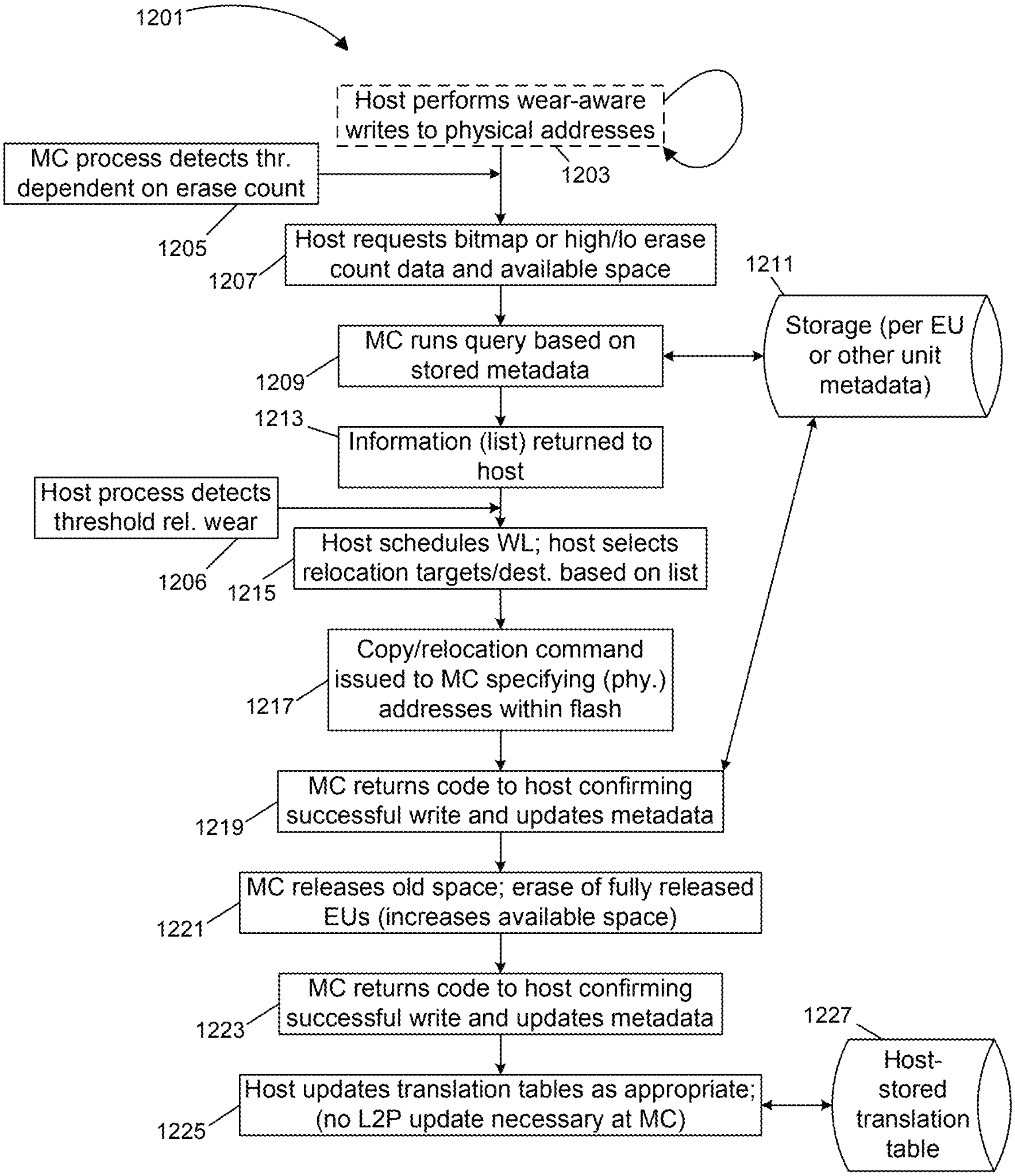
FIG. 12A shows a process associated with host-owned and shared wear leveling.

Host-owned and shared wear leveling schemes are generally represented by FIG. 12A. Generally speaking, whichever scheme is selected, the host can generally improve wear leveling by performing wear-aware writes, as generally denoted by reference numeral 1203. As mentioned, in some cases, wear leveling might still sometimes have to be performed, for example, due to "hot" and "cold" data. Generally speaking, the need for wear leveling can be detected either by the memory controller or the host, as represented by numerals 1205 and 1206; a number of measures can be used for this purpose, such as a detection of a difference in EU wear for a given memory range exceeding a predetermined threshold. Alternatively, a statistical measure can also be used (e.g., statistical variance) to inherently apply a weighted measure across the entire memory range being managed by a memory controller. Once again, if reserved space is to be used to support multi-page writes and reads of different page sizes, it can be advantageous to support either a separate wear leveling process for each class of reserved space (e.g., for 2-page writes), or alternatively, to periodically change the physical addresses used for these operations (e.g., so as to periodically swap EUs for single plane writes with EUs paired for multi-page writes, thereby "precessing" space assignment for each reserved class through available physical space).

For host-owned wear leveling, once again, the host can poll a memory controller to request a bitmap from the memory controller or can maintain its own tracked parameters representing uneven wear. Note that for many embodiments, tracked wear parameters will be maintained at a location consistent with where processes are run to detect wear leveling, but it is also possible for example to use host-monitoring of wear based on memory controller-maintained metadata. Irrespective of the source of the wear data, for host-owned wear leveling, the host identifies candidate address ranges that are to be redistributed or recycled. For example, if wear-aware writes fail to evenly distribute wear, it could be that cold data is being recycled differently than hot data; note that this situation is slightly different than the issue of low page utilization mentioned earlier, i.e., in this case, an EU might be highly utilized for reads, but might have pages that are released only infrequently. If this data is periodically moved, then this underwritten memory can be used to dilute wear attributed to frequently written data. The host can also continuously track such information and, irrespective of the mechanism used to acquire data, the host monitors data to detect occurrence of one or more threshold conditions relative to wear (1206). With host-owned wear leveling, host software assumes full control and responsibility for scheduling and initiating wear leveling, and for selecting source data addresses and destination addresses associated with copy operations (1215). Once again, the host can perform copy operations itself, pulling data back to the host (e.g., for transferal to another drive); it can also issue a delegated copy command as discussed above (1217), for example, for relocations within or across planes or dies within a given SSD. Successful operations are confirmed by the memory controller and also form the basis of updates to metadata (1219, 1211). Release of source pages for copy operations and unit erase operations are again initiated by the host software (1221), for example using an explicit erase command, as described above. When old space is erased and available to receive new data, the memory controller provides a confirmation code to the host (1223), which can then serve as a recipient address for another data copy/relocation operation. Note that many types of tracked data can be used to assist in wear leveling management, for example, tracked metadata representing data type, read frequency, write frequency, and other measures can be considered in determining whether data is "hot" or "cold," and thus whether data should be moved. Also note that with the mentioned confirmation codes, the host once again advantageously maintains a current list of physical addresses for all data stored in flash memory, updated as appropriate following transaction completion (1225, 1227). The use of these physical addresses in association with file structure by the host will be discussed further below in connection with description of an exemplary storage server.

FIG. 12A also represents a scheme for shared responsibility over wear leveling. In such a scheme, the host can be permitted to query the memory controller as to what units are most suitable for allocation based on wear considerations (1207, 1209, 1213). A synchronous command can once again be used (1209) to cause the memory controller to run a query based on stored metadata (1211) and to return a result to the host (1213); as indicated in FIG. 12A, this result can be expressed in the form of a list that identifies a "suggestion" of candidate address ranges that are to be redistributed or recycled. Per numeral 1213, a list can be provided to the host based on time since last write, low wear, and so forth. The host can then explicitly direct new writes to specific EUs or other physical units based on this information. In addition, the memory controller can also be programmed using an asynchronous command to alert the host when a predetermined wear threshold or set of thresholds is achieved (1205). Note that, as discussed elsewhere herein, some limited L2P mapping can still be performed by the memory device, but with the use of direct addressing, it is expected that translation issues can be minimized, greatly reducing the possibility of memory controller task competition with host requests.

ii. Controller-Owned Wear Leveling.

A storage system can also implement a scheme where wear leveling is managed by the flash memory controller; the memory controller manages wear detection transparently to host by itself detecting the need to remap units to ensure uniform wear distribution. In one embodiment, the host can then schedule wear leveling (e.g., data relocation and unit erase), and in a second embodiment, the memory controller can transparently schedule and one or both of these functions. Such schemes still have context in a cooperative host-controller management scheme. For example, a memory controller transparently scheduling and performing data relocation can periodically report new L2P mappings to the host, which then updates its addressing information to implement direct physical addressing as indicated earlier. Further, a memory controller can still make metadata available to the host for most other management functions, for example, cold data relocation via both asynchronous and synchronous mechanisms described above. It should be noted though that if a memory controller transparently manages these functions, the functions can potentially collide with other host requests unless measures are taken to avoid collision; for this reason, in many embodiments, scheduling of wear leveling and other operations involving data relocation, unit erase and so forth can advantageously be reserved to the host.

Figure 12B:
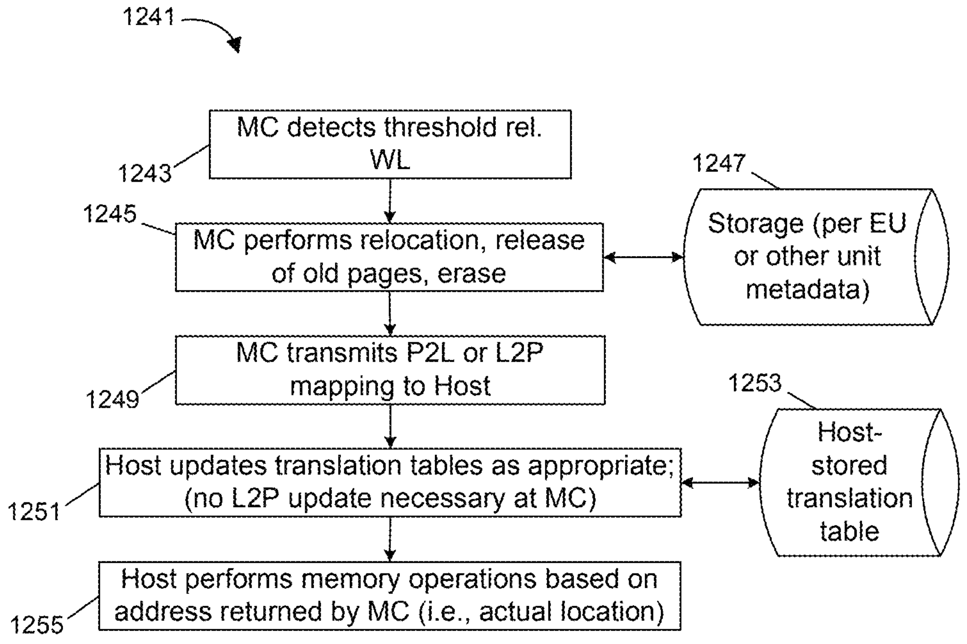
FIG. 12B shows a process associated with memory controller-managed wear leveling.

Memory controller-owned wear leveling typically utilizes some type of L2P assignment and tracking local to the memory controller and it therefore entails different considerations than the embodiments presented earlier. That is, such an embodiment features additional overhead associated with an L2P translation mechanism in the memory controller; even in a situation where such reassignment is limited (e.g., entire EUs are simply remapped to spare EUs, such that for example, internal page ordering is preserved), this can potentially compete with host operations and create unpredictable latencies. Nevertheless, a skilled designer could implement such a scheme in a manner consistent with a memory controller that tracks and serves information (e.g., metadata) for host access. FIG. 12B depicts one possible method (1241) of managing this process. More specifically, a memory controller detecting disparate wear (1243) performs local space consolidation, data relocation and erase operations (1245); as mentioned, these can be advantageously scheduled by the host, with the memory controller then commanded to oversee these operations at the scheduled time. In association with these actions, the memory controller updates its local metadata (1247) and transmits a consequent logical to physical mapping back to the host, together with metadata that enables the host to perform a reverse lookup and consequently build its own address translation table for files (1249, 1251, 1253). Thereafter, the host performs memory operations (such as read commands) based on the physical address of data.

Other schemes consistent with memory controller-managed wear leveling are also possible; a designer, however, wishing to minimize control overhead associated with managing flash memory, not to mention avoiding L2P overhead on a flash memory device, will typically elect the clear advantages presented by the host-owned and shared configurations discussed above.

C. Shared Responsibility for Physical Address Management.

In some implementations, it might be desired for the memory controller to assign physical addresses for new data writes and then report these addresses back to the host; this is to say, in such an implementation, the host might not have architectural features required to assign physical addresses on its end so as to account for in-flight IO operations and to ensure maximum attainable device bandwidth utilization. Under such circumstances, the physical address allocation task can be beneficially delegated to the memory controller. To minimize latency and otherwise benefit from direct addressing in such circumstance, it is advantageous to provide physical addressing assigned by the memory controller back to the host, in order that the host can associate physical addressing with file-level and other logical addressing structures and appropriately update its L2P translation tables. This is to say, as part of the write operation, the memory controller extracts logical address, assigns physical address, updates its tracked metadata to track these addresses, and then reports this addressing information back to the host; the host, based on the logical address it specified and the physical address(es) returned by the memory controller, updates its tracked information so as to maintain L2P mapping. Such a process can also be used by the memory controller to provide address information back to the host in associated with a delegated copy or relocation operation, and with forms of controller-managed wear leveling and garbage collection (if implemented).

In another embodiment, the memory controller further cooperates with the host by keeping track of backward address translations. This enables the host to derive logical addresses of the data block given their physical addresses as returned by the controller in response to queries such as used for managing garbage collection (GC) and "cold" data relocation (e.g., WL) candidates (e.g., such that the host is able to map new physical addressing to the pertinent logical files and addresses). Where the host software requires logical addresses to perform relocation, it can request the controller to return, for each block range suggested in the query response, metadata provided by host software when the block was written. That metadata, in particular, can contain a physical-to-logical mapping allowing for the physical block address as returned by the controller to be translated to the logical block address used by the host storage software. Once again, this permits the host to thereafter use physical addressing, avoiding costly extraneous address translation in the memory controller for IO operations. In one embodiment, this scheme is supported by native memory controller hardware and, once again, can be selected at initial power-up by programming pertinent registers on board the memory controller, such as the registers seen in FIG. 3C.

In a NVMe-compatible embodiment, both types of addressing-related exchanges between the host and the memory controller can be implemented using a NVMe logical block metadata exchange mechanism. To inform the host of memory controller assigned physical addressing (i.e., L2P correspondence), the memory controller specifies as part of the logical block metadata vector the physical addresses assigned to each logical block associated with the host write command. To store the host-provided logical addresses for subsequent retrieval and use (e.g., for GC or WL processes), logical addresses are sent from the host to the memory controller as logical block metadata accompanying a write command, and then are stored as part of the per-subdivision (e.g. per EU) metadata storage maintained by the memory controller for all managed memory.

Note that by using the NVMe logical block metadata structure, both types of exchanges retain the standard IO addressing interface and are compatible with the NVMe structure while at the same time providing the host with the ability to specify appropriate (i.e., logical or physical) addresses as needed.

Figure 13:
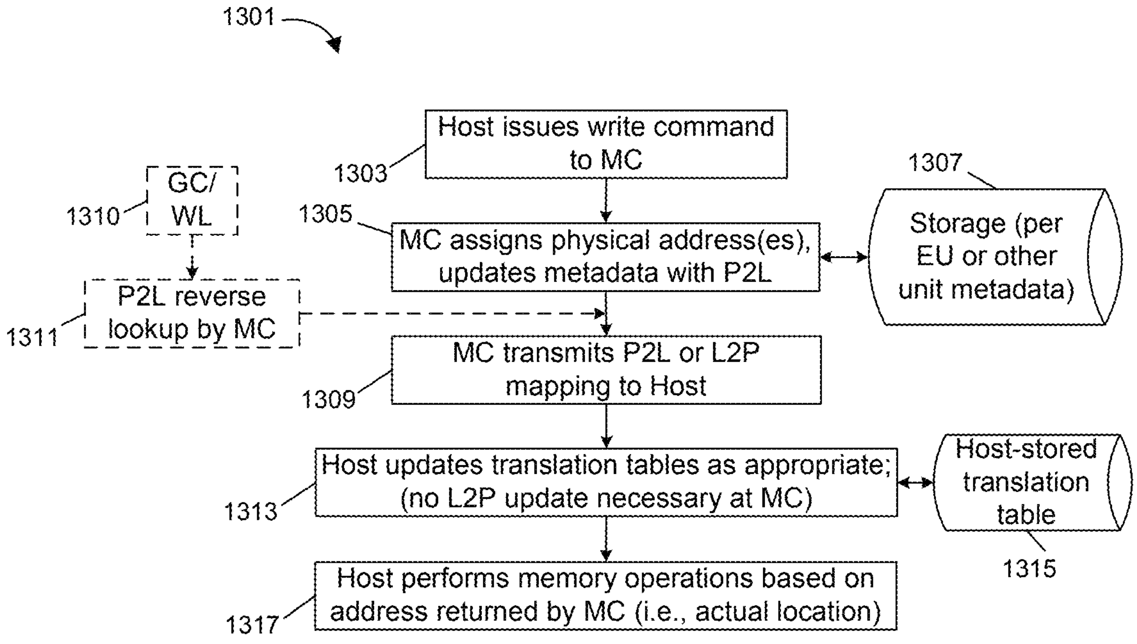
FIG. 13 shows a process associated with assignment of available space at memory controller, and ensuring reverse lookup and communication to a host of assigned physical address(es).

Such a process is generally designated by reference numeral 1301 in FIG. 13. In this process, the host initiates a write command to the memory controller, as generally indicated by function block 1303. This write command specifies a logical address. The memory controller, upon receipt of this command, queries available space and assigns physical addressing as appropriate to the new write data. It also updates its local metadata storage with the pertinent information, indexed by physical unit (1305, 1307). This is to say, the memory controller maintains this information per erase unit (or other unit) information for the entire managed memory space. In the case where physical units such as EUs, physical pages, bands, tracks, etc., are tracked, the memory controller stores each corresponding logical address as metadata for the pertinent physical unit. As mentioned, in another embodiment, the memory controller can also track this information in a manner indexed by assigned logical unit (e.g. block or page). The assigned physical address is then transmitted back to the host (e.g., as a confirmation code), per numeral 1309, and the host updates/builds a L2P translation table by processing this data. Finally, the host updates its translation tables as appropriate (1313, 1315); as before, because the host maintains L2P information for all files stored in flash memory, it uses direct addressing (i.e., addressing of physical units) notwithstanding the presence of the memory controller (1317). That is, the memory controller is advantageously not encumbered by time consuming translation or address lookup mechanisms (or uses greatly simplified mechanisms with substantially simplified translation). Thus, for delegated data assignment (or the other mentioned processes), the memory controller can support resident space assignment, while at the same time providing the benefits of access to specific physical addresses dictated by the host.

FIG. 13 also represents a process usable by the memory controller in connection with garbage collection (GC), wear leveling (WL) and certain other processes. That is, in a scheme where the host manages physical addressing (and specifies destination addresses for GC and WL processes) but where the memory controller is charged with suggesting garbage collection and/or wear leveling candidates, the memory controller advantageously informs the host of logical data correspondence associated with those candidates at the time of making suggestions; in this manner, the host can update its address references as part of the GC or WL process. This functionality is various represented by dashed line blocks 1310 and 1311 in FIG. 13, and by solid-line blocks 1313, 1315 and 1317.

Those skilled in the art will recognize that other combinations of sole/shared management schemes other than those shown above are also possible.

With basic implementation of a cooperative memory controller and/or cooperative host thus described, this disclosure will now proceed to a description of an exemplary storage system configuration, with reference to FIGS. 14-19.

III. ARCHITECTURE OF AN EXEMPLARY STORAGE SYSTEM OR SUBSYSTEM

FIGS. 14-19 are used to illustrate functions introduced above in an exemplary storage system. For purposes of this discussion, it will be assumed that a storage system or subsystem includes plural storage modules or drives, one or more of which is based on NAND flash memory solid-state devices (i.e., integrated circuits). Again, these techniques may be extended to systems not rooted in NAND flash memory. A "drive" as used in this section denotes any grouping of memory that has a common memory controller, meaning a common interface that interprets commands and that directs memory access operations and associated physical addressing to dies or other forms of memory as appropriate. A memory controller can be in the form of an integrated circuit, and a drive can be in the form of a memory module, board, or other type of subsystem. Each drive can have one or more memory integrated circuits, disks or other storage media that are selected and accessed by the respective memory controller. Other configurations are also possible. The storage system can optionally be a hybrid or heterogeneous storage system; that is, the storage system can have plural drives, at least one of these is NAND flash-based solid-state drive (SSD), and one or more of these can optionally be a magnetic drive, such as a hard disk drive (HDD). In the context of a network-based storage appliance, the storage system or subsystem can be configured as a storage server having plural drives, each of which is a separate memory module.

As has been introduced previously, each SSD (and optionally, each other drive) in such an embodiment supports functional calls from the storage system to identify drive geometry. In one embodiment, drives can therefore be made interchangeable, with storage system dynamically adjusting its practices for any particular drive and the system as a whole according to whether the particular drive is a NAND-flash based and according to drive geometry. This architecture provides for host-controller cooperation in managing NAND flash memory-based storage devices in direct-attached and/or network-attached storage environments based on existing host storage software features, with minimal modifications of the latter. To that end, host storage software can be modified and configured (relative to conventional designs) to perform management tasks as required by unique NAND flash memory requirements, with NAND-based storage device controller providing supportive information and features needed. These same techniques can also be applied to other P/E asymmetric technologies. By redefining host and controller responsibilities, with management task control regained by the host storage software and each controller providing locally maintained metadata for cooperative management task execution, host-controller management feature duplication and associated disadvantages are avoided.

Figure 14:
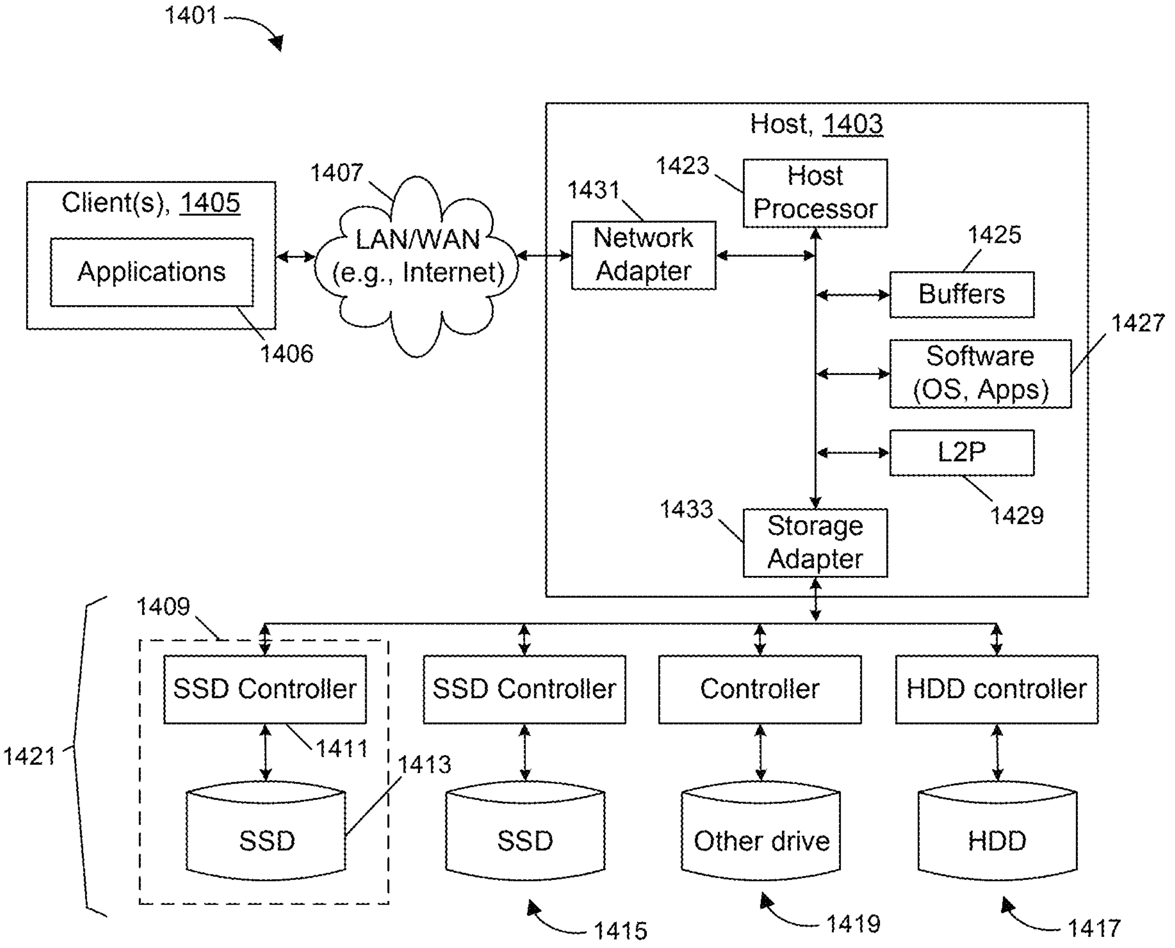
FIG. 14 illustrates a block diagram of a storage server having multiple solid state drives (SSDs) and hard disk drives (HDDs).

FIG. 14 illustrates an exemplary system 1401. In particular, a storage server 1403 receives requests to read data or to store data (and, optionally, requests for processing that data) from one or more clients 1405. These clients each have respective applications 1406 which generate the respective data-related needs. The clients can each be desktop or laptop computers, smart phones, pads or other devices, or other types of digital systems. Each client 1405 sends requests to the storage server 1401 and receives responses via a network, e.g., a local area network (LAN) or a wide area network (WAN) such as the Internet. The storage server, in turn, manages plural drives, each of which can be an SSD (e.g., a flash based drive), a HDD or another type of drive. As seen in FIG. 14, each drive also has its own dedicated memory controller, either bundled together as a single assembly 1409, or as separate devices; for example, assembly 1409 is seen to include a SSD controller 1411 and a SSD 1413. To simplify FIG. 14, a dashed-line box is shown only for assembly 1409. The SSD controller 1411 can be a NAND flash memory controller and the SSD 1413 can have one or more NAND flash memory devices. FIG. 14 also shows optional presence of other dedicate assemblies, 1415, 1417 and 1419, in this case seen to include a second SSD, an HDD and another unspecified type of memory, respectively. The collection of memory is seamlessly managed as a storage aggregate 1421, with the storage server managing scheduling for all drives so as to avoid collisions with storage-server-directed reads and writes, as described earlier. In this regard, the storage aggregate and the host are bundled together to form the storage server, but this is not required for all embodiments. The storage server has a storage operating system that implements a file system to organize the stored data as a hierarchical structure of logical data containers (e.g., volumes, logical units, directories and/or files) on electronic and/or magnetic storage media. It will be understood by those skilled in the art that this description may apply to any type of special-purpose computer (e.g., file server or storage serving appliance) or general-purpose computer embodied as, or having, a storage server or portion thereof. Moreover, the teachings of this description can be adapted to a variety of storage server architectures including, but not limited to, a network-attached storage (NAS), storage area network (SAN), or a disk assembly directly-attached to a client or host computer. The term "storage server" should therefore be taken broadly to include such arrangements.

The storage server 1403 includes a host processor 1423, which uses various buffers 1425 under the auspices of the host software 1427 to schedule and manage memory operations, including both memory transactions and memory maintenance operations. The host maintains a local L2P translation table so as to access files which can be fragmented in multiple memory locations (e.g., within a die or across dies of a drive) and potentially across multiple drives. The storage server also optionally employs policy-based space allocation, supporting data- and media-characteristic-aware data placement across the entire storage aggregate 1421. The storage server communicates with the clients 1405 via a network adapter 1431 and with the storage aggregate 1421 via a storage adapter 1433 (although it is also possible to have all communications performed via network adapter or otherwise remotely over a network such as a WAN or LAN).

In some implementations, the client(s) can issue packets including file-based access protocols such as the Common Internet File System (CIFS) protocol or Network File System (NFS) protocol over TCP/IP when accessing information in the form of files. In other implementations, the client(s) can issue packets including block-based access protocols such as the Small Computer Systems Interface (SCSI) protocol encapsulated over TCP (iSCSI) and SCSI encapsulated over FC (FCP) when accessing information in the form of LUNs or blocks. Also in some implementations, the storage adapter includes input/output (IO) interface circuitry that couples to SSDs (1409 and 1415) and HDD (1417) over an IO interconnect arrangement, such as a conventional high-performance Fibre Channel serial link topology.

The storage server in this particular example manages flash memory using a log-structured copy-on-write file system, with physical block addressing and wear-aware writes of new data (as has been described earlier, e.g., in a manner that obviates need for an extensive FTL layer on the side of the SSD and that better distributes wear). The storage server is configured to access NAND flash memory, such as in drives 1409 and 1415. using physical block addressing, and to account for NAND flash memory-based device wear-out, and to execute garbage collection with associated valid data migration to manage NAND flash P/E asymmetry and other NAND flash management functions, all as referenced earlier. This is to say, each flash-based drive such as assemblies 1409 and 1415 advantageously have a cooperative memory controller that implements the principles described earlier. Depending on system architecture, host software manages interaction with each such controller. This architecture provides for host-memory-controller cooperation in managing NAND flash memory-based storage devices in direct-attached and/or network-attached storage environments. For example, each flash-based drive has a respective controller that serves information to the host regarding each subdivision of the associated memory. The storage server (in this case, the host) can manage wear distribution across multiple drives to help lessen wear to any one area of memory; for example, in the context of the wear-aware writes, the storage server can collect wear metrics for all flash memory managed as well as for other types of nonvolatile memory, if present. The storage server can combine bitmaps from multiple drives and can allocate if desired new writes to a single drive only if needed to better distribute wear. As mentioned, the host can also electively direct writes of data based on policy, for example, in a manner that avoids fragmentation or that groups certain types of data together based on read-write characteristics. In one embodiment, each SSD memory controller (such as controller 1411) is rooted in a configurable architecture that depends on host capabilities, policy, or other considerations. For example, in such an architecture, if the host processor does not support host-assignment of physical addresses for new writes, the host configures each SSD memory controller to perform this function and to report back assigned physical addresses as described earlier.

Figure 15:
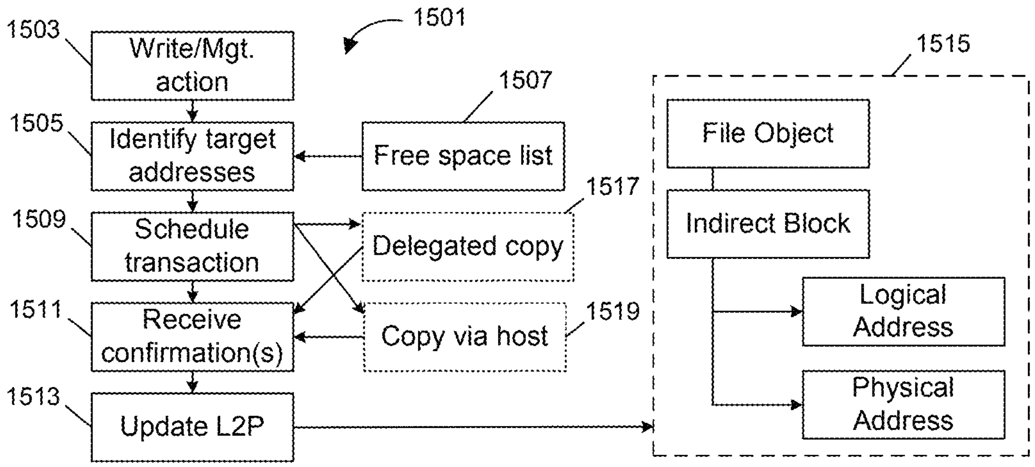
FIG. 15 illustrates a block diagram of functions performed a storage server operating system.

FIG. 15 provides a flow diagram 1501 used to discuss some considerations used by the host processor of FIG. 14 in performing wear-aware writes and in managing addressing. First, the host processor receives a trigger to write new data to memory or the host otherwise determines that a need for management action is warranted, for example, to relocate data (e.g., hot or cold data) and/or to reclaim space (1503). The host processor proceeds to determine target addresses (1505) that will serve as the write destination for the new/moved data, and it does this based on a list of available free space (1507). This list can if desired represent multiple dies or drives as well as mixed memory types. For locations in flash, the data advantageously also is prioritized in order of least wear, i.e., such that the first location represents the most virgin space, and so forth. If the host processor/operating system does not have such a list, it proceeds to request one or otherwise initiates garbage collection and erase operations as necessary to generate free space; system designers if desired can implement a policy that ensures the list references at least a first threshold level of available free space, and that calls garbage collection and explicit erase to raise available free space to a second level (e.g., employing hysteresis) any time this list represents free space less than the first threshold. With the target physical addresses thereby identified, the storage server then proceeds to schedule memory operations (1509). In a multiple drive system, this can be achieved using one or more transaction queues (one for each control path or bus) which interleave commands as appropriate to multiple drives. Once the host processor receives confirmations of completion of the various commands (1511), the host processor then updates its L2P translation tables and file references (1513). Numeral 1515 references an exemplary file naming structure, i.e., where each file is an object having a name, and where the file is stored across multiple, not-necessarily-contiguous blocks. The file has one or more indirect references (for example, to memory locations that will store lists of physical addresses for blocks having ordered portions of the file), and it has physical address and logical position within the file for each such file reference. When a transaction is completed, for example, changing physical address in association with a data copy operation, the physical address of data moved from a first block to a second is changed (updated), so that the host software can thereafter use direct physical addressing to identify locations of the subject-data. Note that FIG. 15 shows two options in dashed lines, including a delegated copy operation 1517, and a copy-via-host operation 1519. That is, in situations where a data copy operation is dictated, the delegated copy operation can be employed to perform data transfers within a single SSD as described earlier, which does not encumber the host processor-memory controller connection with the requirement of data transfer. As indicated by function block 1519, transfers in between different drives will typically be processed by first transferring data back to the host processor, and then onto the second drive.

Figure 16:
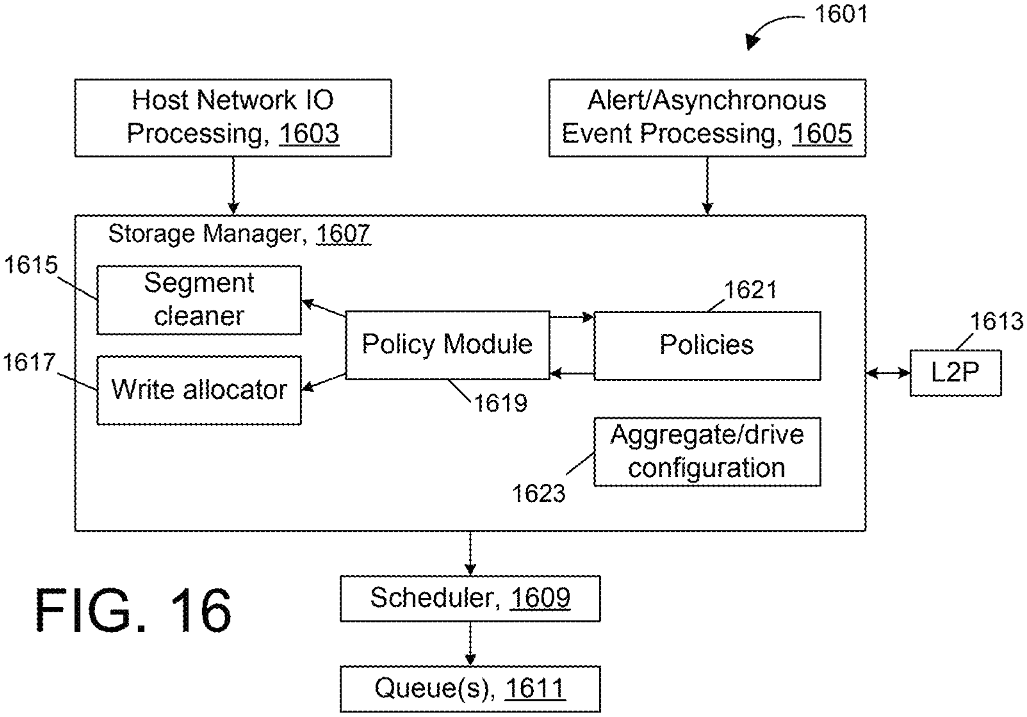
FIG. 16 illustrates a block diagram of storage management tasks used by a storage server.

FIG. 16 shows a block diagram for functions of host software 1601 in managing SSDs. Generally speaking, the host software 1601 first identifies a condition associated with a SSD, for example, a new data access request from a client (1603) or an alert condition (or asynchronous return from memory), represented by numeral 1605. The host software then invokes a storage manager 1607 to determine actions that need to be taken with respect to flash memory. The storage manager, in turn, sends actions to a scheduler 1609. Actions can include requests that are to be immediately sent to memory as well as conditional requests, for example, for background processing. As an illustrative example of the latter operation, it might be desired to perform space reclamation and release of additional space as a background operation (for example, to provide buffering of available space not critically needed by the host); such a request can be queued by the scheduler and invoked at a time when background traffic (e.g., frequency of other IO operations) is below a threshold level of traffic. As operations are scheduled, constituent commands associated with those operations are sent to a transaction queue 1611 for pipelined issuance to the pertinent SSD(s). In this regard, the storage manager 1607 relies on interaction with a host-maintained L2P address translation table 1613 to select pertinent "direct" physical addresses associated with each command. Note that the scheduler can interleave commands for one SSD with commands for a second SSD (or an HDD or other drive type). As another illustrative example, the storage server might be called upon to retrieve a large media file (e.g., for a streaming application) from one drive while freeing space in a second drive. The transaction queue can interleave periodic requests to the first drive for the read data (e.g., to maintain sufficient streaming buffer occupancy) with periodic commands to the second drive to relocate data and erase EUs of that drive until the desired amount of space has been released. Additional detail will be presented below relating to performance of these types of operations. As depicted by FIG. 16, the storage manager 1607 can include a number of components, including a segment cleaner module 1615, and a write allocator module 1617. The storage manager can interact with policy module 1619 and a policy repository 1621 in configuring and managing each of two modules. That is, the host software in this exemplary system configures the segment cleaner module 1615 to operate (e.g., to free additional space, perform garbage collection, weal leveling, defragmentation and relocation of existing data) within homogeneous storage media, between heterogeneous storage media, or both, in accordance with any specified policies. The write allocator module 1617 is used to allocate physical subdivisions that may then be written to, as previously described above. Note that, as was alluded to previously, the host software beneficially is provided with the ability to query each controller and/or drive of the storage aggregate to determine drive type, manufacturer, capabilities and other information pertinent to the management of memory and system configuration. This information is stored for use by the storage manager 1607 in accessing and managing the drives, as generally indicated by reference numeral 1623.

A. Space Reclamation.

Figure 17:
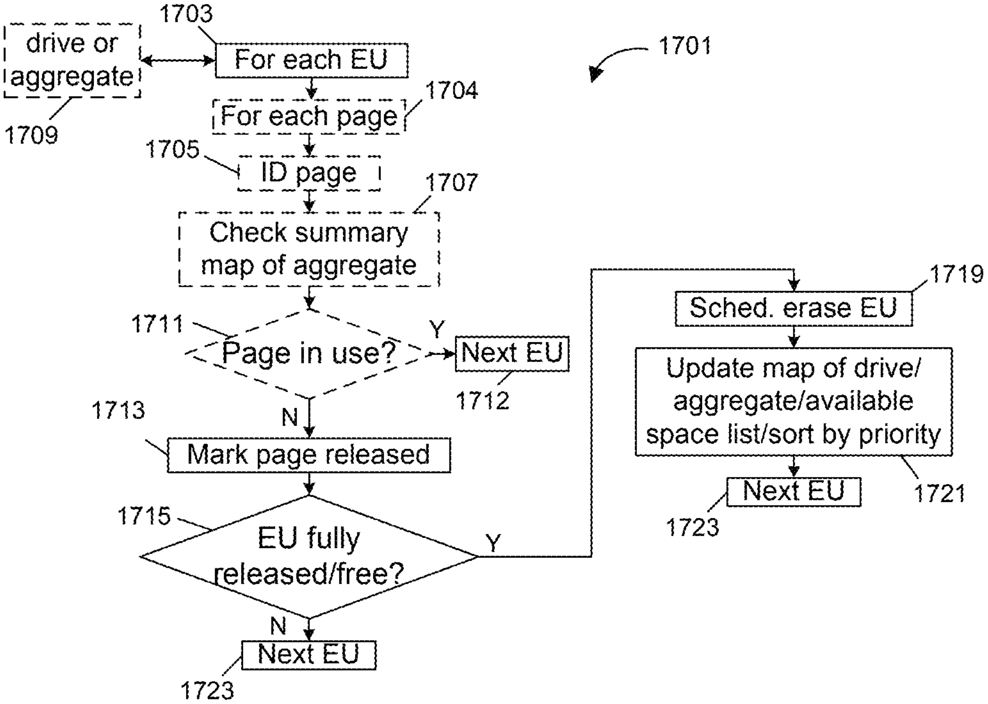
FIG. 17 illustrates how space reclamation is applied to mitigate P/E asymmetry.

Host-assisted space reclamation uses metadata from a memory controller to reclaim and consolidate space owing to P/E asymmetry, using principles described earlier. If it were not for the P/E asymmetry, the storage server could equate physical memory no longer used for valid data with free space. Such is generally the case for HDDs and other forms of random access memory, to the extent managed in common by the storage server. However, for flash drives (or other memory types having P/E asymmetry), released space cannot typically be reused until (a) all independently-writable units that form a physical subdivision have been released, and (b) an explicit erase procedure has been performed, in a manner that returns the floating gates of each constituent memory cell back to a default state. FIG. 17 illustrates a method 1701 that can be used applied by the host software. Note that it can be beneficial to postpone or batch reclamation operations. In particular, it may be advantageous to schedule erase operations in a manner appropriate to load and other system-level considerations; as an example, if free space shortage is not critical, it can be advantageous to batch erase operations to times of low network traffic or when there is low demand for a particular storage drive. The physical subdivision units and its constituent elements (e.g., pages) are only marked as free once the erasure has successfully completed and confirmed by return of a completion code by the particular memory controller.

FIG. 17 generally shows two methods, including a method of automatic erasure each time a page is released (this method is represented by solid lines only), and a method of batched space reclamation appropriate for address ranges, specified "candidate" subdivisions, or for a drive as a whole. The latter method will be described first, utilizing the example where flash EUs represent the tracked physical subdivisions. The method 1701 generally starts at step 1703, for which at least one EU is identified. For each EU identified, at 1704, the method proceeds to check each page of that EU to see if it is released and/or free (i.e., not yet written to); as indicated by steps 1705, 1707 and 1711, the method effectively tests whether the pertinent page is no longer referenced by any file system structure. If a page is still referenced, the method ends for that EU at step 1712, and the method then continues to the next EU (1703). If it is not referenced, but has been used to store data, at step 1713 the page is marked as released rather than free. The bitmap is then checked (1715) to determine whether it is the last page of that EU; for EUs that are determined to be previously used but empty, i.e., consisting only of pages that are released or of pages that are released or are virgin (not written to since the last erase of the EU), the method continues at 1719, with an explicit erase operation being called and the drive summary information being updated (1721); otherwise, the method ends for that EU at step 1723, and the method then proceeds to the next EU (1703). For example, if the method is called for a specific range or list of EUs, the method 1701 proceeds in this manner for each EU until it has processed the last EU. Note that, as indicated by reference numeral 1709, this method can optionally be performed for a storage aggregate or for each drive on an independent basis.

As noted, FIG. 17 also shows steps associated with a page release operation (i.e., solid lines only). That is, in some implementations, it might be desired to have the storage server immediately schedule an erase operation each time "the last page" in any EU is released. Such a method begins at 1713, where the host processor identifies a page release—the host processor checks the pertinent bitmap to see whether the latest release has resulted in the EU being fully emptied (i.e., consisting only of released or released and free pages) (1715); if the EU is not fully emptied, the method ends. If the EU is fully emptied, the method continues at the right side of FIG. 17, where an explicit erase operation is automatically queued (1719); when this operation is confirmed, the bitmap for the drive or aggregate as pertinent is updated (1721), and the method ends.

Note once again that the operation of FIG. 17 can be implemented as a host query, for example, using a suitably-designed API. The host can query the memory controller as to reclaimable space, meaning EUs (in a flash embodiment) where at least one page has been written to that EU but where there are no longer any pages that are still "valid." The host optionally specifies addresses (e.g., a device, a range of EUs, etc.) for which it wishes to ascertain reclaimable space, and the memory controller responds with a list of EUs that can be erased and used in new space assignment. In one embodiment, the host can query the memory controller to independently determine each of free space (erased space), reclaimable space, space with low page utilization, and so forth, each using a separate API. Also, blocks of memory (e.g., EUs) can be ranked by the memory controller according to any desired criteria; for example, it is desirable for some implementations to sort space by a per-block metric of released space to overall space (or equivalently, released to free space) such that blocks with small proportions of free space or contiguous free space are reclaimed first. Other options are also possible.

B. Garbage Collection.

In one embodiment, garbage collection is performed to reclaim space of subdivisions where the amount of released space relative to in-use or free space exceeds a predetermined threshold. Garbage collection is achieved by copying valid data (that is, unreleased pages) to another memory location to fully empty source locations in a manner such that the original space is reclaimable. The valid data can be combined with other data, for example, data from the same file (e.g., for purposes of defragmentation), or data belonging to another file. Once all valid data for a block or subdivision (e.g., a flash EU) has been relocated, all portions of a partially used subdivision are thereby released or are otherwise free, and the subdivision can be marked as fully released and erasable. The method just discussed can then (or at a later time associated with batch processing) be called to trigger the erase operation. Note that any desired garbage collection policy or trigger can be used, and that such a policy or trigger can be dynamically adjusted. For example, garbage collection can be performed using a batch process, in a manner analogous to the batched processing just discussed. Alternatively, garbage collection could be initiated (or a host alerted) any time released space to valid (unreleased, written space) exceeds a 1:1 ratio (e.g., less than 50% page utilization). Such a metric could be dynamically changed, e.g., this metric could be dynamically varied such that (depending on policy or other system considerations) garbage collection would instead be initiated when this ratio exceeds 1:5 (e.g., at least twenty percent of valid space in an EU has been released), depending on dynamic system conditions. Such dynamic control can be implemented by policy module (1619 from FIG. 16). Many such examples are possible.

Figure 18:
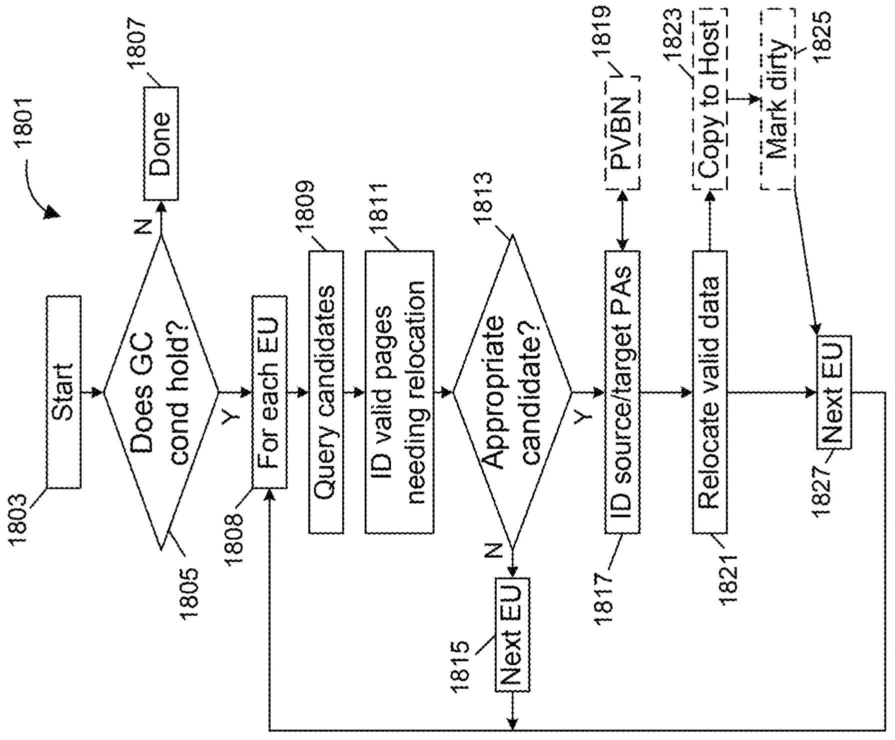
FIG. 18 illustrates a garbage collection process.

FIG. 18 illustrates a method followed by the host processor/software (e.g., by the segment cleaner of FIG. 16) in response to a garbage collection (GC) alert raised by a flash memory controller. Note that the discussed method can be applied more generally to any form of space consolidation or reclamation (localized or otherwise), as well as potentially other management functions. The method starts at step 1803. While such an alert remains in effect (1805), the host software identifies a specific physical subdivision under consideration (e.g., from a prioritized list of EUs) and then loops from one subdivision to another (1808) through a range of the subdivisions. When the list is exhausted, the method queries whether the GC condition alert still holds (1805)—as long as the condition that triggered the alert remains valid (e.g., an available space shortage, or EUs not satisfying a threshold level of utilization), the method retrieves a successor list and processes each subdivision in that list. Once the condition is cleared, the process stops at step 1807.

At step 1809, the host software queries the memory controller for candidate segments that are suitable for GC. Step 1811 will loop for each returned GC candidate. If storage manager (1607 from FIG. 16) does not employ back references, controller-provided backward address translation may be applied at this step, to derive logical addresses of the returned candidate ranges identified by their physical flash addresses. At step 1813, host software screens whether each suggested candidate is an appropriate candidate for relocation; for example, due to policy or other considerations, it might be desired to not relocate certain types of data (e.g., a host policy is in effect that groups certain types of data together at one location based on read-mostly or other read-write characteristics). In addition, the use of reserved space for multi-page writes (or the fact that resident data is paired with a subdivision on another die or plane) can be factored into this screening process. If a candidate is not appropriate, the host software then proceeds to examine the next candidate in the list, per numeral 1815. If a candidate is appropriate, the host identifies pages needing relocation (1817), typically from information provided by the memory controller together with suggested candidates; this can optionally be provided in the form of a bitmask of valid data that needs relocation. The host software (e.g., the segment cleaner) at step 1819 then schedules the relocation operation (1821), identifying source and target physical addresses as appropriate. As referenced earlier, such an operation can be performed using a delegated copy process for relocation within a source SSD, or alternatively can be performed to relocate data to a different drive (and potentially a different memory type). As indicated by dashed-line numerals 1823 and 1825, such an operation typically calls for reading data to the host processor and attendant memory, and marking the data as pseudo-dirty (i.e., as modified even though the data is not in this example). The pseudo-dirty modification will trigger scheduling of a copy-on-write operation that then rewrites this data to available or selected memory space. The process of FIG. 17 can then be called to fully erase the pertinent subdivision, e.g., flash EU (and to add that EU to the pertinent list of available space). Note that, if desired, the destination of such a copy-on-write operation can be selected according to policy. Finally, per numeral 1827, the next EU in the candidate list is processed. If the segment cleaner chooses not to relocate data immediately, it will save the candidate for later relocation.

C. Shared and Host-Owned Wear Leveling.

With shared and host-owned wear leveling, the storage server becomes aware of physical blocks (e.g., EUs) that represent "cold" (or optionally, "hot") data and, thus, that potentially signify uneven wear. In one implementation of a "shared" scheme, the host can periodically ask for a memory class, plane, die, device, drive or system-wide wear metric and an updated list of wear leveling candidates in advance of any wear leveling process to ensure quick allocation is possible when they are needed. The storage server then can then schedule processing of this list as a periodic maintenance operation, or as a background process. If and when the list becomes exhausted, a new list can be requested. While in a shared scheme the list request is sent to the memory controller, in a host-owned scheme, this query can be sent to another host process. Also, as noted previously, if an embodiment supports multi-page, multi-plane, multi-die or multi-track writes, this also can be factored into the process.

In one implementation, the write allocator of FIG. 16 interacts with the memory controller to replenish a pool of wear-ordered EUs when either the pool becomes small or when the memory controller (or host software) detects a wear leveling-related condition that requires host's attention. The latter can occur for example, when due to recalculation of device wear distribution, the memory controller or the host detects the existence of other EUs that are now considered significantly less worn out than to mean wear. The pool in this context can include EUs having "cold data" that otherwise represent low wear relative to the mean, and that are to be recycled, such that future writes will be directed to these "low wear" EUs instead of further contributing to wear variance in a particular SSD.

Figure 19:
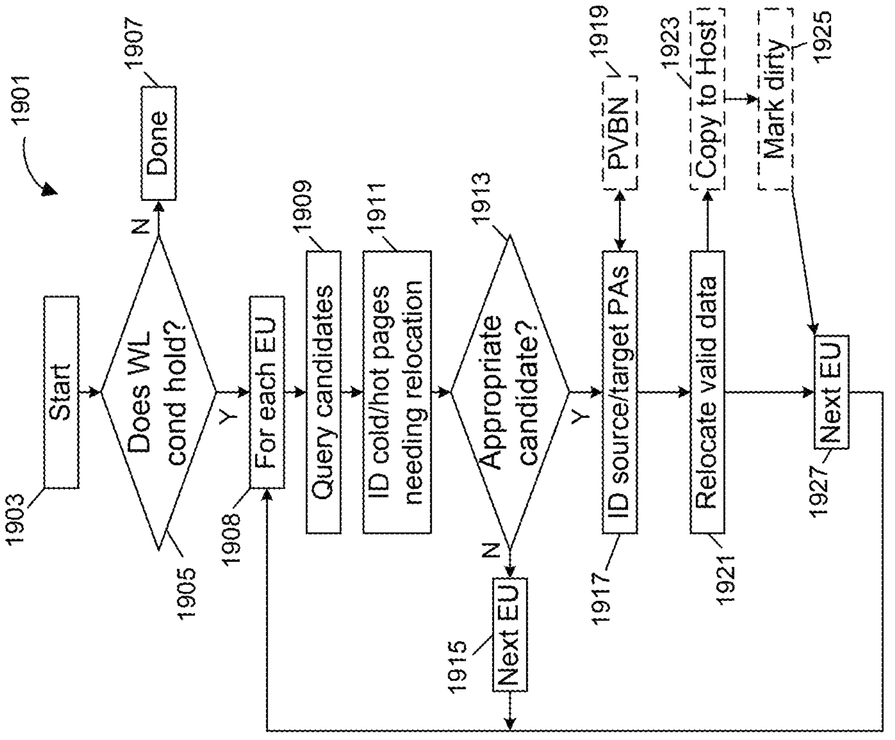
FIG. 19 illustrates a process associated with wear leveling.

A wear leveling process from the host processor's perspective is seen in FIG. 19, and is generally designated by numeral 1901. The illustrated method is substantively similar to the method of FIG. 18, used for garbage collection.

The method starts at step 1903. While the need for wear leveling remains in effect (1905), the host software identifies specific EUs under consideration (e.g., from a prioritized list of EUs) and then loops from one EU to another (1908) through the EUs specified in any provided list or range. When the list is exhausted, the method queries whether the WL condition alert still holds (1905)—as long as the condition that triggered the alert remains valid (e.g., an available space shortage, or EUs not satisfying a threshold wear metric utilization), the method retrieves a successor list and processes each EU in that list. Once the condition is cleared, the process ends (1907).

At step 1909, the host software queries the memory controller for candidate segments that are suitable for WL. Step 1911 will loop for each WL candidate. The host software screens whether each suggested candidate is an appropriate candidate for relocation (1913), for example, not redistributing space which according to policy might be used for areas reserved for important system parameters. If the candidate is not appropriate, the host software then proceeds to examine the next candidate in the list, per numeral 1915. If the candidate is appropriate, the flash memory controller identifies pages needing relocation (1917); this can optionally be permed by calling on the memory controller to provide the starting physical block number (e.g., page number) and bitmask of valid data that needs relocation. The host software can optionally as part of this process determine whether the candidate is associated with multipage data or a preallocated class of multi-page address space. The host software (e.g., the segment cleaner) at step 1919 then schedules the relocation operation (1921), identifying source and target physical addresses as appropriate. As referenced earlier, such an operation can be performed using a delegated copy process for relocation within a source SSD, or alternatively can be performed to relocate data to a different plane, die or drive (and potentially a different memory type). As indicated once again by optional process blocks 1923 and 1925, the data can be read back to the host operating system, and the data can be marked as dirty so as to trigger a copy-on-write operation that then rewrites this data to available memory space. The process of FIG. 17 can then once again be called to fully erase the pertinent (and to add that EU to the pertinent list of available space). The destination of such a copy-on-write operation can once again be selected according to policy. Finally, per numeral 1927, the next EU in the candidate WL list is processed.

IV. MULTI-MODAL OPERATION

As should be apparent from the description above, a cooperative storage architecture facilitates performance of management and access functions across multiple drives, regardless of type of memory. Reserving some SSD (i.e., flash) functions to the host in this architecture helps ameliorate latency concerns and drive expense issues that have traditionally hindered use of SSD drives in direct-attached and network storage applications. That is, the techniques and functions that contribute to this architecture can be embodied in memory devices themselves, controllers for memory devices or drives, the host, or in any combination of these elements. Note however that in practice, it might be desired to fabricate a memory, memory controller or host architecture (e.g. host software) in a manner that supports both implementations with other cooperative storage elements and implementations with legacy devices. In addition, it is possible to fabricate elements and systems that, depending on design or network management considerations, selectively use certain cooperative techniques but not others.

Thus, in one embodiment, a memory controller supports any one or more of the host-owned, cooperative, or memory-controller owned modes or features described above. A register (for example, part of the memory controller storage 311 from FIG. 3A) can be programmed with a value, for example, by hardwiring a signal connection or setting a fuse, or by configuration at initial power-up. Providing a number of programmable modes in this manner permits a cooperative memory controller and/or cooperative host to be used both in the cooperative management of memory (e.g., where the host processes data provided by the controller and where the memory controller tracks subdivision-specific usage information) and also with legacy components that do not support these cooperative features. In addition, providing these capabilities also provides flexibility to a host or system designer in the selection of mode based on performance criteria, intended application, or other factors.

V. COMMANDING INTERLEAVED AND MULTI-ARRAY OPERATIONS

An exemplary flash-based SSD can have 1 to 16 integrated circuits (ICs), each composed of 1 to 16 dies. Each die on each IC has independent IO circuitry that can be concurrently operated with other dies that are present, i.e., subject to any bus constraints (e.g., the rate at which commands can be directed to respective dies over a shared bus). Each die can generally be operated in parallel for the purpose of interleaving. In some embodiments, each die includes a cache for queuing commands for pipelined operation. The memory controller examples described above generally enable the host (and any related software, OS or application level) to fully utilize the chip/die level parallelization potential by exporting the physical geometry of managed memory, including device composition. This can be performed for example by a synchronous command from the host, such as using an extension of the NVMe Identify Array command. The array geometry data, made available to the host at a configuration phase, lets the host perform space allocation and IO scheduling so as to attain the maximum degree of parallelization and to optimize IO bandwidth.

The use of direct physical addressing by the host (i.e., based on host-assigned physical addresses) helps minimize or eliminate the need for an FTL at the memory controller, and thus affords greater control over interleaving/pipelining where a memory controller manages a number of dies. With this capability, and with support for host-initiated maintenance operations (e.g., garbage collection, erase, maintenance operations, defect management and so forth), the host is able to ensure that adequate free space is available in each memory array and to generally streamline operations. In one example, a host can stripe related data across memory dies and, because the host performs physical address assignment, can issue commands after L2P translation has already been performed. Thus, the memory controller is not encumbered by latencies associated with L2P translation and, as mentioned, this structure helps minimize memory controller maintenance functions which could otherwise compete with host-requested read and write operations. The host can also better interleave different command types across dies (read versus write or erase, or deallocate, for example), as timing is not encumbered by controller-resident translation latencies.

Referring briefly back to FIG. 2B (numeral 265), the host has the option of establishing (pre-allocating) classes of reserved space, for example, for 1-page single-plane access, 2-page multi-plane access, 3-page multi-plane access, and so forth. In a general multi-page context (e.g., with a single die address space or multiple dies), the host can simply track L2P addressing and assign whatever physical address space is available in different respective dies and use the L2P table to fetch related data from each respective die, according to a separate (independent) physical address for each die; however, the host can also choose to assign physical addresses such that related data is stored at the same address or a similar address in each die. The selection of a common or similar address for related data stored in different arrays is less important in the multi-die context, but is typically important in the multi-plane context (e.g., where devices are often characterized by native addressing restrictions for multi-plane access).

A conventional multi-plane NAND flash die might have multiple data registers, one per plane, with a single address register shared by all constituent planes. In the two or four plane case, prevalent in the available NAND flash dies, addressed EUs must be at respective addresses that differ by, e.g., a least significant bit, since the shared address register typically allows for a single bit address extension only (i.e., for the adjacent plane), with addressed pages (for programming) using the page address within each EU. These addressing limitations of some legacy designs can constrain the ability to use multi-plane capabilities for reasons already mentioned. Note that similar limitations also apply to magnetic shingle drives and more generically, to multi-page management and access, and that, once again, multi-plane NAND flash memory are used as the non-limiting discussion example.

To address this, the host of this disclosure uses insight into physical space allocation within each plane of multi-plane memory and assigns related data the same (or highly similar) addresses in each plane. This same process of address assignment can also optionally be performed across dies. The ability to choose physical addresses permits the host to effectively direct multi-plane writes and reads as long as the assigned addresses (for related, respective data to be obtained from the planes) are consistent with any device addressing limitations for multiple plane use. That is, contrary to chip and die level parallelism where concurrently running operations can generally be completely independent, multi-plane operations are advantageously constrained to prearranged locations that are consistent with any pertinent device addressing limitations. Host-selection of physical addressing thus permits the host to direct a "true" multi-plane write or read operation without being affected by legacy multi-plane device addressing restrictions. That is, for example, the host can ensure that a write of related data across planes (a) receives the same EU address for each plane (i.e., for the write of respective pages of data), and (b) the same address offset within each EU. The host can assign such writes if the same physical-unit address in respective planes is available, but as mentioned earlier, in one embodiment, the host prearranges classes of space for multi-plane writes. For example, the host can "reserve" a specific range of like-EU addresses in each plane for multi-plane writes and then assign related data EU addresses for respective planes and page address offsets within these EUs, as consistent with device addressing restrictions. Harkening back to numeral 265 of FIG. 2B, the host optionally has (for an embodiment having more than two planes) the option of reserving physical space for respective classes of writes where 1, 2, 3, 4 or another number of planes will be written to in parallel. The host determines operating system or application needs (or uses other criteria to prearrange space) and then it assigns space as needed. As noted elsewhere in this description, and as denoted by numerals 273, 275, 277, 278 and 279 of FIG. 2B, the host factors the existence of such prearranged space reservations into defect management, data relocation (e.g., hot/cold space management and garbage collection), page release and erase, space reclamation and other maintenance operations as needed; for example, if a hypothetical host employs three classes of prearranged space, the host might use three (respective) separate processes or function calls to ensure persistent availability of a threshold amount of "free" (e.g., erased) space, one for each class. The host also updates L2P mapping on a dynamic basis, and (in one embodiment) can dynamically reallocate the amount of space reserved for each class according to need. If no space is available, or due to other factors (e.g., OS preference for single plane writes), the host can elect to discontinue or suspend multi-plane writes or other multi-plane capabilities for any prearranged class of memory. As a non-limiting example of this principle, a host might determine that multi-plane addressing needs represent a small set of data, or relate to low priority data, and so may discontinue multi-plane writes.

Note that as mentioned earlier the controller support may be selective according to implementation: for instance, only multi-plane writes may be supported, or the controller may provide a full range of support including multi-plane read, deallocate, erase and potentially other operations as well. As also indicated just above, a host preferably reserves the right to issue single plane requests (i.e., 1 page only) to multi-plane memory, to enhance flexibility in memory transaction granularity. To this effect, a host interacting with multi-plane memory will typically establish at least two classes of access (corresponding to the classes of reserved space) and will use a dedicated command or addressing structure to identify each (single or multi-) class of write, read or other command to an affected memory die. That is, an addressed memory die typically examines a field in the command structure to determine whether a command is for a single page or EU in a single plane, or whether multiple planes are affected. In one implementation, a memory controller use a custom set of commands to effectuate multi-plane operations. However, such operations can also be effectuated using the existing NVMe fused IO operations framework. This permits the host to issue multi-plane IO requests as what is essentially a single "group" request rather than as a series of independent requests that could have a multi-plane relationship lost in connection with scheduling in the OS or host IO subsystem.

To begin, array geometry is first discovered. These steps, and the configuration of multi-plane access have already been outlined in connection with FIG. 2B. These steps can optionally be performed in a manner that is NVMe-compliant. During a device discovery phase, the host first queries the memory controller using the vendor-specific Identify Array extension to the NVMe Identify command and, based on the response, notes whether a given die is multi-plane. Typically, a device (IC) with multiple dies will have the same configuration for each die. The data structure set forth in Table 1, below, can be used for this purpose.

TABLE 1

Identify Array Data Structure

| Bytes | Description |
|---|---|
| 0:0 | Channels: This field specifies the number of channels present in the array. |
| 1:1 | Targets: This field specifies the number of targets per channel present in the array. |
| 2:2 | LUNs: This field specifies the number of logical units (LUNs) per target present in the array. |
| 3:3 | Planes: This field specifies the number of planes per LUN. If the NAND chips that the device is equipped with do not support multi-plane operations, this field is set to 1. |
| 5:4 | Erase Units: This field specifies the total number of Erases (EUs) per LUN present in the array. |
| 6:6 | Pages: This field specifies the total number of pages per Erase Unit present in the array. |
| 8:7 | Page size: This field specifies the page size, in bytes, of the NAND chips comprising the array. |
| 10:9 | Defective units: This field specifies the number of known defective Erase Units in the array. |
| 12:11 | Reserved units: This field specifies the number of Erase Units in the array reserved for defect management purposes. |

If a particular die/device has multiple planes, the host further interrogates the memory controller (e.g., with the NVMe Get Features command) to determine which flash memory operations other than a multi-plane write operation are supported. This or an equivalent command is also preferably used to learn each multi-plane addressing mode supported by the device (i.e., any device-specific multi-plane addressing restrictions). The supported operations can be returned in the bit-encoded Dword 0 of the completion queue entry for the command. The bit field definitions are described in Table 2, below.

TABLE 2

Supported multi-plane operation encoding in the completion queue entry Dword 0

| Bit | Description |
|---|---|
| 31:04 | Reserved |
| 03:03 | Set to 0/1 if the device does not support/supports multi-plane deallocate operation |
| 02:02 | Set to 0/1 if the device does not support/supports multi-plane erase operation |
| 01:01 | Set to 0/1 if the device does not support/supports multi-plane read operation |
| 00:00 | Set to 0/1 if the device does not support/supports multi-plane write operation |

Then, as noted in FIG. 2B, when allocating physical space, the host where possible prearranges (reserves) co-located space in multiple planes' erase units so that ranges allocated in each individual unit of the same LUN have the same offsets within the erase unit or, more generally, so as to account for multi-plane addressing limitations regarding the erase unit(s) addressed by a multi-plane operation. Again, as referenced earlier, the host in some implementations interacts with a memory controller (and/or SPD) to determine drive capabilities, including device and memory layout and any addressing limitations. An API can be used on the host end for this purpose, with a then-educated host using provided information to plan memory assignment. Write operations that address co-located space on multiple dies are then issued by the host to the memory controller as what in effect is a single request to each die. Finally, when such data is to be read back, the host issues a multi-plane read command instead of multiple, independent read commands directed to single planes with the pertinent physical address(es). As to additional multi-plane commands, memory devices are preferably used that support multi-plane deallocate (page release) and erase commands. As noted earlier, host-owned, shared or other forms of sole or cooperative management can optionally be used consistent with these multi-plane functions. Use of these management functions helps support continual host-awareness of physical space status, such the host is in an independent position to assess space needed for multi-plane writes and to perform maintenance on an as-needed basis.

To provide support for transaction scheduling in a conventional host, an API can be added to join multiple single-plane IO requests for related data into what is in effect a single, multi-plane operation and to effectuate pertinent scheduling in the host or OS transaction queue. This can be performed by providing for use of a request structure that distinguishes multi-page commands from single-plane commands, or alternatively, by a structure that permits chaining of multiple single-plane IO requests. These commands are then scheduled by the host as an integral unit and sent to the memory controller consecutively (i.e., they not subject to scheduling reorganization). NVMe provides a command structure that is consistent with the use of such single-plane IO requests. That is, NVMe provides for two individual commands to be fused, and requires matching address fields for these fused commands. A vendor-specific modification of this structure permits use of a first fused command field (bit code "01b") as describing first and subsequent fused operations in a sequence of fused commands, and a second fused command (bit code "10b") as describing the terminal operation of the fused sequence. Note once again that while select embodiments are described in the context of NVMe (e.g., in the context of GetFeatures, fused and other commands), other commands can also be used to provide these same capabilities relative to other storage and networking protocols; even if a particular protocol (e.g., the most recent SCSI versions) do not provide for linked commands, it is otherwise possible to pipeline or otherwise effectively issue multi-page commands using techniques referenced below.

Figure 20A:
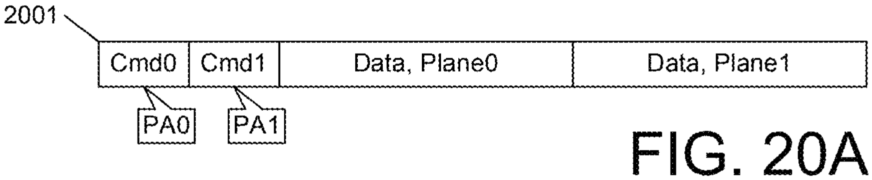
FIG. 20A shows one possible format for a multi-plane request from the host to memory controller; the request can be a write request having chained or fused single plane commands (Cmd0 and Cmd1) and respective data for writing into like-memory locations in planes of memory.

A fused command structure is depicted in FIG. 20A by reference numeral 2001. This is to say, a first write command (cmd0) specifies a first physical address (PA0) in a first plane and includes a particular bit field that indicates that it is a non-terminal entry of a sequence of fused commands (that are to be performed in sequence). A second write command (cmd1) immediately follows and contains necessary information to specify a physical address (PA1) in a second plane that is consistent with addressing restrictions for the particular device. Note that while a command structure for two planes is illustrated, by extension, any number of commands can be fused together (e.g., successive commands for four planes). Each command specifies a single address with a subfield of the address indicating a single plane, and consequently, is structured as a single plane command. For each command (other than the last command), the fused command field is set to also indicate that the command is part of the sequence of commands (but is not "last"). The terminal command of the sequence has a different value in the fused command field, indicating it is the last command in the sequence. The write commands are then followed by write data for each plane in succession. An NVMe-compliant memory controller recognizes these commands, and optionally does not process the first command until the last command in the sequence has been received. As an example, the memory controller does not write data to the medium (or return data to the host) until the entire sequence of fused commands has been received. Note that as referenced earlier, in one embodiment, these commands are scheduled (e.g., for a particular drive destination) and are sent in the form of packets to the particular drive. Also as earlier noted, the routing structure can be consistent with a signaling standard, such as a version of PCIE, SATA, or a different signaling standard. If desired, these communications can be routed from the host point-to-point to the memory controller, or can be routed via a switch, bridge, hub or a multidrop bus, or via another interconnection mechanism.

Figure 20B:
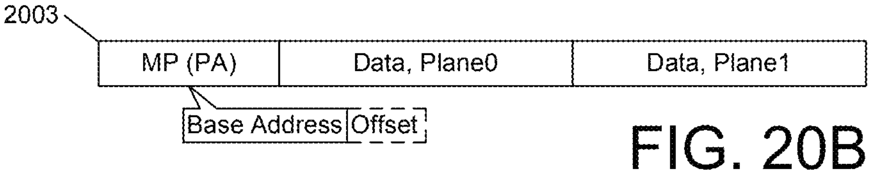
FIG. 20B shows another possible format for a multi-plane request from host to memory controller; unlike the command of FIG. 20A, the command (MP/MD) of FIG. 20B is a command that specifies a base address that will be applied to each plane used to service the request.

FIG. 20B shows a single-command equivalent to the fused commands of FIG. 20A. In particular, a request 2003 in effect specifies a multi-plane command (MP) and a base address. If the memory die in question supports any type of addressing offset between planes, the request can also specify an address offset for the second (or each additional) plane. Alternatively, if supported, the command structure can include separate address fields for each plane. Once again, write data (as appropriate) for each plane can be sent together with the commands.

Figure 20C:
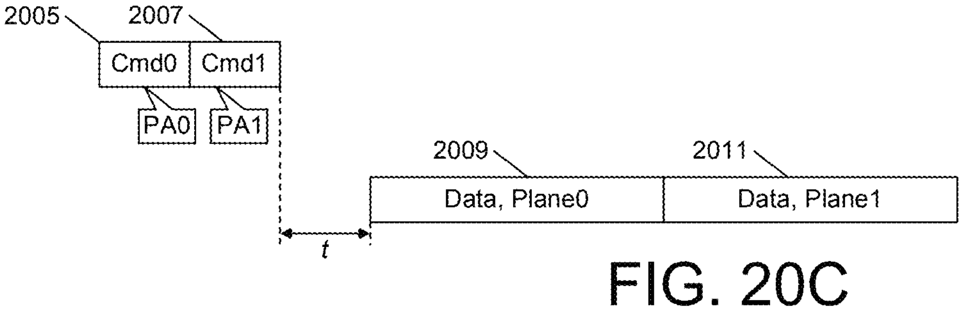
FIG. 20C shows a possible format for a multi-plane read request, having chained or fused single plane commands.

FIG. 20C shows the fusing of multiple commands in the read direction. In the same manner as described above, a first read command (cmd0, 2005) specifies a physical address and a bit field indicating it is a non-terminal command of a command sequence. Additional single-plane commands such as "cmd1" follows this command and are effective to specify address in a respective plane (e.g., either specifying an implied offset associated with plane address or specifying a complete physical address field corresponding to the respective plane). As before, each command in the sequence carries a field indicating whether it is a non-terminal or terminal member of the sequence, and the memory controller does not respond with read data (such as read data 2009 for a first one of the commands) until after the last command in the fused sequence has been received (i.e., as denoted by a delay "t" seen in FIG. 20C). The memory controller issues the reads requests to the managed memory as appropriate, and returns the read data as respective, sequential pages of data (2009, 2011).

Figure 20D:
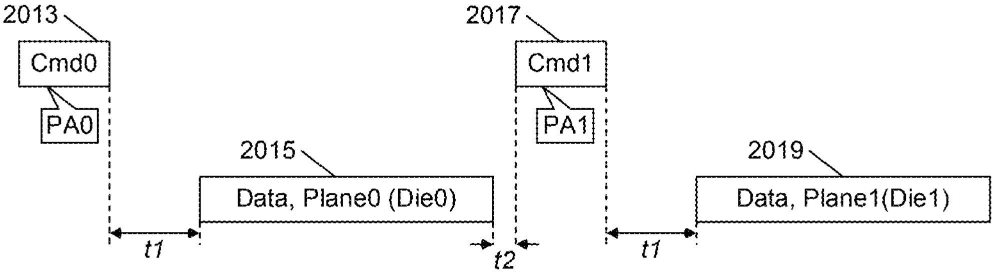
FIG. 20D shows a possible format for two single plane read requests from the memory controller to memory (separated by time "t2"), which is optionally performed in a response to a multi-plane command received by the memory controller from the host.

Note that memory controller-to-memory interaction does not have to be structured in this same manner. That is, the memory controller may have its own transaction queue that receives commands, schedules them, and then issues them to memory as appropriate. Thus, as indicated in FIG. 20D, the memory controller, even if it receives fused commands, may elect to forward commands to a memory die (or to multiple dies) as a series of single plane commands. Thus, for example, the memory controller can issue a first command to memory (cmd0, 2013), corresponding to the first command received from the host (cmd0, 2005, from FIG. 20C), and receive read data 2015 from the memory (following latency "t1"); the memory controller can then, after delay "t2" issue a second command to memory (cmd1, 2017), corresponding to the second command received from the host (cmd1, 2007, from FIG. 20C) and receive read data 2019 from the memory (again, following latency "t1"). In this case, the interval "t" from FIG. 20C would optionally correspond to the time following the memory controller's receipt of the last fused command (cmd1, 2007) through a time necessary for the controller to obtain all sets of read data (2015, 2019) from the managed memory, such that the respective read data could be sent consecutively (without bus idle time). The memory controller could then reply with the data, in what is effectively a single frame of multi-plane data.

FIGS. 21-25 are used to discuss in detail the performance of various multi-plane requests from the host's perspective. In a NVMe-compatible environment, each of these requests can be issued using the fused command field framework just described. Naturally, a different command structure can be utilized in different implementations, in compliance with other standards or existing standards as they evolve.

Figure 21:
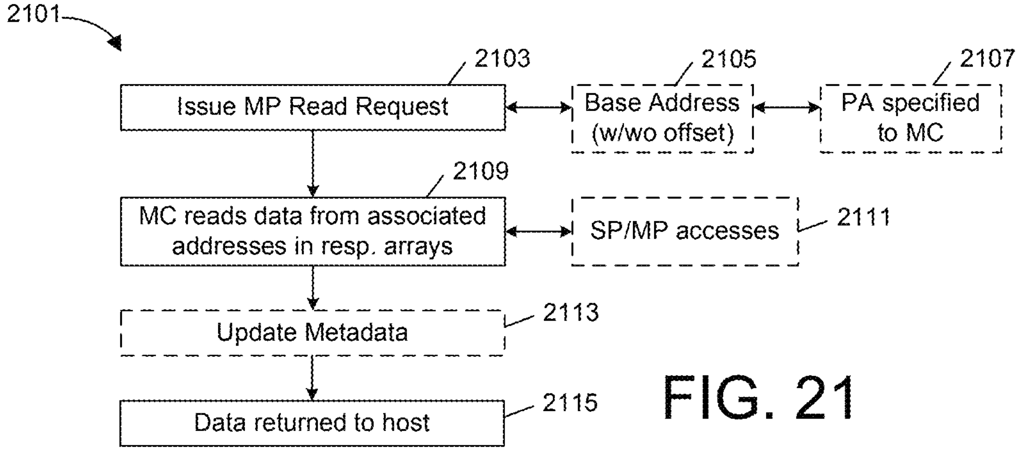
FIG. 21 shows a block diagram associated with a multi-plane read request from a host.

FIG. 21 depicts flow associated with a multi-plane (MP) read request, generally designated using reference numeral 2101. More specifically, the host first issues a read request (2103); as mentioned, a single multi-array request can be used for some embodiments and fused or chained commands can be used for others. As depicted in dashed-line block 2105, these commands can optionally specify a base address and an address extension for accessing a second plane. As also depicted by dashed-line block 2107, optionally, each command specifies a physical address to the memory controller, that is, notwithstanding the issues of wear (and wear-leveling and garbage collection) typically needed for flash memory maintenance. The memory controller then reads the requested data from the associated addresses in respective arrays (2109). As mentioned in connection with FIG. 20D, the memory controller-to-memory interaction can be in the form of single-plane accesses or multi-plane accesses as appropriate (2111). The memory controller and/or host, to the extent they track per-unit data for units of physical memory, can update metadata as appropriate (2113); for example, metadata can be updated to reflect last-read characteristics and other metadata useful in determining whether data is "hot" or "cold." Either independently or as part of his process, the read data is transmitted to the host (2115), optionally via packetized, serial transmission (as mentioned).

Figure 22:
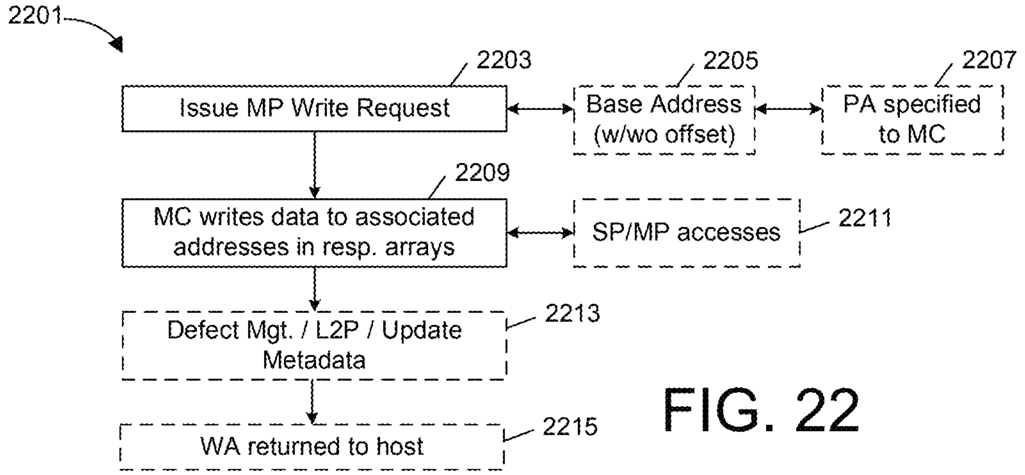
FIG. 22 shows a block diagram associated with a multi-plane write request from a host.

FIG. 22 depicts flow associated with a MP write request, generally represented by numeral 2201. As depicted, the host issues a multi-plane write request to the memory controller, per numeral 2203. As before, this request can optionally be a set of fused commands that specify a common (base) address, with or without plane-address extensions (2205). For hosts that monitor and assign physical addresses (2207), this address is used in lieu of logical address (e.g., this corresponds to the logical address field referenced by the NVMe standard). The memory controller receives and acts on this physical address without address translation (or with limited address translation, if the memory controller owns defect management), per numeral 2209. As before, single-plane or multi-plane accesses can be used by the memory controller to perform the requested write operations (2211). As part of this process, the memory controller and/or host perform defect management (and any associated L2P remapping) if issues occur and update per-physical-unit metadata (2213). In some embodiments, the memory controller returns a write acknowledgement (WA) to the host in connection with these operations. Once again, all host-memory controller communications are optionally performed using packetized, serial transmission.

Figure 23:
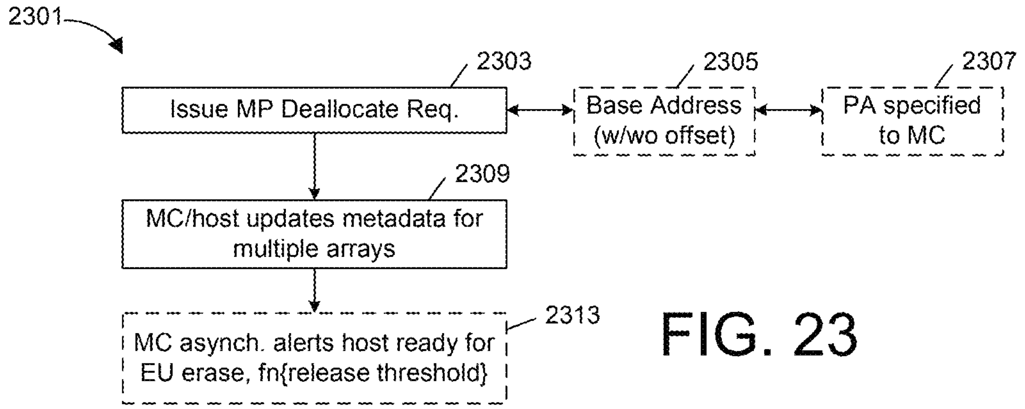
FIG. 23 shows a block diagram associated with a multi-plane deallocate (or page release) request from a host.

FIG. 23 depicts flow (2301) associated with a MP deallocate command. That is, the command framework introduced above for multi-plane writes can also be used to ask (via a single request) that the memory controller mark linked or paired pages of data in respective planes as "released." As noted earlier, once all pages in an EU have been released, that EU can be erased and recycled. Support for a MP deallocate command permits simultaneous release of parallel physical storage units across planes such as previously allocated by the host in appreciation of the multi-plane device capabilities, and so, permits release and recycle with fewer commands and reduced latency. Per numeral 2303, the host issues such a request, for example, as a multi-plane command or set of fused commands (depending on embodiment). Once again, per numerals 2305 and 2307, these commands can specify a base address (or common address) and can specify physical addresses that pass un-translated by the memory controller. The memory controller receives the request(s) and updates its per-physical-storage-unit metadata to indicate release of the affected pages for each die or plane (2309). As indicated by dashed-line (optional function) block 2313, the memory controller can use the processes described earlier (e.g., asynchronous alerts to the host) to indicate that an EU corresponding to a released page is a candidate for erasure or garbage collection; this condition can be determined as a function of any desired threshold (e.g., no more valid pages in EU, EU page utilization below a defined threshold, and so forth).

Figure 24:
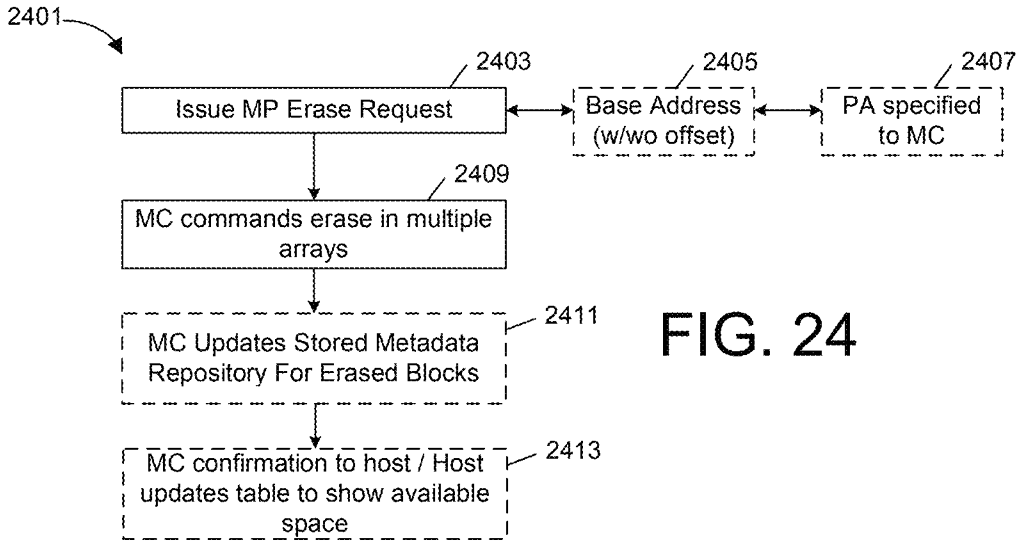
FIG. 24 shows a block diagram associated with a multi-plane erase request from a host.

FIG. 24 depicts flow (2401) associated with a MP erase request, in many ways similar to the flow of the MP deallocate command just described. The host first issues a MP erase request (2403), for example, based on an asynchronous alert or responsive to a host query. Alternatively for embodiments where the host tracks page utilization by physical unit, the need for erasure can be prompted by a host software process. The host as part of this request informs the memory controller of a base address to be applied to all pertinent planes to erase affected EUs (2405). This request can include physical EU address as a command operand, as denoted by optional function block 2407. This request can also be sent as a series of fused commands, as indicated. Upon receiving the host command(s) (e.g., multi-plane or fused), the memory controller erases all affected EUs (2409). Depending on embodiment, the memory controller can then either update its own stored data repository (metadata), or can send information (e.g., as part of an ACK) to the host, specifying that the host should update its stored metadata to indicate status of the affected EUs, and update listings of available space, per numerals 2411 and 2413.

Figure 25:
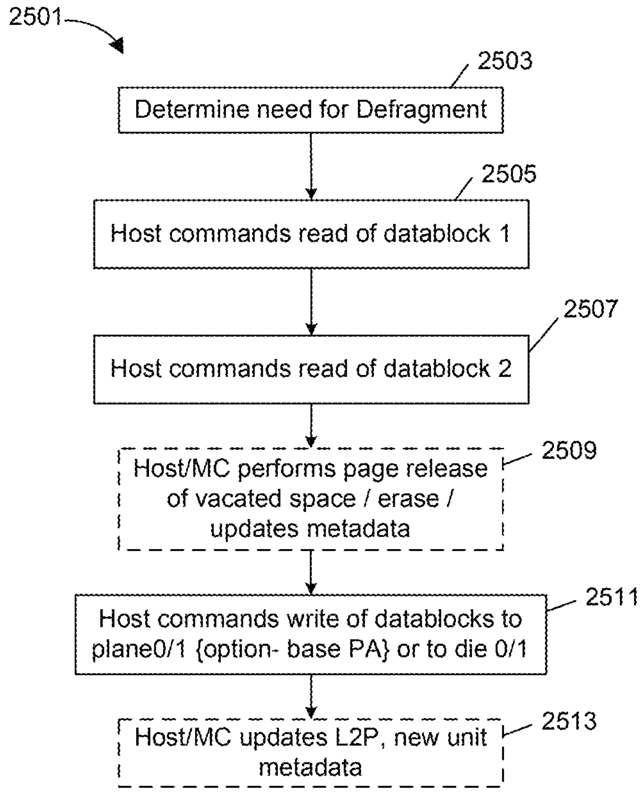
FIG. 25 shows a block diagram associated with consolidation of multiple single planes of data to a multi-plane block of data, orchestrated by a host.

FIG. 25 depicts flow (2501) associated with a defragment operation initiated by the host. Host software first determines the need for defragmentation, as represented by numeral 2503. As implied by this label, the host can determine that data stored in disparate locations should be stored together for more efficient access, e.g., as respective pages of multi-plane data. Per numerals 2505 and 2507, the host first commands reads of the fragmented data from the pertinent locations. Either the host or memory controller, depending on embodiment can then update stored metadata to record release of the affected pages (2509). Then, the retrieved data is written via a multi-plane write operation to a new destination, for example, using a base address common to each affected memory plane (2511). Finally, the host and/or memory controller update both address translation tables (the host, if using physical location addressing) and metadata for the physical storage units destinations of the newly written data. Note that if supported by the memory controller, the entire sequence can be performed as a delegated atomic operation using a single sequence of fused commands (i.e., without retrieved data being sent from the memory controller to the host).

Note that this operation can also be used in any multi-page die context, such as a multi-die context also referenced by function block 2511. For example, a host wished to redistribute data across multiple dies (for potentially faster, interleaved access) can use the method generally depicted in FIG. 25 for doing this. Because each die is typically addressed as a response to a separate host command, in some embodiments, it is not necessary to have related data stored at like-physical addresses in different dies (e.g., any desired physical address can be used). In some embodiments, custom multi-die commands can be used, for example, to direct concurrent ("group") write/read/deallocate/erase/or other functions across multiple dies, for example, using a common physical address or address offset.

As should be apparent from the description above, the disclosed techniques can provide substantial improvements in memory system operation, particularly for flash memory. The use of physical-unit addressing by the host permits a host to structure data operations to enable multi-page write, read and other operations (e.g., at the system level). Whether or not multiple planes of memory are present in a system, this structure also permits the host to enhance interleaving across multiple pages/dies/devices of memory by permitting the host to schedule interleaved requests in a manner unencumbered by the requirements of full, conventional L2P translation at the memory controller.

VI. CONCLUSION

The description presented above provides examples of a cooperative memory controller as well as a host that interacts with such a memory controller, a storage system architecture, and various memory systems. As indicated, these techniques can optionally be employed with any one or more of these components. Further, while various embodiments shown above have described structure and functions in the context of a host, memory controller and/or memory, it should be understood that various ones of these components can be combined with one another or packaged, mounted or sold together. For example, depending on implementation, a host processor can be copackaged with a memory controller or mounted to a common board. Conversely, it is possible to copackage a memory controller with memory, such as by bundling them in a common die, multichip module or system on chip (SoC). In the system context, solid state drives (SSDs) and hard disk drives (HDDs) have been described as generally having their own, dedicated controllers, but it is possible to have multiple types of memory managed by a single controller, i.e., with a drive or memory itself constituting a hybrid. Further to the system context, embodiments have been described having two tiers of memory types, but it is possible to have a single tier of memory (e.g., all NAND-flash), or three or more tiers of memory of different types. As an example, one contemplated implementation features a host with multiple tiers of fast-access memory (e.g., local SRAM and DRAM), one or more SSDs and one or more HDDs, configured as different tiers. Some embodiments may omit one or more of these in favor of other memory types, for example, the HDDs can be omitted, or a different type of storage media can be used.

To provide a few further examples, instead of using flash memory, the techniques applied above can be applied to other forms of both volatile and nonvolatile memory. For example, it is possible to apply some of the management and network configuration schemes discussed above to DRAM and other forms of volatile memory. In addition, some or all of the garbage collection, space reclamation, geometry reporting, wear leveling, defragmentation and other schemes discussed above can be applied to other forms of nonvolatile memory. Although known by a variety of names, these memories typically have bistable elements have properties where resistance change is a manifestation of some type of change in physical materials. For example, RRAM, magnetic random access memory (MRAM), phase change random access memory (PCRAM), nanowire RAM, magnetic media (such as the aforementioned shingled disk drives) and similar designs all operate based on similar state change principles where the current that flows through the material (or equivalently, voltage drop seen across the material) changes depending on state of the underlying materials. Therefore, in many of the detailed examples provided above, flash memory is used, but as mentioned, other designs are possible. Also, the examples discussed above were focused on single-level cell (SLC) NAND-flash memory, but it should be equally possible to apply the teachings herein to multi-level cell (MLC) NAND-flash memory, and to SLC or MLC NOR-flash memory designs.

Also, the techniques discussed above, when implemented on a comprehensive basis, permit substantial reductions in memory controller functions which would be conventionally needed to manage a complex translation layer. However, as should be apparent from the examples provided above, many of the cooperative techniques provided by this disclosure and supporting circuitry can be implemented in embodiments that utilize a traditional translation layer. For example, it is possible to combine cooperative garbage collection and space reclamation processes with a conventional translation layer. Advantageously, by providing ready-host visibility into physical subdivision-specific, tracked parameters (e.g., metadata) and making liberal use of cooperative capabilities, a given design can eliminate much of the overhead that would be traditionally needed to manage a translation layer.

One implementation provides a memory controller to control the performance of memory transactions directed to multi-plane memory. The memory controller has interface circuitry (e.g., one or two interfaces) sufficient to communicate with at least one host and with the multi-plane memory. As before, the memory controller can optionally be coupled to a host via a first signaling link (e.g., via a first interface, using packetized communications) and via a second signaling link to the multi-plane memory device. Multiple or shared link designs can also be used. Also, in one design, the memory controller and multi-plane memory can be bundled together on a single IC with no dedicated high speed serial link between them (e.g., as might otherwise be the case for separate ICs). Further, another design presents a multiple-IC system where controller and multiple memory devices managed by that controller are associated with respective ICs; each memory device can be in the form of a single or multi-die package, with 2, 4, 8 or a different number of dies per package in the latter case. Any number of these dies (e.g., zero, one, many or all) can be configured to have one or more multi-plane flash memory arrays.

The memory controller can include logic (e.g., hardware logic or software logic) operable to exchanges commands and data via the interface circuitry. This logic in one embodiment is operable to receive multi-page commands from the host, such that the host specifically determines when a multi-page operation (as opposed to a single page operation) should be effected. As discussed earlier, in such an embodiment, the host optionally can mix single page and multi-page commands depending on need and, preferably, has a command structure (e.g., using an NVMe compliant architecture as discussed) that permits exchange of single plane and multi-plane commands with the memory controller. Again, per the discussion earlier, a multi-page command can be configured as a series of “fused” single-page commands, where the memory controller receives all of the commands at once or in close succession and then instructs performance without awaiting completion of a request for a first one of the pages.

In one aspect of the invention, the logic of the memory controller is capable of receiving and interpreting a multi-page (or multi-array) read request from a host. Note that the actual control over multi-array memory can optionally involve single-page commands between the memory controller and addressed memory device, as referenced earlier.

In another aspect of the invention, the logic is capable of receiving and interpreting a multi-page write request. Once again, the actual control over multi-array memory can optionally involve single-page commands between the memory controller and addressed memory device.

In still a further aspect of the invention, the logic is capable of receiving and interpreting a multi-page deallocate (page release) command, or alternatively (or in addition), a multi-page erase command.

These features can be used together or individually, e.g., this disclosure in one embodiment provides a memory controller capable of receiving multi-page read, write, deallocate and erase commands from a host. In another embodiment, a memory controller can receive a multi-page read command (but not the other commands); alternatively, the memory controller can be designed to receive multi-page write command (but not a multi-page read command). Indeed, any combination of commands is contemplated as an optional design feature.

In still another embodiment, these techniques can be applied to specifically managing multi-plane memory. In a variant, these techniques can be used in lieu of or in addition to techniques for managing multi-die memory.

This disclosure also contemplates systems, methods and other devices that leverage the principles introduced above. For example, one implementation provides a host that operates in a manner reciprocally to the memory controller just discussed. The host can be in the form of a host device (e.g., an IC, computer, web appliance, storage manager, or another master). In one embodiment, the host device has an interface to transmit outbound transaction requests to a memory controller, a table to identify address space corresponding to memory units that span multiple page (or planes or dies) of memory managed by the memory controller, and logic to generate a multi-page (or multi-plane or multi-die) transaction request directed to the address space. In more specific forms of this implementation, the table can be a logical-to-physical address translation table and the memory and the memory controller can be directed to a form of nonvolatile memory such as NAND flash memory; in such setting, the host, possessing an understanding of physical address assignment, can issue new write requests in a manner that directly specifies the writing of data across planes or dies, and the host can also issue read requests on this same basis. Note that this structure substantially reduces command competition with host needs by functions of the memory controller, e.g., the host can directly manage maintenance operations such as garbage collection, erase operations and so forth in a manner that does not interfere with its own data needs; it also reduces need for the memory controller to load and manage complex tables. If desired, the host can issue multi-page transactions requests to the memory controller which specify a base physical address for each affected plane or die (e.g., such that each plane or die operates on a like-physical address, or on addresses based on an express or implied offset).

This disclosure also contemplates memory management techniques, devices, and systems which rely on the various structures just discussed, either host side or memory controller side, or aggregations that combine these things. In one embodiment, a host determines the need for maintenance actions in flash memory notwithstanding the presence of a memory controller. For example, a host can optionally handle all management tasks of flash memory (e.g., marking of bad data blocks) such that no address translation at all is necessary at the memory controller, and such that the host schedules and initiates one or more of garbage collection, data relocation, defragmentation, wear leveling, or any one or of the functions discussed earlier. As mentioned, a model can also be used where the memory controller handles certain select functions such as defect management and temporary physical address reassignment responsive to errors; as noted earlier, serving memory controller-tracked physical memory status information, on an EU-specific basis (or other unit basis) to the host permits eventual identification and isolation of bad blocks in a manner where the host updates its understanding of physical address space assignment.

It should be noted that the subject matter disclosed herein can be expressed (or represented), as data and/or instructions embodied in various computer-readable storage media, meaning physical non-transitory media such as computer memory, storage disks and the like. In this context, the described subject matter can take the form of instructions or data for fabricating an integrated circuit (or integrated circuits) that, when built and operated, possesses the circuits and structures, and performs the techniques described herein. An output of a process for designing an integrated circuit, or a portion of an integrated circuit, comprising one or more of the circuits described herein may be such a computer-readable medium such as, for example, a magnetic tape or an optical or magnetic disk, or other non-volatile physical storage. The computer-readable medium may be encoded with data structures or other information describing circuitry that may be physically instantiated as an integrated circuit or portion of an integrated circuit. Although various formats may be used for such encoding, these data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can use such encoded data to fabricate integrated circuits comprising one or more of the circuits described herein. Some or all of the functions described above can also be embodied as instructions stored on machine-readable media, including software code or firmware that, when executed, cause a machine (e.g. a microprocessor or device having a microprocessor) to perform the described functions. Generally speaking, any such instructions can be alternatively implemented as hardware logic, or a combination of hardware and software logic, depending on implementation.

The foregoing description and in the accompanying drawings, specific terminology and drawing symbols have been set forth to provide a thorough understanding of the disclosed embodiments. In some instances, the terminology and symbols may imply specific details that are not required to practice those embodiments. The terms "exemplary" and "embodiment" are used to express an example, not a preference or requirement.

Various modifications and changes may be made to the embodiments presented herein without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A storage system comprising:

a host comprising a host-side interface and a storage manager, the storage manager operable to communicate commands compatible with a Non-Volatile Memory Express (NVMe) standard, wherein the commands include write commands and a maintenance command; and a solid state storage drive (SSD) comprising:

a drive-side interface operable to receive the commands from the host storage manager;

flash memory comprising one or more flash memory dies, each of the one or more flash memory dies having physical planes, each of the physical planes having erase units, each of the erase units contained within a single one of the physical planes, each of the erase units having pages, wherein the flash memory is logically organized into subdivisions, each of the subdivisions being mapped to at least one erase unit from each of at least two different ones of the physical planes; and logic operable to, in response to ones of the write commands which are directed to a specific one of the subdivisions and which correspond to a sequential range of logical block addresses, write data accompanying the ones of the write commands to erase units on different ones of the at least two physical planes which are mapped to the specific one of the subdivisions, using a common page address, in a manner where the writing of the data is at least partially concurrent for the at least two physical planes which are mapped to the specific one of the subdivisions, wherein the logic is further operable to convert at least one logical block address of the sequential range of logical block addresses into the common page address;

wherein the storage manager is further operable to transmit to the SSD, via the host-side interface, a maintenance command which selects to the specific one of the subdivisions; and wherein the SSD is operable to receive the maintenance command, via the drive-side interface, and the logic of the SSD is further operable to, in response to the maintenance command, erase each of the erase units which is mapped to the specific one of the subdivisions.

2. The storage system of claim 1, wherein the maintenance command is an erase command, and wherein the logic of the SSD is further operable to, in response to the erase command, physically reset each of the erase units which is mapped to the specific one of the subdivisions.

3. The storage system of claim 1, wherein the maintenance command is a trim command, and wherein the logic is further operable to, in response to the trim command, mark, in a table, a specific logical address as released, the table being maintained within the SSD, wherein further, the logic of the SSD is further operable to, provided that no data remains in the specific one of the subdivisions which is unreleased, automatically control physical reset of the erase units mapped to the specific one of the subdivisions.

4. The storage system of claim 1, wherein the logic of the SSD is further operable to, in response to the maintenance command, relocate data stored in one of the erase units which is mapped to the specific one of the subdivisions to one of the erase units which is mapped to a different one of the subdivisions and, following the relocating of the data, and provided that no data remains in the specific one of the subdivisions which is unreleased, automatically control physical reset of the erase units mapped to the specific one of the subdivisions.

5. The storage system of claim 1, wherein the logic of the SSD is operable to maintain a threshold amount of spare capacity for each of the subdivisions.

6. The storage system of claim 1, wherein:

the specific one of the subdivisions is a first one of the subdivisions and wherein the subdivisions comprise a second one of the subdivisions; and the first one of the subdivisions and the second one of the subdivisions can be mapped to different, respective numbers of the physical planes.

7. The storage system of claim 1, wherein the logic of the SSD is operable to intermittently remap the first one of the subdivisions and the second one of the subdivisions, in a manner such that at least one of the physical planes can be mapped to each of the first one of the subdivisions and the second one of the subdivisions at mutually-exclusive times.

8. The storage system of claim 1, wherein the logic of the SSD is operable to intermittently remap the specific one of the subdivisions such that any given one of the erase units to which the specific one of the subdivisions is mapped is swapped for a new erase unit, where each of the given one of the erase units and the new erase unit are on a common one of the physical planes.

9. The storage system of claim 1, wherein the storage system further comprises logic operable to cause the SSD to perform independent garbage collections processes each specific to a corresponding one of the subdivisions.

10. The storage system of claim 1, wherein:

the storage manager further comprises logic operable to detect a read disturb error associated with data stored in the specific one of the subdivisions;

the logic of the SSD is further operable to maintain a table which indicates an inoperability status for each of the erase units in the flash memory;

the logic of the storage manager is further operable to, in response to detection of the read disturb error, transmit, via the host-side interface, a request based on the detection of the read disturb error; and the SSD is operable to receive the request, via the drive side interface, and the logic of the SSD is further operable to, in response to the request, mark in the table a specific one of the erase units mapped to the specific one of the subdivisions as at least partially inoperable.

11. The storage system of claim 1, wherein:

the logic of the SSD is further operable to, in connection with attempted physical erasure of the erase units mapped to the specific one of the subdivisions, detect an inoperability condition of a specific one of the erase units, and responsively mark the specific one of the erase units as at least partially inoperable;

the storage manager is further operable to transmit, via the host-side interface, a query command to the SSD; and the SSD is operable to receive the query, via the drive side interface, and the logic of the SSD is further operable to, in response to the query command, transmit information to the host, wherein the information indicates that the specific erase unit is at least partially inoperable.

12. The storage system of claim 11, wherein:

the storage manager is further operable to issue, via he host-side interface, an additional command to the SSD; and the SSD is operable to receive the additional command, via the drive-side interface, and the logic of the SSD is further operable to, in response to the additional command, map the specific one of the subdivisions to a new erase unit which is on a common one of the physical planes as the specific erase unit.

13. The storage system of claim 1, wherein the logic of the SSD is further operable to:

update metadata in response to the write commands, the metadata indicating an extent to which the erase units mapped to the specific one of the subdivisions can, following a most-recent physical erasure of the erase units mapped to the specific one of the subdivisions, still be written-to; and update the metadata in response to the maintenance command, such that the metadata indicates that the extent is equal to a writable capacity of the specific one of the subdivisions.

14. The storage system of claim 13, wherein:

the storage manager further comprises logic operable to issue, via the host-side interface, a query command to the SSD; and the SSD is operable to receive the query command, via the drive-side interface, and the logic of the SSD is further operable to, in response to the query command, return information representing the extent to the host.

15. The storage system of claim 1, wherein:

the logic of the SSD is further operable to store metadata relating to the specific one of the subdivisions;

the storage manager is further operable to issue, via the host-side interface, a query command to the SSD, the query command specifying the specific one of the subdivisions;

the SSD is operable to receive the query command, via the drive-side interface, and the logic of the SSD is further operable to, in response to the query command, transmit, to the storage manager, information that depends on the stored metadata, the information including an address identifying the specific one of the subdivisions; and the maintenance command specifies the address.

16. The storage system of claim 15, wherein the metadata indicates wear of the erase units mapped to the specific one of the subdivisions.

17. The storage system of claim 15, wherein the metadata indicates a time since data was written to the erase units mapped to the specific one of the subdivisions.

18. The storage system of claim 1, wherein:

the storage manager is further operable to issue, via the host-side interface, a query command to the SSD; and the SSD is operable to receive the query command, via the drive-side interface, and the logic of the SSD is further operable to, in response to the query command, transmit, to the storage manager, a logical address which corresponds to the specific one of the subdivisions.

19. The storage system of claim 1, wherein the logic of the SSD is further operable to transfer to the storage manager, via the drive-side interface, information indicates a host-accessible capacity of the specific one of the subdivisions and an address associated with the specific one of the subdivisions.

20. The storage system of claim 1, wherein the logic of the SSD is further operable to transfer to the storage manager, via the drive-side interface:

information which indicates at least one of a status or an error rate associated with the specific one of the subdivisions; and an address associated with the specific one of the subdivisions.

21. The storage system of claim 1, wherein:

the flash memory comprises two flash memory dies;

the selected one of the subdivisions is further mapped to at least one erase unit in each of the two flash memory dies; and the logic of the SSD is further operable to, in response to the ones of the write commands, write the data accompanying the ones of the write commands to erase units on the two flash memory dies using the common page address.

22. The storage system of claim 1, wherein the storage manager comprises logic operable to:

track storage location release status for the specific one of the subdivisions;

detect a condition where the storage location release status satisfies at least one criterion; and responsive to a detection of the condition, transmit, via the host-side interface, one or more further commands to the SSD to copy unreleased data from the specific one of the subdivisions, to a different one of the subdivisions, wherein the one or more commands select the different one of the subdivisions; and the drive-side interface is operable to receive the one or more further commands, and the logic of the SSD is further operable to responsively copy the unreleased data to the different one of the subdivisions in a manner that does not send the unreleased data to the storage manager.

23. The storage system of claim 22, wherein the logic of the storage manager is further operable to maintain a table that tracks status of the unreleased data, and to update, in association with the copy of the unreleased data, the status so as to identify, for the unreleased data, the different one of the subdivisions.

* * * * *